United States Patent
Qiao et al.

(10) Patent No.: US 11,412,418 B2
(45) Date of Patent: Aug. 9, 2022

(54) THIRD PARTY CHARGING IN A WIRELESS NETWORK

(71) Applicant: Comcast Cable Communications, LLC, Philadelphia, PA (US)

(72) Inventors: Weihua Qiao, Herndon, VA (US); Esmael Hejazi Dinan, McLean, VA (US); Kyungmin Park, Herndon, VA (US); Peyman Talebi Fard, Sterling, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/937,034

(22) Filed: Jul. 23, 2020

(65) Prior Publication Data

US 2020/0359269 A1     Nov. 12, 2020

Related U.S. Application Data

(63) Continuation of application No. 16/102,316, filed on Aug. 13, 2018, now Pat. No. 10,764,789.

(Continued)

(51) Int. Cl.
| | |
|---|---|
| *H04W 28/24* | (2009.01) |
| *H04L 12/14* | (2006.01) |
| *H04L 47/80* | (2022.01) |
| *H04L 47/20* | (2022.01) |
| *H04L 41/0896* | (2022.01) |

(Continued)

(52) U.S. Cl.
CPC ......... *H04W 28/24* (2013.01); *H04L 12/1407* (2013.01); *H04L 41/0896* (2013.01); *H04L 47/20* (2013.01); *H04L 47/805* (2013.01); *H04M 15/66* (2013.01);
(Continued)

(58) Field of Classification Search
CPC . H04L 12/14–1496; H04L 41/08–0896; H04L 47/00–829; H04M 15/00–93; H04W 28/00–26; H04W 72/00–14
See application file for complete search history.

(56) References Cited

U.S. PATENT DOCUMENTS

| | | | |
|---|---|---|---|
| 2011/0202635 A1 | 8/2011 | Yeung et al. | |
| 2013/0225123 A1* | 8/2013 | Adjakple | ............ H04L 12/1464 455/406 |

(Continued)

FOREIGN PATENT DOCUMENTS

| | | | |
|---|---|---|---|
| CN | 107846275 A | 3/2018 | |
| EP | 2059002 A1 * | 5/2009 | ............ H04M 15/57 |

(Continued)

OTHER PUBLICATIONS

S2-178509, SA WG2 Meeting #124; Reno, USA, Nov. 27-Dec. 1, 2017; Source: Nokia, Nokia Shanghai Bell, Verizon, Cisco, Deutsche Telecom; Title: OI#19: 23.502 §4.17.x: NRF for UPF discovery.

(Continued)

*Primary Examiner* — Chi H Pham
*Assistant Examiner* — Vladislav Y Agureyev
(74) *Attorney, Agent, or Firm* — Banner & Witcoff, Ltd.

(57) ABSTRACT

Systems, apparatuses, and methods are described for wireless communications. Third party charging may be performed to provide services for a wireless device. One or more policies may be determined for the wireless device based on charging information.

29 Claims, 26 Drawing Sheets

Related U.S. Application Data

(60) Provisional application No. 62/544,518, filed on Aug. 11, 2017.

(51) Int. Cl.
  H04W 72/10 (2009.01)
  H04W 28/02 (2009.01)
  H04W 28/20 (2009.01)
  H04M 15/00 (2006.01)
  H04L 41/0893 (2022.01)

(52) U.S. Cl.
  CPC ....... *H04W 28/0268* (2013.01); *H04W 28/20* (2013.01); *H04W 72/10* (2013.01); *H04L 41/0893* (2013.01)

(56) References Cited

U.S. PATENT DOCUMENTS

| | | | |
|---|---|---|---|
| 2013/0316674 A1* | 11/2013 | Cho | H04W 4/24 |
| | | | 455/406 |
| 2014/0086177 A1 | 3/2014 | Adjakple et al. | |
| 2015/0365322 A1* | 12/2015 | Shatzkamer | H04L 45/38 |
| | | | 370/392 |
| 2016/0227045 A1* | 8/2016 | Hunt | H04M 3/2209 |
| 2016/0352645 A1 | 12/2016 | Senarath et al. | |
| 2016/0353268 A1* | 12/2016 | Senarath | H04L 41/5051 |
| 2016/0353367 A1 | 12/2016 | Vrzic et al. | |
| 2017/0054595 A1 | 2/2017 | Zhang et al. | |
| 2017/0086118 A1 | 3/2017 | Vrzic | |
| 2017/0164349 A1* | 6/2017 | Zhu | H04W 76/10 |
| 2017/0289270 A1 | 10/2017 | Li et al. | |
| 2017/0311304 A1 | 10/2017 | Lu | |
| 2017/0317894 A1 | 11/2017 | Dao et al. | |
| 2017/0324652 A1 | 11/2017 | Lee et al. | |
| 2017/0332421 A1 | 11/2017 | Sternberg et al. | |
| 2017/0359749 A1 | 12/2017 | Dao | |
| 2017/0367026 A1 | 12/2017 | Li et al. | |
| 2018/0006953 A1 | 1/2018 | Power et al. | |
| 2018/0006954 A1 | 1/2018 | Arora et al. | |
| 2018/0123961 A1 | 5/2018 | Farmanbar et al. | |
| 2018/0124661 A1 | 5/2018 | Tsai | |
| 2018/0139107 A1 | 5/2018 | Senarath et al. | |
| 2018/0176768 A1 | 6/2018 | Baek et al. | |
| 2018/0184415 A1 | 6/2018 | Rong et al. | |
| 2018/0198867 A1* | 7/2018 | Dao | H04W 36/14 |
| 2018/0199398 A1 | 7/2018 | Dao et al. | |
| 2018/0227873 A1 | 8/2018 | Vrzic et al. | |
| 2018/0262924 A1 | 9/2018 | Dao et al. | |
| 2018/0270712 A1 | 9/2018 | Faccin et al. | |
| 2018/0270744 A1 | 9/2018 | Griot et al. | |
| 2018/0324646 A1 | 11/2018 | Lee et al. | |
| 2018/0332523 A1 | 11/2018 | Faccin et al. | |
| 2018/0352501 A1* | 12/2018 | Zhang | H04W 76/11 |
| 2018/0375733 A1* | 12/2018 | Zhou | H04L 41/00 |
| 2018/0376384 A1* | 12/2018 | Youn | H04W 36/0022 |
| 2019/0045351 A1 | 2/2019 | Zee et al. | |
| 2019/0052580 A1 | 2/2019 | Peng et al. | |
| 2019/0075552 A1 | 3/2019 | Yu et al. | |
| 2019/0150219 A1 | 5/2019 | Wang et al. | |
| 2019/0158364 A1 | 5/2019 | Zhang et al. | |
| 2019/0159107 A1 | 5/2019 | Kim et al. | |
| 2019/0166493 A1 | 5/2019 | You et al. | |
| 2019/0174561 A1 | 6/2019 | Sivavakeesar | |
| 2019/0191348 A1 | 6/2019 | Futaki et al. | |
| 2019/0208573 A1 | 7/2019 | Yang et al. | |
| 2019/0223093 A1* | 7/2019 | Watfa | H04W 36/06 |
| 2019/0238425 A1 | 8/2019 | Mladin et al. | |
| 2019/0281426 A1* | 9/2019 | Li | H04L 12/14 |
| 2019/0327650 A1 | 10/2019 | Yiu et al. | |
| 2019/0357130 A1 | 11/2019 | Garcia Azorero et al. | |
| 2019/0363831 A1 | 11/2019 | Davydov et al. | |
| 2019/0364496 A1* | 11/2019 | Jin | H04W 80/12 |
| 2019/0387440 A1 | 12/2019 | Yiu et al. | |
| 2019/0387576 A1* | 12/2019 | Yang | H04W 48/18 |
| 2020/0015131 A1 | 1/2020 | Ying | |
| 2020/0053802 A1 | 2/2020 | Li et al. | |
| 2020/0077327 A1 | 3/2020 | Duan et al. | |
| 2020/0084677 A1 | 3/2020 | Yiu et al. | |

FOREIGN PATENT DOCUMENTS

| | | | | |
|---|---|---|---|---|
| EP | 2858303 A1 * | 4/2015 | ......... | H04L 41/0893 |
| WO | WO-2012145902 A1 * | 11/2012 | .............. | H04W 4/24 |
| WO | WO-2015054531 A * | 4/2015 | ............ | H04M 15/68 |
| WO | 2015184708 A1 | 12/2015 | | |
| WO | 2016201999 A1 | 12/2016 | | |
| WO | 2017074486 A1 | 5/2017 | | |
| WO | WO-2017074486 A1 * | 5/2017 | ........... | H04L 47/125 |
| WO | 2017113109 A1 | 7/2017 | | |
| WO | 2017171598 A1 | 10/2017 | | |
| WO | 2017173259 A1 | 10/2017 | | |
| WO | 2018017132 A1 | 1/2018 | | |
| WO | 2018058579 A1 | 4/2018 | | |
| WO | 2018093168 A1 | 5/2018 | | |
| WO | 2018121880 A1 | 7/2018 | | |
| WO | 2019011794 A1 | 1/2019 | | |

OTHER PUBLICATIONS

S2-178541, SA WG2 Meeting #124; Reno, USA, Nov. 27-Dec. 1, 2017; Source: Nokia, Nokia Shanghai Bell, Telecom Italia; Title: TS 23.501 OI:4f Coexistence and isolation among network slices.

S2-179779, SA WG2 Meeting #124; Reno, USA, Nov. 27-Dec. 1, 2017; Source: Nokia, Nokia Shanghai Bell; Title: 23.501/§ 6.3.3: location data SMF needs for UPF selection.

S2-178922, SA WG2 Meeting #124; Reno, USA, Nov. 27-Dec. 1, 2017; Source: Huawei, HiSilicon; Title: OI#19 TS 23.501 Proposal on Using UPF Topology for UPF Selection by SMF.

S2-179121 rev1, SA WG2 Meeting #124; Reno, USA, Nov. 27-Dec. 1, 2017; Source: Samsung, Deutsche Telekom; Title: TS 23.502: Clarification on NF Service Discovery.

S2-179325 rev4, SA WG2 Meeting #124; Reno, USA, Nov. 27-Dec. 1, 2017; Source: Nokia, Nokia Shanghai Bell, Verizon, Cisco, Deutsche Telecom; Title: OI#19: 23.502 §4.17.x: NRF for UPF discovery.

S2-179325 rev5, SA WG2 Meeting #124; Reno, USA, Nov. 27-Dec. 1, 2017; Source: Nokia, Nokia Shanghai Bell, Verizon, Cisco, Deutsche Telecom; Title: OI#19: 23.502 §4 17.x: NRF for UPF discovery.

SP-170743, SA WG2 Meeting #1223GPP; Sapporo, Japan, Sep. 13-15, 2017; Source: SA WG2; Title: New SID on Enhancing Topology of SMF and UPF in 5G Networks.

Qualcomm Incorporated—Aug. 1, 2017—"TS 23. 501: Network Triggered change of slices for UE".

R2-1702552 Tdoc 3GPP TSG-RAN WG2 #97bis, Spokane, USA, April 3-7, Z017, Source: Ericsson, Title: Slice availability.

R2-1702589 3GPP TSG-RAN WG2 #97bis, Spokane, USA, Apr. 3-7, 2017, Source: Huawei, HiSilicon, Title: RRC Support for Network Slicing.

R2-1702590 3GPP TSG-RAN WG2 #97bis, Spokane, USA, Apr. 3-7, 2017, Source: Huawei, HiSilicon, Title: Network Slice Selection Assistance Information over RRC.

R2-1702843 3GPP TSG-RAN WG2 #97bis, Spokane, USA, Apr. 3-7, 2017, Source: ZTE, ZTE Microelectronics, Title: Consideration on the NW slice in RAN.

R2-1702969 3GPP TSG-RAN WG2 #97bis, Spokane, USA, Apr. 3-7, 2017, Source: Coolpad, Title: Discussion on UE RRC modeling to support multiple slices per-UE.

33-171140 3GPP TSG-RAN WG3 #95bis, Spokane, USA, Apr. 3-7, 2017, Source: Ericsson, Title: Stage 2 aspects of CN Instance selection signalling.

R3-171353 3GPP TSG-RAN WG3 #95bis, Spokane, USA, April 3-7, 2017, Source: Ericsson, Title: RAN aspects of NW slicing in Stage 2 specifications.

S2-174202, SA WG2 Meeting #122; San Jose, Mexico, Jun. 26-30, 2017; Source: Ericsson; Title: NSSF and Slice selection during the Registration procedures (revision of S2-17xxxx).

(56) References Cited

OTHER PUBLICATIONS

S2-174246, SA WG2 Meeting #122; San Jose, Mexico, Jun. 26-30, 2017; Source: ZTE, Telecom Italia, Oracle; Title: 23.501—Clarifications on Allowed NSSAI/S-NSSAI.
S2-174247, SA WG2 Meeting #122; San Jose, Mexico, Jun. 26-30, 2017; Source: ZTE, Oracle, China Telecom; Title: 23.501—NSIs compatibility support via organization of NSSAI.
S2-174253, SA WG2 Meeting #122; San Jose, Mexico, Jun. 26-30, 2017; Source: Telecom Italia, Nokia, Alcatel-Lucent Shanghai Bell, ZTE; Title: Network Slicing Support for Roaming.
S2-174262, SA WG2 Meeting #122; San Jose, Mexico, Jun. 26-30, 2017; Source: Motorola Mobility, Lenovo; Title: Application Function influence on slice selection (revision of S2-17xxxx).
S2-174263, SA WG2 Meeting #122; San Jose, Mexico, Jun. 26-30, 2017; Source: Motorola Mobility, Lenovo; Title: Application Function influence on slice selection (revision of S2-17xxxx).
S2-174339, SA WG2 Meeting #122; San Jose, Mexico, Jun. 26-30, 2017; Source: Huawei, HiSilicon; Title: Allowed NSSAI.
S2-174340, SA WG2 Meeting #122; San Jose, Mexico, Jun. 26-30, 2017; Source; Huawei, HiSilicon; Title: TS 23.501. Routing NSSAI to perform AMF selection by (R)AN (revision of S2-17xxxx).
S2-174433, 3GPP TSG SA WG2 Meeting #122; San Jose, Mexico, Jun. 26-30, 2017; Source: Huawei, HiSilicon; Title: TS 23.501—Use Application Data Repository for AF to provide policy requirements that apply to future PDU sessions.
S2-174481, SA WG2 Meeting #122; San Jose, Mexico, Jun. 26-30, 2017; Source: Huawei, HiSilicon; Title: PCF Discovery and Selection.
S2-174485, SA WG2 Meeting #122; San Jose, Mexico, Jun. 26-30, 2017; Source; Qualcomm Incorporated; Title: TS 23.501—Network Triggered change of slices for UE.
S2-174486, SA WG2 Meeting #122; San Jose, Mexico, Jun. 26-30, 2017; Source: Qualcomm Incorporated; Title: TS 23.502—Network Triggered change of slices for UE.
S2-174538; San Jose, Mexico, Jun. 26-30, 2017; Source: Nokia, Alcatel-Lucent Shanghai Bell, Sprint, T-Mobile USA, NEC; Title: Network Slice Instance selection.
S2-174653, SA WG2 Meeting #122; San Jose, Mexico, Jun. 26-30, 2017; Source: NTT DOCOMO; Title: TS 23.502—Clarification of NSSAI stored in the UE's subscription data.
S2-174709, SA WG2 Meeting #122; San Jose, Mexico, Jun. 26-30, 2017; Source: ITRI; Title: Removal of FFS in Section 5.15.1 of TS 23.501 (revision of S2-17xxxx).
S2-174842, 3GPP TSG SA WG2 Meeting #122; San Jose, Mexico, Jun. 26-30, 2017; Source: Huawei, HiSilicon; Title: TS 23.501—Use Application Data Repository for AF to provide policy requirements that apply to future PDU sessions.
S2-174902, 3GPP TSG SA Wg2 Meeting #122, San Jose, Mexico, Jun. 26-30, 2017; Source: Huawei, HiSilicon; Title: TS 23.501—Use Application Data Repository for AF to provide policy requirements that apply to future PDU sessions.
S2-175051, SA WG2 Meeting #122; San Jose, Mexico, Jun. 26-30, 2017; Source: Motorola Mobility, Lenovo, Samsung, SK Telecom; Title: Allowed NSSAI mapping information.
S2-175216, SA WG2 Meeting #122; San Jose, Mexico, Jun. 26-30, 2017; Source: Ericsson; Title: NSSF and Slice selection during the Registration procedures (revision of S2-174992).
S2-175217, SA WG2 Meeting #122; San Jose, Mexico, Jun. 26-30, 2017; Source: Huawei, HiSilicon; Title: On Multiple Network Slice instances.
S2-175218, SA WG2 Meeting #122; San Jose, Mexico, Jun. 26-30, 2017; Source: Motorola Mobility, Lenovo; Title: PDU Session maintenance during change of the set of Network Slice(s) (revision of S2-174996, S2-174713).
S2-175219, SA WG2 Meeting #122; San Jose, Mexico, Jun. 26-30, 2017; Source: Motorola Mobility, Lenovo, Samsung, SK Telecom, Telecom Italia; Title: Allowed NSSAI mapping information (revision of S2-175051, S2-174579).
S2-175271, SA WG2 Meeting #122; San Jose, Mexico, Jun. 26-30, 2017; Source: Ericsson; Title: Slice co-existence (merge of S2-174201+4535+4649+4442).
S2-175296, SA WG2 Meeting #122; San Jose, Mexico, Jun. 26-30, 2017; Source: Huawei, HiSilicon, ZTE, China Mobile, Telecom Italia, Oracle, Ericsson, ITRI, China Telecom, InterDigital, KDDI, ETRI, CATT, China Unicom, Deutsche Telekom, Verizon, Broadcom, Motorola, Lenovo, Orange, Samsung, AT&T; Title: Network Slice instance selection (revision of S2-175277, 5224, 5045, 4991.
S2-175336, SA WG2 Meeting #122bis; Sophia Antipolis, France, Aug. 21-25, 2017; Packet #92 Doc 109; LS reply to SA2 on Next Generation Roaming (revision of S2-174728).
Apr. 2, 2019—Extended European Search Report—EP 18211009.8.
Huawei et al.—Oct. 17, 2017—"TS 23.501: Support of isolated slice usage in the UE".
Huawei et al.—Nov. 21, 2017—"OI#4f: Support of isolated slice usage in the UE".
Nov. 13, 2017—3rd Generation Partnership Project Technical Specification Group Services and System Aspects; System Architecture for the 5G Systeml Stage 2 (Release 15).
S2-175766, SA WG2 Meeting #122bis; Sophia Antipolis, France, Aug. 21-25, 2017; Source: Qualcomm Incorporated; Title: TS 23.501: Network Triggered change of slices for UE.
3GPP TS 23.501 V1.5.0 (Nov. 2017), 3rd Generation Partnership Project; Technical Specification Group Services and System Aspects; System Architecture for the 5G System; Stage 2 (Release 15).
GPP TS 23.502 V1.3.0 (Nov. 2017); Technical Specification; 3rd Generation Partnership Project; Technical Specification Group Services and System Aspects; Procedures for the 5G System; Stage 2 (Release 15).
S2-175581, SA WG2 Meeting #122bis; Sophia Antipolis, France, Aug. 21-25, 2017; Source: Samsung; Title: Pushing Slice Coexistence Information to the UE.
S2-175601, SA WG2 Meeting #122bis; Sophia Antipolis, France, Aug. 21-25, 2017; Source: Telecom Italia, KDDI, ZTE; Title: 23.501: Network Slice Isolation.
S2-175630, SA WG2 Meeting #122bis; Sophia Antipolis, France, Aug. 21-25, 2017; Source: Telecom Italia, ZTE Title: Network Slice Coexistence.
S2-175675, SA WG2 Meeting #122bis; Sophia Antipolis, France, Aug. 21-25, 2017; Source: Ericsson; Title: Network Slice Co-Existence Considerations.
S2-175678, SA WG2 Meeting #122bis; Sophia Antipolis, France, Aug. 21-25, 2017; Source: Nokia, Alcatel-Lucent Shanghai Bell; Title: On Coexistence Rules.
S2-175757, SA WG2 Meeting #122bis; Sophia Antipolis, France, Aug. 21-25, 2017; Source: Qualcomm Incorporated; Title: TS 23.501: Support for Slice Co-Existence.
S2-175911, SA WG2 Meeting #122bis; Sophia Antipolis, France, Aug. 21-25, 2017; Source: Huawei, HiSilicon; Title: Simple Slice Coexistence.
S2-175915, SA WG2 Meeting #122bis; Sophia Antipolis, France, Aug. 21-25, 2017; Source: ZTE, Oracle; Title: 23.501: Network Slicing Clause 5.15.5—Early vs. Late Binding of UE with the Associated NSI Corresponding to Allowed S-NSSAI.
S2-177081, SA WG2 Meeting #123; Ljubljana, Slovenia, Oct. 23-27, 2017; Source: Telecom Italia; Title: OI#4a Network Slice Isolation (23.501).
S2-177297, SA WG2 Meeting #123; Ljubljana, Slovenia, Oct. 23-27, 2017; Source: Huawei, HiSilicon; Title: TS 23.501: Support of Isolated Slice Usage in the UE.
S2-177414, SA WG2 Meeting #123; Ljubljana, Slovenia, Oct. 23-27, 2017; Source: NTT DOCOMO; Title: TS 23.501: OI#18: Update of SMF and UPF Selection Principle.
S2-177543, SA WG2 Meeting #123; Ljubljana, Slovenia, Oct. 23-27, 2017; Source: Nokia, Nokia Shanghai Bell; Title: 23.501 §6.3.3: NRF for UPF.
S2-177565, SA WG2 Meeting #123; Ljubljana, Slovenia, Oct. 23-27, 2017; Source: Huawei, HiSilicon; Title: OI#18 TS 23.501. Interaction between SMF and UPF on N4 Reference Point.
S2-177566, SA WG2 Meeting #123; Ljubljana, Slovenia, Oct. 23-27, 2017; Source: Huawei, HiSilicon; Title: TS 23.501: UPF Selection based on SMF Local Information.

(56) References Cited

OTHER PUBLICATIONS

S2-178097, SA WG2 Meeting #123; Ljubljana, Slovenia, Oct. 23-27, 2017; Source: Huawei, HiSilicon, Samsung, SK Telecom; Title: OI#18 TS 23.501: Interaction between SMF and UPF on N4 Reference Point.
S2-178112, SA WG2 Meeting #123; Ljubljana, Slovenia, Oct. 23-27, 2017; Source: Nokia, Nokia Shanghai Bell, Cisco; Title: 23.501 §6.3.3: NRF for UPF.
S2-178256, SA WG2 Meeting #124; Reno, USA, Nov. 27-Dec. 1, 2017; Source: Nokia, Nokia Shanghai Bell, Verizon, Cisco, Deutsche Telecom; Title: OI#19: 23.501 §6.3.3: NRF for UPF discovery.
S2-178468, SA WG2 Meeting #124; Reno, USA, Nov. 27. Dec. 1, 2017; Source: Huawei, HiSilicon; Title: TS23.502 Clarification on UPF selection in PDU session establishment.
Qian (Clara) Li et al., "An end-to-end network slicing framework for 5G wireless communication systems", Aug. 2016, Intel Corporation, USA.
3GPP TS 23.501 V0.4.0 (Apr. 2017), 3rd Generation Partnership Project; Technical Specification Group Services and System Aspects; System Architecture for the 5G System; Stage 2 (Release 15).
R2-1702529 3GPP TSG-RAN WG2 #97bis, Spokane, USA, Apr. 3-7, 2017, Source: Xiaomi, Title: Visibility of Slicing to UE.
R2-1702539 3GPP TSG-RAN2 #97bis, Spokane, USA, Apr. 3-7, 2017, Source: OPPO, Title: Discussion on Mobility issues of Network Slicing.
R2-1702551 3GPP TSG-RAN WG2 #97bis, Spokane, USA, Apr. 3-7, 2017, Source: Ericsson, Title: Signalling aspects of network slicing.
RZ-1702552 Tdoc 3GPP TSG-RAN WG2 #97bis, Spokane, USA, Apr. 3-7, 2017, Source: Ericsson, Title: Slice availability.
R2-1702553 Tdoc 3GPP TSG-RAN WG2 #97bis, Spokane, USA, Apr. 3-7, 2017, Source: Ericsson, Title: Access Control and Resource Isolation for Slicing.
R2-1702554 Tdoc 3GPP TSG-RAN WG2 #97bis, Spokane, USA, Apr. 3-7, 2017, Source: Ericsson, Title: Is UE AS slice agnostic or not?
R2-1702588 3GPP TSG-RAN WG2 #97bis, Spokane, USA, Apr. 3-7, 2017, Source: Huawei, HiSilicon, Title: UE Awareness of Network Slice.
R2-170Z589 3GPP TSG-RAN WG2 #97bis, Spokane, USA, Apr. 3-7, 2017, Source: Huawei, HiSilicon, Title: RRC Support for Network Slicing.
R2-170Z590 3GPP TSG-RAN WG2 #97bis, Spokane, USA, Apr. 3-7, 2017, Source: Huawei, HiSilicon, Title: Network Slice Selection Assistance Information over RRC.
R2-170Z843 3GPP TSG-RAN WG2 #97bis, Spokane, USA, Apr. 3-7, 2017, Source: ZTE, ZTE Microelectronics, Title Consideration on the NW slice in RAN.
R2-170Z969 3GPP TSG-RAN WG2 #97bis, Spokane, USA, Apr. 3-7, 2017, Source: Coolpad, Title: Discussion on UE RRC modeling to support multiple slices per-UE.
R2-1703101 3GPP TSG-RAN WG2 #97bis, Spokane, USA, Apr. 3-7, 2017, Source: CATT, Title: Slice visibility to UE AS.
R2-1703337 3GPP TSG-RAN WG2 #97bis, Spokane, USA, Apr. 3-7, 2017, Source: Samsung, Title: Review on Network Slicing.
R2-1703343 3GPP TSG-RAN WG2 #97bis, Spokane, USA, Apr. 3-7, 2017, Source: Samsung, Title: Slice Information in RRC.
R2-1703762 3GPP TSG-RAN WG2 #97bis, Spokane, USA, Apr. 3-7, 2017, Source: SA3, Title: Reply LS on privacy of registration and slice selection information (revision of Tdoc S3170902 in Busan, Korea from Mar. 27-31, 2017).
R3-170675 3GPP TSG-RAN WG3 #95, Athens, Greece, Feb. 13-17, 2017, Source: Ericsson, Title: Clarifications on the use of NSSAI in Network Slicing.
R3-170677 3GPP TSG-RAN WG3 #95, Athens, Greece, Feb. 13-17, 2017, Source: Ericsson, Title: Mobility and Mapping of NW Slices.
R3-171012 3GPP TSG-RAN WG3 #95bis, Spokane, USA, Apr. 3-7, 2017, Source: CATT, Title: Discussion on Slice-aware mobility.
R3-171029 3GPP TSG-RAN WG3 #95bis, Spokane, USA, Apr. 3-7, 2017, Source: ZTE, Title: NW Slice Availability Handling Approaches during Mobility.
R3-171047 3GPP TSG-RAN WG3 #95bis, Spokane, USA, Apr. 3-7, 2017, Source: Samsung, Title: RAN supporting Network Slicing.
R3-171097 3GPP TSG-RAN WG3 #95bis, Spokane, USA, Apr. 3-7, 2017, Source: Qualcomm Incorporated, Title: TP for network slicing description.
R3-171115 3GPP TSG-RAN WG3 #95bis, Spokane, USA, Apr. 3-7, 2017, Source: Nokia, Alcatel-Lucent Shanghai Bell, Title: Use of slice ID and NSSAI.
R3-171116 3GPP TSG-RAN WG3 #95bis, Spokane, USA, Apr. 3-7, 2017, Source: Nokia, Alcatel-Lucent Shanghai Bell, Title: Connected mode mobility with slicing.
R3-171117 3GPP TSG-RAN WG3 #95bis, Spokane, USA, Apr. 3-7, 2017, Source: Nokia, Title: LS on slice re-mapping during connected mode mobility.
R3-171128 3GPP TSG-RAN WG3 #95bis, Spokane, USA, Apr. 3-7, 2017, Source: LG Electronics Inc., Title Discussion on slice availability during mobility.
R3-171129 3GPP TSG-RAN WG3 #95bis, Spokane, USA, Apr. 3-7, 2017, Source: LG Electronics Inc., Title: Mobility procedure considering network slice.
R3-171139 3GPP TSG-RAN WG3 #95bis, Spokane, USA, Apr. 3-7, 2017, Source: Ericsson, Title: RAN aspects of NW slicing in Stage 2 specifications.
R3-171140 3GPP TSG-RAN WG3 #95bis, Spokane, USA, Apr. 3-7, 2017, Source: Ericsson, Title: Stage 2 aspects of CN Instance selection signalling.
R3-171141 3GPP TSG-RAN WG3 #95bis, Spokane, USA, Apr. 3-7, 2017, Source: Ericsson, Title: Signalling aspects of networking slicing.
R3-171142 3GPP TSG-RAN WG3 #95bis, Spokane, USA, Apr. 3-7, 2017, Source: Ericsson, Title: LS regarding RAN support for NW slicing.
R3-171143 3GPP TSG-RAN WG3 #95bis, Spokane, USA, Apr. 3-7, 2017, Source: Ericsson, Title: Slice re-mapping or removal during mobility.
R3-171144 3GPP TSG-RAN WG3 #95bis, Spokane, USA, Apr. 3-7, 2017, Source: Ericsson, Title: LS to SA2 on slices and mobility.
R3-171250 3GPP TSG-RAN WG3 #95bis, Spokane, USA, Apr. 3-7, 2017, Source: Huawei, Title: Slice Awareness of Availability during Mobility.
R3-171251 3GPP TSG-RAN WG3 #95bis, Spokane, USA, Apr. 3-7, 2017, Source: Huawi, Title: Further Discussion on Slice Re-mapping.
R3-171252 3GPP TSG-RAN WG3 #95bis, Spokane, USA, Apr. 3-7, 2017, Source: Huawei, Title: Dual Connectivity for Slicing.
R3-171351 3GPP TSG-RAN WG3 #95bis, Spokane, USA, Apr. 3-7, 2017, Source: LG Electronics Inc., Title: TP for exchange of NSSAI in Xn Setup Procedure.
R3-171353 3GPP TSG-RAN WG3 #95bis, Spokane, USA, Apr. 3-7, 2017, Source: Ericsson, Title: RAN aspects of NW slicing in Stage 2 specifications.
R3-171394 3GPP TSG-RAN WG3 #95bis, Spokane, USA, Apr. 3-7, 2017, Source: RAN3, Title: LS regarding RAN support for NW slicing.
R3-171395 3GPP TSG-RAN WG3 #95bis, Spokane, USA, Apr. 3-7, 2017, Source: Ericsson, Title: Stage 2 aspects of CN Instance selection signalling.
R3-171396 3GPP TSG-RAN WG3 #95bis, Spokane, USA, Apr. 3-7, 2017, Source: Ran WG3, Title: LS on slice remapping during connected mode mobility.
3GPP TS 36.423 V14.2.0 (Mar. 2017); 3rd Generation Partnership Project; Technical Specification Group Radio Access Network; Evolved Universal Terrestrial Radio Access Network (E-Utran); X2 application protocol (X2AP) (Release 14).
3GPP TS 22.261 V15.1.0 (Jun. 2017); Technical Specification; 3rd Generation Partnership Project; Technical Specification Group Services and System Aspects; Service Requirements for the 5G System; Stage 1 (Release 15).

(56) References Cited

OTHER PUBLICATIONS

3GPP TS 23.501 V1.2.0 (Jul. 2017); Technical Specification; 3rd Generation Partnership Project; Technical Specification Group Services and System Aspects; System Architecture for the 5G System; Stage 2 (Release 15).
3GPP TS 23.502 V0.5.0 (Jul. 2017); Technical Specification; 3rd Generation Partnership Project; Technical Specification Group Services and System Aspects; Procedures for the 5G System; Stage 2 (Release 15).
3GPP TR 23.799 V14.0.0 (Dec. 2016); Technical Report; 3rd Generation Partnership Project; Technical Specification Group Services and System Aspects; Study on Architecture for the Next Generation System (Release 14).
R2-11Xxxx, 3GPP TSG-RAN WG2 #73, Taipei, Taiwan, Feb. 21-25, 2011, Source: InterDigital Communications, Title: Report of Email discussion #26 on Scell Activation in LTE CA.
5G White Paper by Next Generation Mobile Networks (NGMN) Alliance, Version 1.0, Feb. 17, 2015.
S2-174201, SA WG2 Meeting #122; San Jose, Mexico, Jun. 26-30, 2017; Source: Ericsson; Title: Slice co-existence.

\* cited by examiner

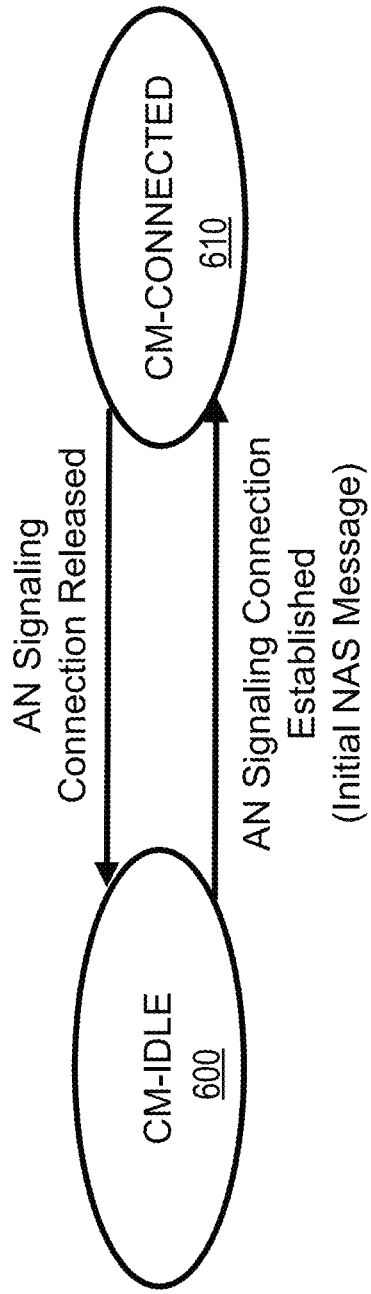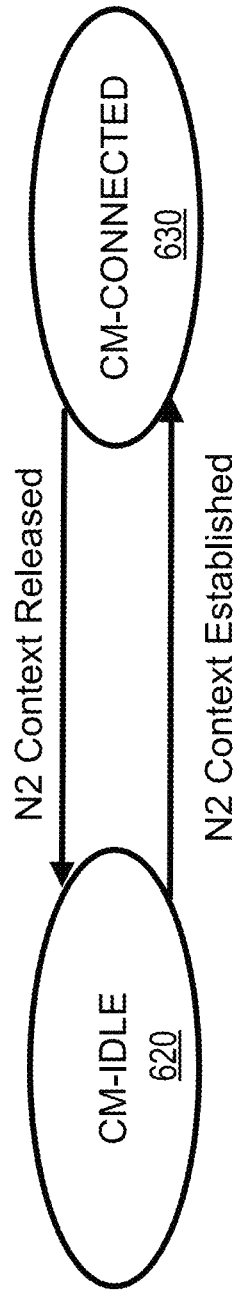

THIRD PARTY CHARGING IN A WIRELESS NETWORK

CROSS-REFERENCE TO RELATED APPLICATIONS

This application claims the benefit and is a continuation of U.S. application Ser. No. 16/102,316, filed Aug. 13, 2018, which claims the benefit of U.S. Provisional Application No. 62/544,518, filed Aug. 11, 2017, each disclosure of which is hereby incorporated by reference in its entirety.

BACKGROUND

A wireless network may provide a variety of mobile devices to communicate using wireless communication channels. Base stations within the network may provide wireless signal coverage for transmission of a variety of data. Network slicing may be used for different device or service types by, for example, creating virtual networks out of physical network resources.

SUMMARY

The following summary presents a simplified summary of certain features. The summary is not an extensive overview and is not intended to identify key or critical elements.

Systems, apparatuses, and methods are described for the establishment of dedicated network slices. Operators may use network slicing to support multiple parties that require similar network characteristics. A network may provide an operator an interface to configure the associations of services to network slices. An interface for the end-to-end management and orchestration entity may provide, for example, dedicated network slices for an application or the ability to map an application to existing network slices. Application initiated network slicing can be employed to allow interworking between wireless devices and application servers for different vendors that may have different implementations for network slicing. The interface can also allow the operators to support charging for user and for third parties. This can allow the third party to provide some services to the user freely (e.g. advertisement) so that the services may benefit to the third party, the users, and the operator.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIGS. 6A-B shows examples of connection management state models for wireless device and AMF.

DETAILED DESCRIPTION

Figure 1:
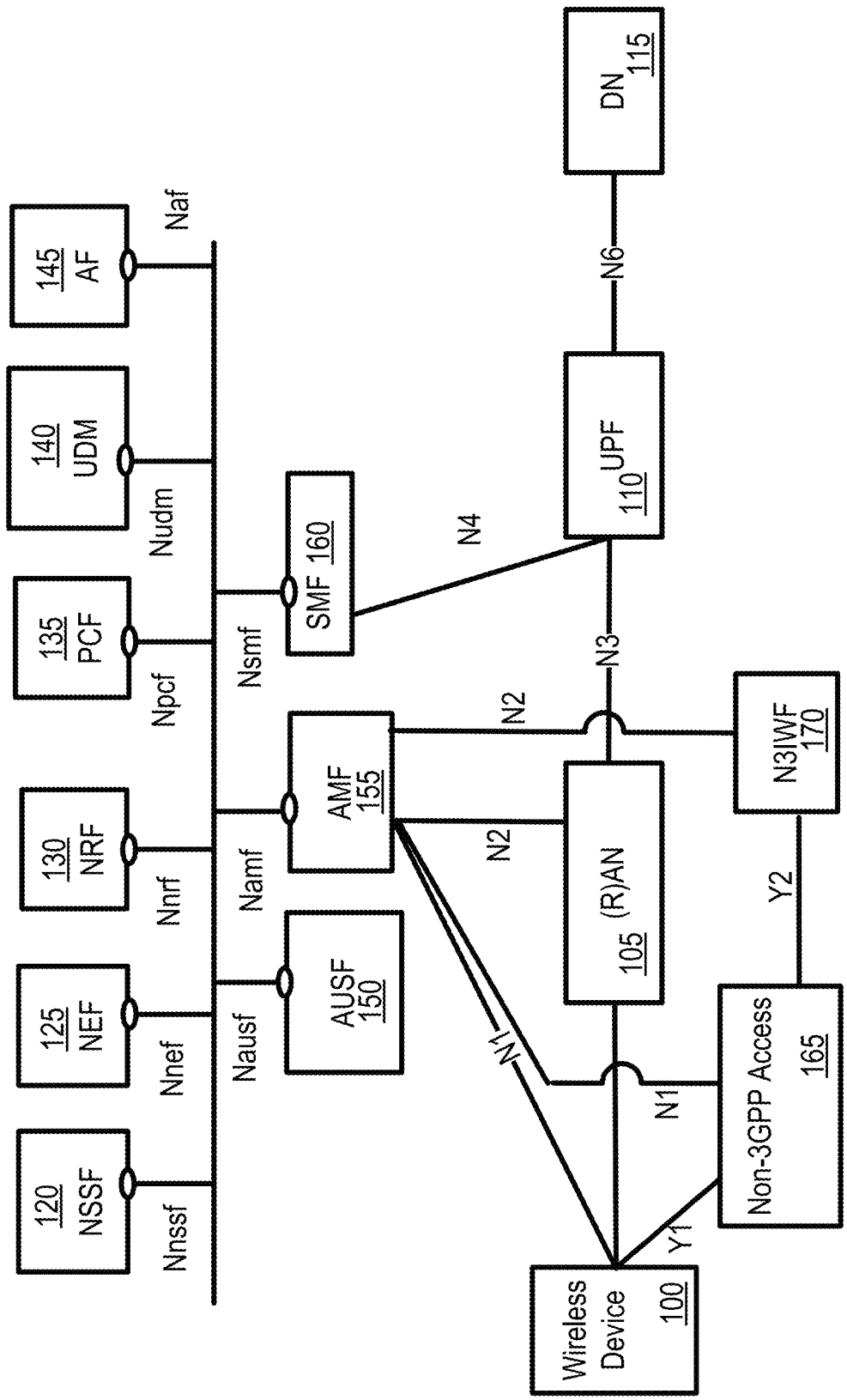
FIG. 1 shows an example 5G system architecture.

The accompanying drawings, which form a part hereof, show examples of the disclosure. It is to be understood that the examples shown in the drawings and/or discussed herein are non-exclusive and that there are other examples of how the disclosure may be practiced. Examples may provide implementation of enhanced features and functionalities in networks, such as 5G networks, or other systems. The technology disclosed herein may be employed in the technical field of networks, such as 5G systems, and network slicing for communication systems. More particularly, the technology disclosed herein may relate to for network slicing in communication systems such as 5GC, 5G, or other systems. The communication systems may comprise any number and/or type of devices, such as, for example, computing devices, wireless devices, mobile devices, handsets, tablets, laptops, internet of things (Iota) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices.

The following acronyms are used throughout the present disclosure, provided below for convenience although other acronyms may be introduced in the detailed description.

5G 5th generation mobile networks
5GC 5G Core Network
5GS 5G System
5G-AN 5G Access Network
5QI 5G QoS Indicator
AF Application Function
AMF Access and Mobility Management Function
AN Access Network
AUSF Authentication Server Function
CDR Charging Data Record
CCNF Common Control Network Functions
CP Control Plane
DL Downlink
DN Data Network
DNN Data Network Name
eNB Evolved Node B
gNB Next Generation Node B
HPLMN Home Public Land Mobile Network
LADN Local Area Data Network
LI Lawful Intercept
MICO Mobile Initiated Connection Only
N3IWF Non-3GPP InterWorking Function
NAI Network Access Identifier
NAS Non Access Stratum
NEF Network Exposure Function
NF Network Function
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet Data Unit
PLMN Public Land Mobile Network
(R)AN (Radio) Access Network
RAT Radio Access Technology
RRC Radio Resource Control
QFI QoS Flow Identity
RM Registration Management
SBA Service Based Architecture
SEA Security Anchor Function
SCM Security Context Management
SMF Session Management Function
SMSF SMS Function
S-NSSAI Single Network Slice Selection Assistance information
UDM Unified Data Management
UE User Equipment
UL Uplink
UL CL Uplink Classifier
UPF User Plane Function
VPLMN Visited Public Land Mobile Network 5G access network may comprise an access network connecting to a 5GC. An access network may comprise a NG-RAN 105 and/or non-3GPP AN 165. An example 5GC may connect to one or more 5G access networks 5G-AN and/or NG-RANs. The 5GC may comprise functional elements or network functions as in example FIG. 1 and example FIG. 2 where interfaces are employed for communication among the functional elements and/or network elements. A network function may be a processing function in a network that has a functional behavior and interfaces. A network function may be implemented as a network element on a dedicated hardware, a base station, and/or as a software instance running on a dedicated hardware, shared hardware, and/or as a virtualized function instantiated on an appropriate platform.

The access and mobility management function AMF 155 may comprise the following functionalities: termination of (R)AN CP interface (N2), termination of NAS (N1), NAS ciphering and integrity protection, registration management, connection management, reachability management, mobility management, lawful intercept (for AMF events and interface to LI system), provide transport for session management, SM messages between wireless device 100 and SMF 160, transparent proxy for routing SM messages, access authentication, access authorization, provide transport for SMS messages between wireless device 100 and SMSF, security anchor function, SEA, interaction with the AUSF 150 and the wireless device 100, receiving the intermediate key established as a result of the wireless device 100 authentication process, security context management, SCM, and/or receiving a key from the SEA that it uses to derive access network specific keys. A variety of these functionalities may be supported in a single instance of an AMF 155 and/or in multiple instances of AMF 155 as appropriate.

The AMF 155 may support non-3GPP access networks through N2 interface with N3IWF 170, NAS signaling with a wireless device 100 over N3IWF 170, authentication of wireless devices connected over N3IWF 170, management of mobility, authentication, and separate security context state(s) of a wireless device 100 connected via non-3GPP access 165 or connected via 3GPP and non-3GPP accesses 105, 165 simultaneously, support of a coordinated RM context valid over 3GPP access 105 and non-3GPP access 165, and/or support of context management (CM) management contexts for the wireless device 100 for connectivity over non-3GPP access. Some functionalities described above may be supported in an instance of a network slice. An AMF 155 region may comprise of one or multiple AMF 155 sets. AMF 155 set may comprise of some AMFs 155 that serve a given area and/or network slice(s). Multiple AMF 155 sets may be per AMF 155 region and/or network slice(s). Application identifiers may be mapped to one or more specific application traffic detection rules. A configured NSSAI may be a NSSAI that has been provisioned in a wireless device 100. DN 115 access identifier (DNAI), for a DNN, may be an identifier of a user plane access to a DN 115. Initial registration may be related to a wireless device 100 registration in a RM-DEREGISTERED state. N2AP wireless device 100 association may be a logical per wireless device 100 association between a 5G AN node and an AMF 155. Wireless device 100 may comprise a N2AP wireless device-TNLA-binding, which may be a binding between a N2AP wireless device 100 association and a specific transport network layer (TNL) association for a given wireless device 100.

The session management function (SMF) 160 may comprise one or more of the following functionalities: session management (e.g. session establishment, modify and release, comprising tunnel maintain between UPF 110 and AN 105 node), wireless device IP address allocation & management (comprising optional authorization), selection and control of UP function(s), configuration of traffic steering at UPF 110 to route traffic to its proper destination, termination of interfaces towards policy control functions, control part of policy enforcement and QoS, lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), and/or support for interaction with external DN 115 for transport of signaling for PDU session authorization/authentication by external DN 115. One or more of these functionalities may be supported in a single instance of a SMF 160. One or more of the functionalities described above may be supported in an instance of a network slice.

The user plane function (UPF) 110 may comprise one or more of the following functionalities: anchor point for Intra-/Inter-RAT mobility (if applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, and/or downlink data notification triggering. One or more of these functionalities may be supported in a single instance of a UPF 110. One or more of functionalities described above may be supported in an instance of a network slice. User plane function(s) (UPF(s) 110) may handle the user plane path of PDU sessions. A UPF 110 that provides the interface to a data network supports the functionality of a PDU session anchor.

IP address management may comprise allocation and release of the wireless device IP address as well as renewal of the allocated IP address. The wireless device 100 sets the requested PDU type during the PDU session establishment procedure based on its IP stack capabilities and configuration. The SMF 160 may select PDU type of a PDU session as follows: if the SMF 160 receives a request with PDU type set to IP, the SMF 160 may select either PDU type IPv4 or IPv6 based on DNN configuration and/or operator policies. The SMF 160 may also provide a cause value to the wireless device 100 to indicate whether the other IP version (e.g. IPv6 if IPv4 is selected and vice versa) may be supported on the DNN. If the other IP versions are supported, wireless device 100 may request another PDU session to the same DNN for the other IP version. If the SMF 160 receives a request for PDU type IPv4 or IPv6 and the requested IP version may be supported by the DNN, the SMF 160 selects the requested PDU type. The 5GC elements and wireless device 100 support the following mechanisms: during PDU session establishment procedure, the SMF 160 may send the IP address to the wireless device 100 via SM NAS signaling. The IPv4 address allocation and/or IPv4 parameter configuration via DHCPv4 may also be used if the PDU session may be established. IPv6 prefix allocation may be supported via IPv6 stateless auto configuration, if IPv6 may be supported. IPv6 parameter configuration via stateless DHCPv6 may also be supported. The 5GC may support the allocation of a static IPv4 address and/or a static IPv6 prefix based on subscription information in the UDM 140 or based on the configuration on a per-subscriber, per-DNN basis.

The policy control function PCF 135 may support unified policy framework to govern network behavior, provide policy rules to control plane function(s) to enforce them, and/or implement a front end to access subscription information relevant for policy decisions in a user data repository (UDR). The unified data management UDM 140 may comprise an application front end (FE) that comprises the UDM-FE, that may be in charge of processing credentials, location management, and/or subscription management. The PCF 135 may be in charge of policy control and the user data repository (UDR) that stores data required for functionalities provided by UDM-FE, plus policy profiles required by the PCF 135. The data stored in the UDR may comprise at least user subscription data, comprising at least subscription identifiers, security credentials, access and mobility related subscription data, session related subscription data, and/or policy data.

The network exposure function NEF 125 may provide a means to securely expose the services and capabilities provided by the 3GPP network functions, translate between information exchanged with the AF 145 and information exchanged with the internal network functions, and/or receive information from other network functions.

The NF repository function NRF 130 may support a service discovery function that receives NF discovery requests from a NF instance, provides the information of the discovered NF instances to the NF instance, and/or maintains the information of available NF instances and their supported services.

The network slice selection function NSSF 120 may support selecting the set of network slice instances serving the wireless device 100, determining the provided NSSAI, determining the AMF 155 set to be employed to serve the wireless device 100, and/or, based on configuration, determining a list of candidate AMF(s) 155, possibly by querying the NRF 130.

The functionality of non-3GPP interworking function N3IWF 170 for non-3GPP access 165 may comprise at least one or more of the following: supporting of IPsec tunnel establishment with the wireless device, terminating the IKEv2/IPsec protocols with the wireless device 100 over NWu, relaying over N2 the information needed to authenticate the wireless device 100 and authorize its access to the 5GC, terminating of N2 and N3 interfaces to 5GC for control-plane and user-plane respectively, relaying uplink and downlink control-plane NAS (N1) signaling between the wireless device 100 and AMF 155, handling of N2 signaling from SMF 160 (which may be relayed by AMF 155) related to PDU sessions and QoS, establishing of IPsec security association (IPsec SA) to support PDU session traffic, relaying uplink and downlink user-plane packets between the wireless device 100 and UPF 110, enforcing QoS corresponding to N3 packet marking, considering QoS requirements associated to such marking received over N2, N3 user-plane packet marking in the uplink, local mobility anchor within untrusted non-3GPP access networks 165 using MOBIKE, and/or supporting AMF 155 selection.

The application function AF 145 may interact with the 3GPP core network to provide a variety of services. Based on operator deployment, AF 145 may be trusted by the operator to interact directly with relevant network functions. Application functions not provided by the operator to access directly the network functions may use the external exposure framework (via the NEF 125) to interact with relevant network functions.

The control plane interface between the (R)AN 105 and the 5GC may support connection of multiple different kinds of ANs, such as 3GPP (R)AN 105 and/or N3IWF 170, to the 5GC via a unique control plane protocol. A single N2 AP protocol may be employed for both the 3GPP access 105 and non-3GPP access 165 and/or for decoupling between AMF 155 and other functions such as SMF 160 that may need to control the services supported by AN(s) (e.g. control of the UP resources in the AN 105 for a PDU session). The 5GC may be able to provide policy information from the PCF 135 to the wireless device 100. Such policy information may comprise the following: access network discovery & selection policy, wireless device route selection policy (URSP) that groups to or more of SSC mode selection policy (SSCMSP), network slice selection policy (NSSP), DNN selection policy, and/or non-seamless offload policy. The 5GC may support the connectivity of a wireless device 100 via non-3GPP access networks 165. As shown in example FIG. 5, the registration management, RM may be employed to register or de-register a wireless device 100 with the network, and establish the user context in the network. Connection management may be employed to establish and release the signaling connection between the wireless device 100 and the AMF 155.

Figure 8A:
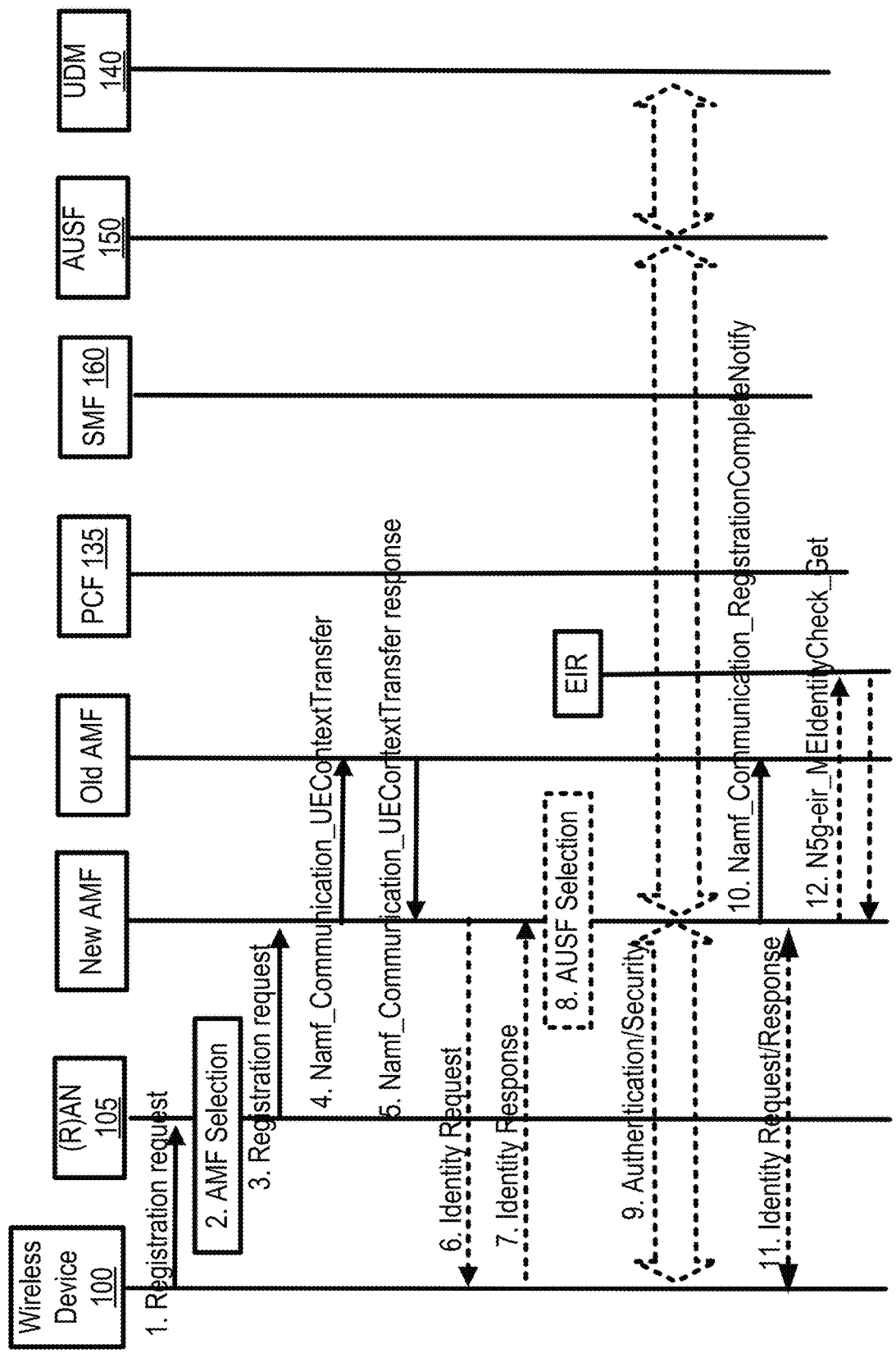
FIGS. 8A-B shows examples of registration procedures.
Figure 8B:
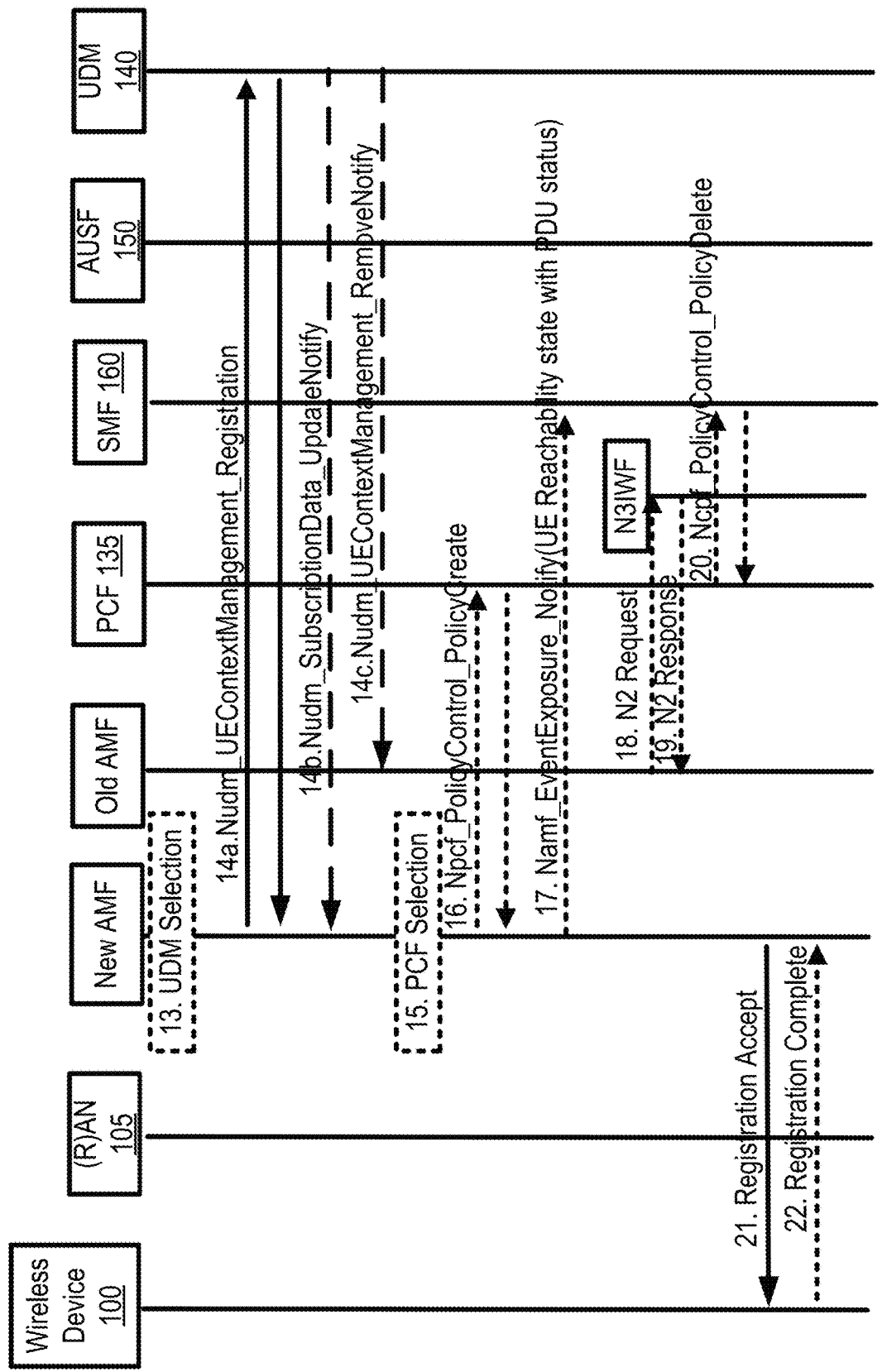

A wireless device 100 may need to register with the network to receive services that require registration. The wireless device 100 may update its registration with the network, e.g., periodically, after the wireless device is registered, to remain reachable (e.g. periodic registration update), on mobility (e.g. mobility registration update), and/or to update its capabilities or re-negotiate protocol parameters. The initial registration procedure, as depicted in example FIG. 8A and FIG. 8B, may involve execution of network access control functions (e.g. user authentication and access authorization based on subscription profiles in UDM 140). As result of the registration procedure, the identity of the serving AMF 155 may be registered in UDM 140. The registration management (RM) procedures may be applicable over both 3GPP access 105 and non-3GPP access 165. Systems and methods for connection, registration, and mobility management procedures that can be utilized as shown in FIGS. 8A-B are described in "5G; Procedures for the 5G System," ETSI TS 123 502 version 15.2.0, also 3GPP TS 23.502 version 15.2.0 Release 15, dated June 2018 and published by the European Telecommunications Standards Institute.

Figure 3:
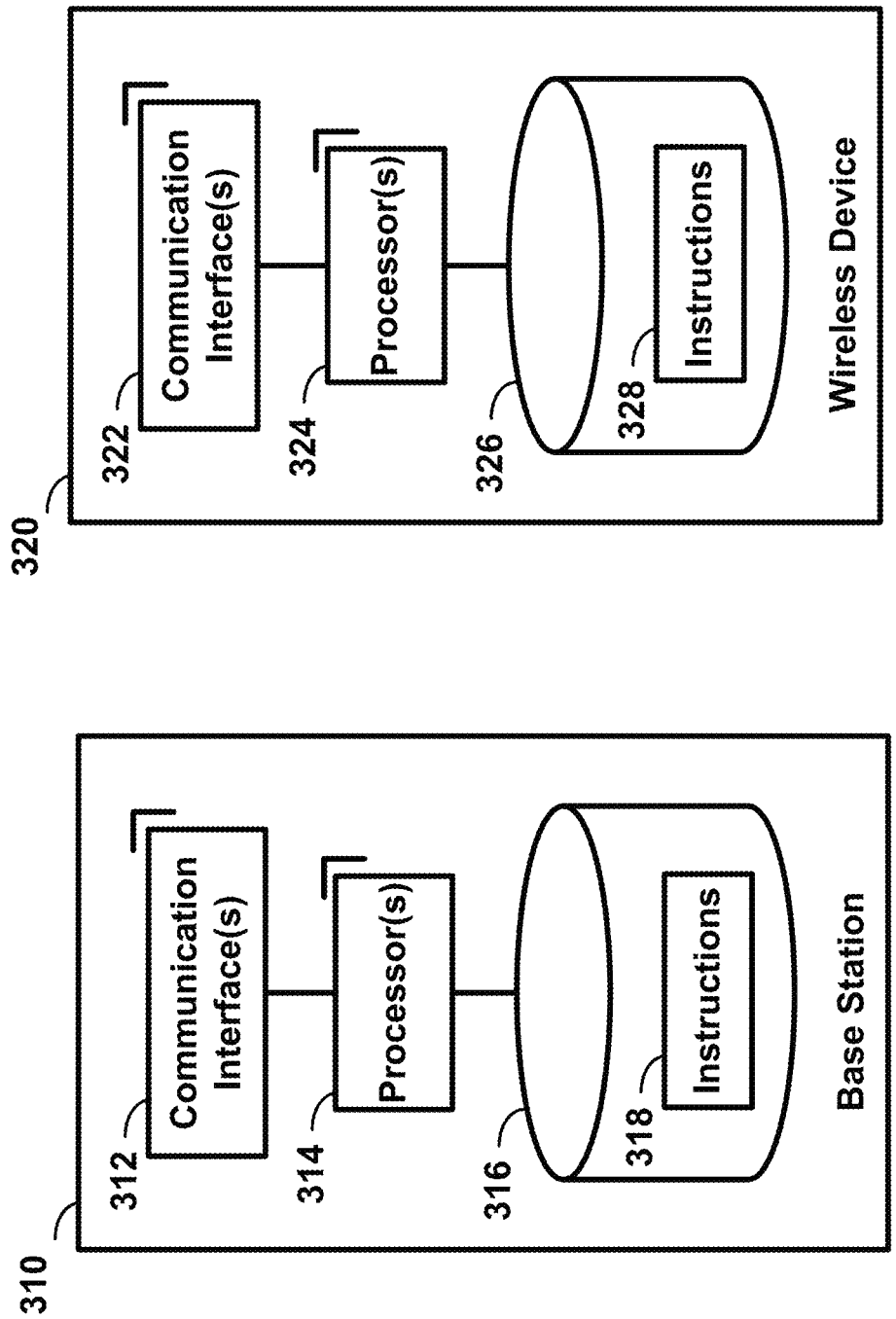
FIG. 3 shows an example of a wireless device and a base station.

FIG. 3 shows an example of hardware elements of a base station 310 and a wireless device 320. A communication network may comprise at least one base station 310 and at least one wireless device 320. The base station 310 may comprise at least one communication interface 312, one or more processors 314, and at least one set of program code instructions 318 stored in non-transitory memory 316 and executable by the one or more processors 314. The wireless device 320 may comprise at least one communication interface 322, one or more processors 324, and at least one set of program code instructions 328 stored in non-transitory memory 326 and executable by the one or more processors 324. A communication interface 312 in the base station 310 may be configured to engage in communication with a communication interface 322 in the wireless device 320, such as via a communication path that comprises at least one wireless link. The wireless link may be a bi-directional link. The communication interface 322 in the wireless device 320 may also be configured to engage in communication with the communication interface 312 in the base station 310. The base station 310 and the wireless device 320 may be configured to send and receive data over the wireless link using multiple frequency carriers.

Figure 4:
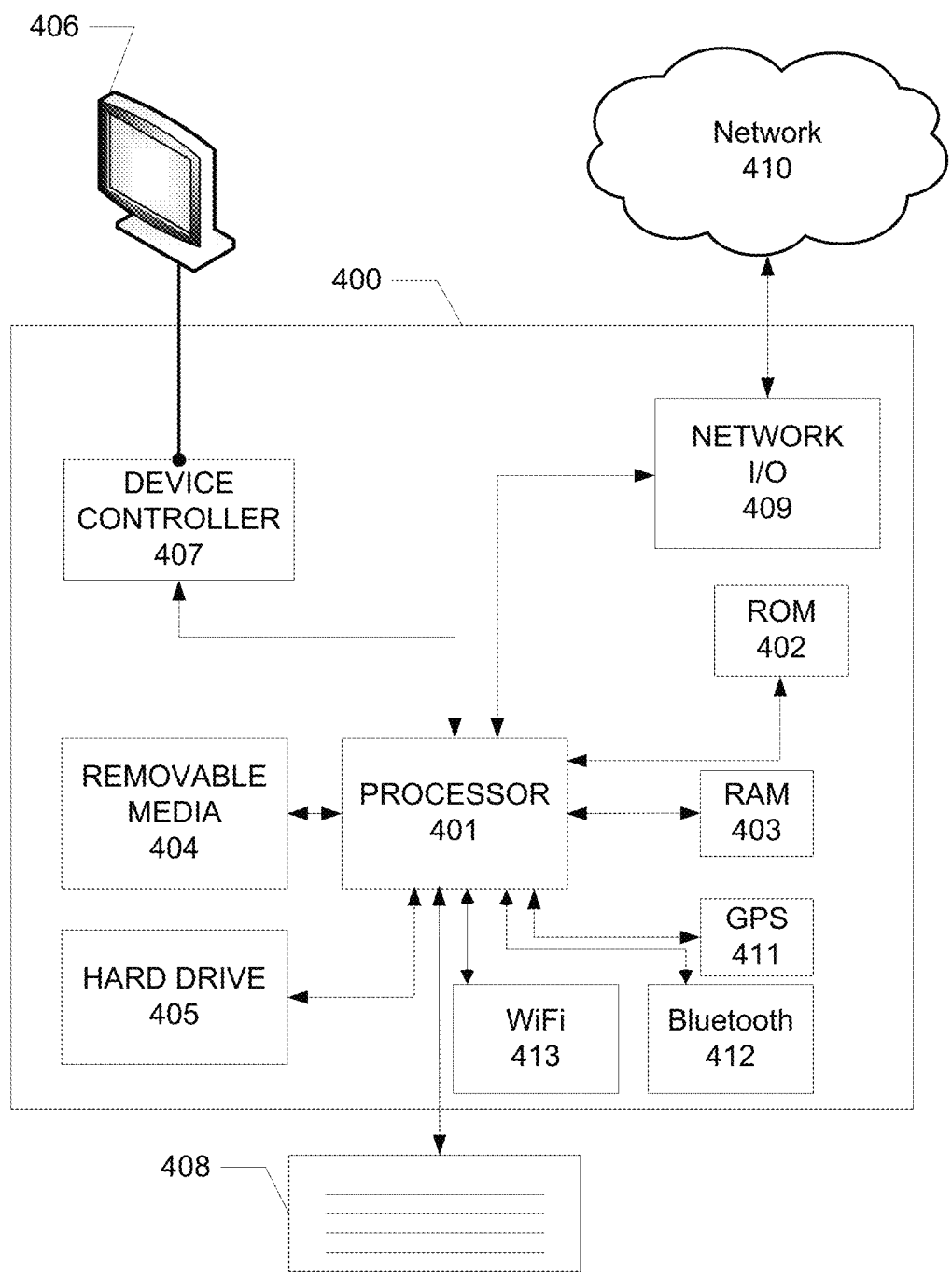
FIG. 4 shows example elements of a computing device that may be used to implement any of the various devices described herein.

FIG. 4 shows general hardware elements that may be used to implement any of the various computing devices discussed herein, including any base station, wireless device, or computing device. The computing device 400 may include one or more processors 401, which may execute instructions stored in the random access memory (RAM) 403, the removable media 404 (such as a Universal Serial Bus (USB) drive, compact disk (CD) or digital versatile disk (DVD), or floppy disk drive), or any other desired storage medium. Instructions may also be stored in an attached (or internal) hard drive 405. The computing device 400 may also include a security processor (not shown), which may execute instructions of a one or more computer programs to monitor the processes executing on the processor 401 and any process that requests access to any hardware and/or software components of the computing device 400 (e.g., ROM 402, RAM 403, the removable media 404, the hard drive 405, the device controller 407, a network interface 409, a GPS 411, a Bluetooth interface 412, a WiFi interface 413, etc.). The computing device 400 may include one or more output devices, such as the display 406 (e.g., a screen, a display device, a monitor, a television, etc.), and may include one or more output device controllers 407, such as a video processor. There may also be one or more user input devices 408, such as a remote control, keyboard, mouse, touch screen, microphone, etc. The computing device 400 may also include one or more network interfaces, such as a network interface 409, the may be a wired interface, a wireless interface, or a combination of the two. The network interface 409 may provide an interface for the computing device 400 to communicate with a network 410 (e.g., a RAN, or any other network). The network interface 409 may include a modem (e.g., a cable modem), and the external network 400 may include communication links, an external network, an in-home network, a provider's wireless, coaxial, fiber, or hybrid fiber/coaxial distribution system (e.g., a DOCSIS network), or any other desired network. Additionally, the computing device 400 may include a location-detecting device, such as a global positioning system (GPS) microprocessor 411, which may be configured to receive and process global positioning signals and determine, with possible assistance from an external server and antenna, a geographic position of the computing device 400.

The example in FIG. 4 is a hardware configuration, although the components shown may be implemented as software as well. Modifications may be made to add, remove, combine, divide, etc. components of the computing device 400 as desired. Additionally, the components may be implemented using basic computing devices and components, and the same components (e.g., processor 401, ROM storage 402, display 406, etc.) may be used to implement any of the other computing devices and components described herein. For example, the various components described herein may be implemented using computing devices having components such as a processor executing computer-executable instructions stored on a computer-readable medium, as shown in FIG. 4. Some or all of the entities described herein may be software based, and may coexist in a common physical platform (e.g., a requesting entity may a separate software process and program from a dependent entity, both of which may be executed as software on a common computing device).

Base stations, wireless devices, relay nodes, and other communication devices may comprise one or more transceivers. A transceiver may be a device that comprises both a transmitter and receiver. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment. Although one or more of the above types of devices may be referenced herein (e.g., user equipment, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., a wireless device, base station, eNB, gNB, computing device, etc.), in one or more networks, but it will be understood that one or more features and/or steps may be implemented on any device and/or in any network. As used throughout, the term "base station" may comprise one or more of: a base station, a node, a Node B, a gNB, an eNB, am ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

Figure 5A:
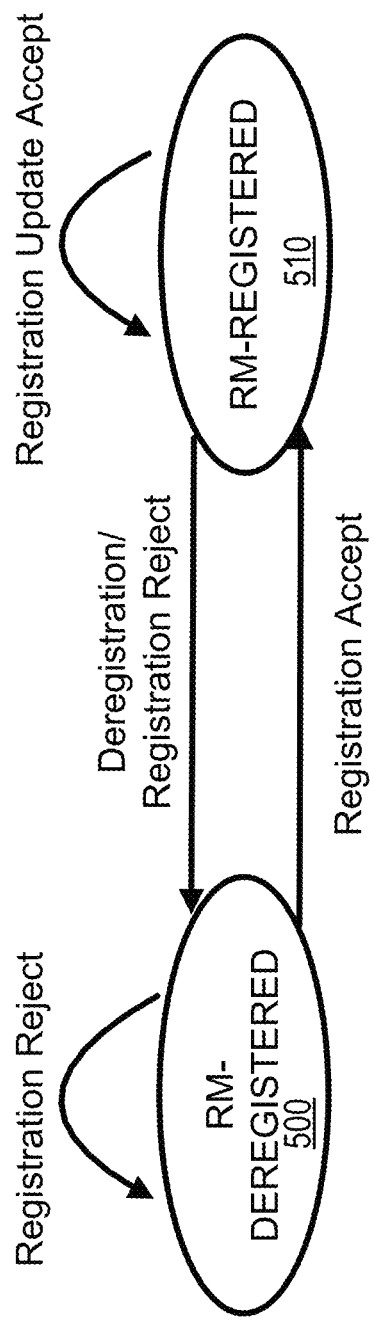
FIGS. 5A-B shows examples of registration management state models for a wireless device and access and mobility management function (AMF).
Figure 5B:
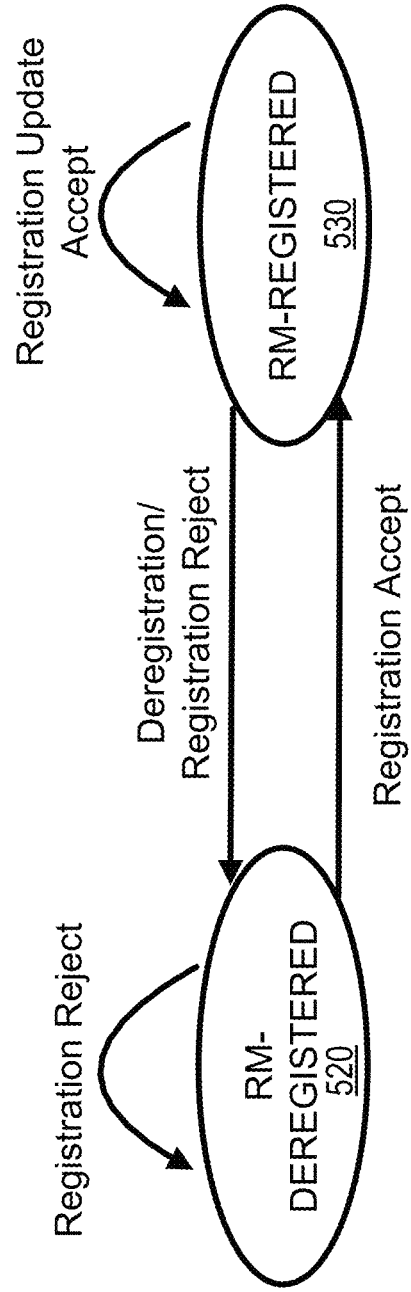

FIGS. 5A-B depict examples of the RM states of a wireless device 100 as observed by the wireless device 100 and AMF 155 respectively. In FIG. 5A, two RM states may be used in a wireless device 100 and the AMF 155 that reflect the registration status of the wireless device 100 in the selected PLMN: RM-DEREGISTERED 500, and RM-REGISTERED 510. In the RM DEREGISTERED state 500, the wireless device 100 may not be registered with the network. The wireless device 100 context in AMF 155 may not hold valid location or routing information for the wireless device 100 so the wireless device 100 may be not reachable by the AMF 155. Some wireless device 100 context may still be stored in the wireless device 100 and the AMF 155. In the RM REGISTERED state 510, the wireless device 100 may be registered with the network. In the RM-REGISTERED 510 state, the wireless device 100 may receive services that require registration with the network. In FIG. 5B, two RM states may be used in AMF 155 for a wireless device 100 that reflect the registration status of the wireless device 100 in the selected PLMN: RM-DEREGISTERED 520 and RM-REGISTERED 530.

FIGS. 6A-B depict examples of CM state transitions as observed by the wireless device 100 and AMF 155 respectively. Connection management CM may comprise the functions of establishing and releasing a signaling connection between a wireless device 100 and the AMF 155 over N1. This signaling connection may be used to provide NAS signaling exchange between the wireless device 100 and a core network. It may comprise both the AN signaling connection between the wireless device 100 and/or the (R)AN 105 (e.g. RRC connection over 3GPP access) and the N2 connection for this wireless device 100 between the AN and the AMF 155. As depicted in FIG. 6A, two CM states may be used for the NAS signaling connectivity of the wireless device 100 with the AMF 155, CM-IDLE 600, 620 and CM-CONNECTED 610, 630. A wireless device 100 in CM-IDLE 600 state may be in RM-REGISTERED 510 state and has no NAS signaling connection established with the AMF 155 over N1. The wireless device 100 may perform cell selection, cell reselection and PLMN selection. A wireless device 100 in CM-CONNECTED 610 state has a NAS signaling connection with the AMF 155 over N1. RRC inactive state may apply to NG-RAN (e.g. it applies to NR and E-UTRA connected to 5G CN). The AMF 155, based on network configuration, may provide assistance information to the NG (R)AN 105, to assist the NG (R)AN's 105 decision whether the wireless device 100 may be sent to RRC inactive state. If a wireless device 100 may be CM-CONNECTED 610 with RRC inactive state, the wireless device 100 may resume the RRC connection (e.g. due to uplink data pending), may execute a mobile initiated signaling procedure (e.g. as a response to (R)AN 105 paging), and/or notify the network that it has left the (R)AN 105 notification area. NAS signaling connection management may comprise the functions of establishing and releasing a NAS signaling connection. NAS signaling connection establishment function may be provided by the wireless device 100 and the AMF 155 to establish a NAS signaling connection for a wireless device 100 in CM-IDLE 600 state. The procedure of releasing a NAS signaling connection may be initiated by the 5G (R)AN 105 node or the AMF 155.

In FIG. 6B, two CM states may be used for a wireless device 100 at the AMF 155, CM-IDLE 620 and CM-CONNECTED 630. Reachability management of the wireless device 100 may detect whether a wireless device 100 may be reachable and/or provide the wireless device location (e.g. the access node in communication with the wireless device) for the network to reach the wireless device 100. This may be done by paging wireless device 100 and wireless device location tracking. The wireless device location tracking may comprise both wireless device registration area tracking and wireless device reachability tracking. Such functionalities may be either located at 5GC (e.g. for a CM-IDLE 620 state) or NG-RAN 105 (e.g. for a CM-CONNECTED 630 state). The wireless device 100 and the AMF 155 may negotiate wireless device 100 reachability characteristics in CM-IDLE 600, 620 state during registration and registration update procedures. A variety of wireless device reachability categories may be negotiated between a wireless device 100 and an AMF 155 for CM-IDLE 600, 620 state, such as wireless device 100 reachability providing mobile device terminated data. The wireless device 100 may be CM-IDLE 600 mode and mobile initiated connection only (MICO) mode. The 5GC may support a PDU connectivity service that provides exchange of PDUs between a wireless device 100 and a data network identified by a DNN. The PDU connectivity service may be supported via PDU sessions that may be established, e.g. after request from the wireless device 100.

A PDU session may support one or more PDU session types. PDU sessions may be established (e.g. after wireless device 100 request), modified (e.g. after wireless device 100 and 5GC request) and released (e.g. after wireless device 100 and 5GC request) using NAS SM signaling exchanged over N1 between the wireless device 100 and the SMF 160. The 5GC may be able to trigger a specific application in the wireless device 100 (e.g., after a request from an application server). If receiving that trigger message, the wireless device 100 may pass it to the identified application in the wireless device 100. The identified application in the wireless device 100 may establish a PDU session to a specific DNN.

Figure 7:
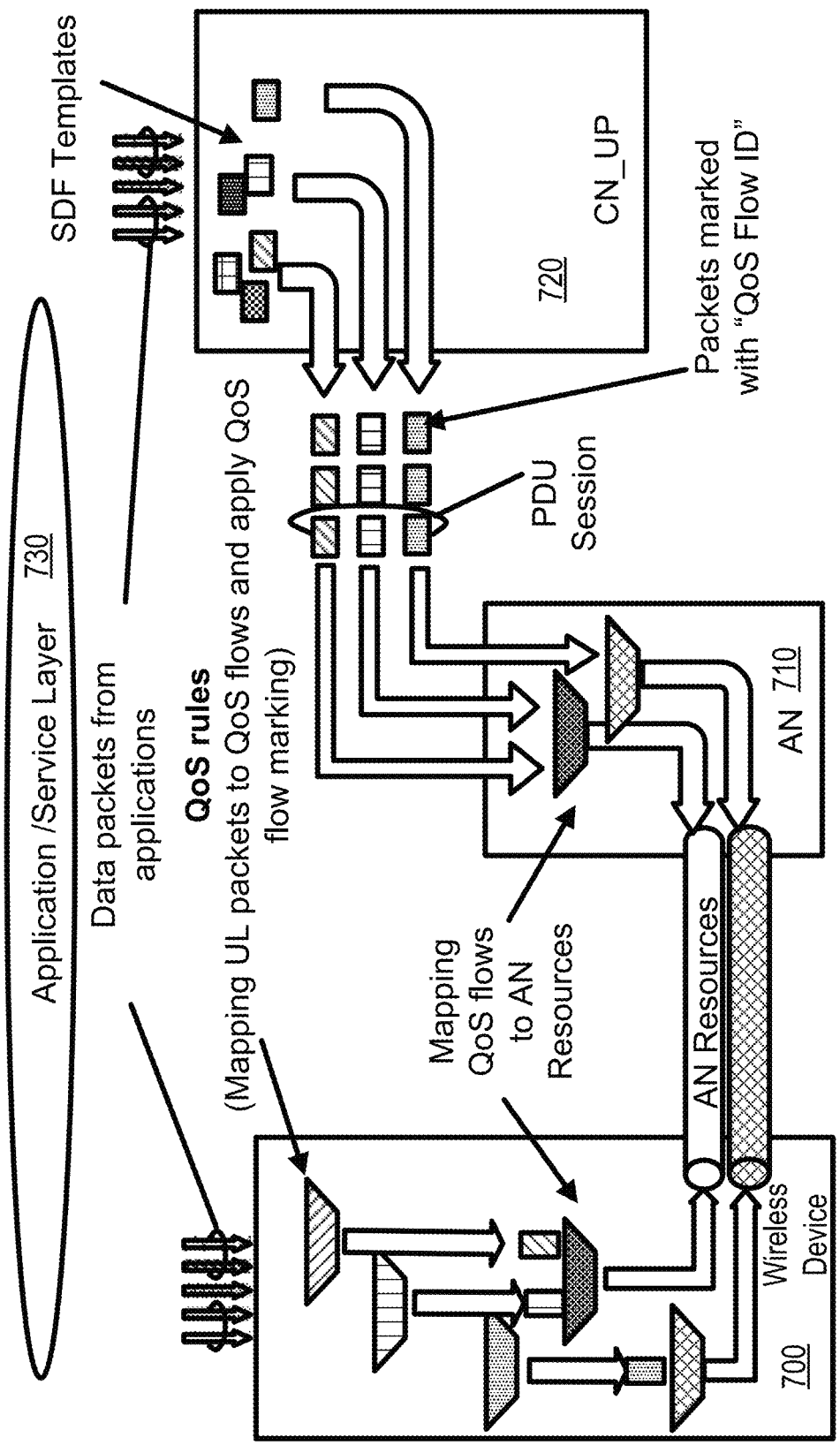
FIG. 7 shows an example for classification and marking traffic.

The 5G QoS model may support a QoS flow based framework, an example of which may be shown in FIG. 7. The 5G QoS model may support both QoS flows that require a guaranteed flow bit rate and QoS flows that may not require a guaranteed flow bit rate. The 5G QoS model may also support reflective QoS. The QoS model may comprise flow mapping or packet marking at the CN_UP 720, AN 710, and/or wireless device 700. Packets may arrive from and/or destined to the application/service layer 730 of wireless device 700, CN_UP 720, and/or the AF 145. QoS flow may be granular of QoS differentiation in a PDU session. A QoS Flow IDQFI may be used to identify a QoS flow in the 5G system. User plane traffic with the same QFI within a PDU session may receive the same traffic forwarding treatment. The QFI may be carried in an encapsulation header on N3 (and N9) e.g. without any changes to the end-to-end packet header. The QFI may be used with PDUs having different types of payload. The QFI may be unique within a PDU session.

The QoS parameters of a QoS flow may be provided to the (R)AN as a QoS profile over N2 at PDU session or at QoS flow establishment, and NG-RAN may be used if the user plane may be activated. A default QoS rule may be utilized for every PDU session. The SMF 160 may allocate the QFI for a QoS flow and may derive its QoS parameters from the information provided by the PCF. The SMF 160 may provide the QFI together with the QoS profile containing the QoS parameters of a QoS flow to the (R)AN 710. 5G QoS flow may be granular for QoS forwarding treatment in a 5G system. Traffic mapped to the same 5G QoS flow may receive the same forwarding treatment (e.g. scheduling policy, queue management policy, rate shaping policy, RLC configuration, and/or the like). Providing different QoS forwarding treatment may require separate 5G QoS flow. A 5G QoS indicator may be used as a reference to a specific QoS forwarding behavior (e.g. packet loss rate, packet delay budget) to be provided to a 5G QoS flow. This may be implemented in the access network by the 5QI referencing node specific parameters that control the QoS forwarding treatment (e.g. scheduling weights, admission thresholds, queue management thresholds, link layer protocol configuration, and/or the like.).

5GC may support edge computing and may provide operators and/or third party services to be hosted close to the wireless device access point of attachment. The 5GC may select a UPF 110 close to the wireless device 100 and may execute the traffic steering from the UPF 110 to the LADN via a N6 interface. This may be based on the wireless device subscription data, wireless device location, the information from application function AF 145, policy, and/or other related traffic rules. The 5GC may expose network information and capabilities to an edge computing application function. The functionality support for edge computing may comprise local routing where the 5GC may select UPF 110 to route the user traffic to the LADN, traffic steering where the 5GC selects the traffic to be routed to the applications in the LADN, session and service continuity to provide wireless device 100 and application mobility, user plane selection and reselection (e.g. based on input from application function), network capability exposure where 5GC and application function may provide information to each other via NEF, QoS and charging where PCF may provide rules for QoS control and charging for the traffic routed to the LADN, and/or support of local area data network where 5GC may provide support to connect to the LADN in a certain area where the applications are deployed.

An example 5G system may be a 3GPP system comprising of 5G access network 105, 5GC and a wireless device 100, and/or the like. Provided NSSAI may be an NSSAI provided by a serving PLMN during e.g. a registration procedure, indicating the NSSAI provided by the network for the wireless device 100 in the serving PLMN for the current registration area. A periodic registration update may be wireless device 100 re-registration at expiry of a periodic registration timer. A requested NSSAI may be a NSSAI that the wireless device 100 may provide to the network. A service based interface may represent how a set of services may be provided/exposed by a given NF.

A PDU connectivity service may provide exchange of PDUs between a wireless device 100 and a data network. PDU session may be an association between a wireless device 100 and a data network, DN that provides a PDU connectivity service. The type of association may be IP, Ethernet, or unstructured. Service continuity may comprise an uninterrupted user experience of a service, e.g. if the IP address and/or anchoring point change. Session continuity may comprise the continuity of a PDU session. For PDU session of IP type session continuity may imply that the IP address may be preserved for the lifetime of the PDU session. An uplink classifier may be a UPF functionality that aims at diverting uplink traffic, based on filter rules provided by SMF, towards data network.

The 5G system architecture may support data connectivity and services enabling deployments to use techniques such as, but not limited to, network function virtualization and/or software defined networking. The 5G system architecture may leverage service-based interactions between control plane (CP) network functions where identified. In 5G system architecture, separation of the user plane (UP) functions from the control plane functions may be considered. A 5G system may provide a network function to interact with other NF(s) directly if required. A 5G system may reduce dependencies between the access network (AN) and the core network (CN). The architecture may comprise a converged access-agnostic core network with a common AN-CN interface that integrates different 3GPP and non-3GPP access types. A 5G system furthermore may support a unified authentication framework, stateless NFs (e.g. where the compute resource may be decoupled from the storage resource), capability exposure, and/or concurrent access to local and centralized services. To support low latency services and access to LADNs, UP functions may be deployed close to the access network.

Figure 2:
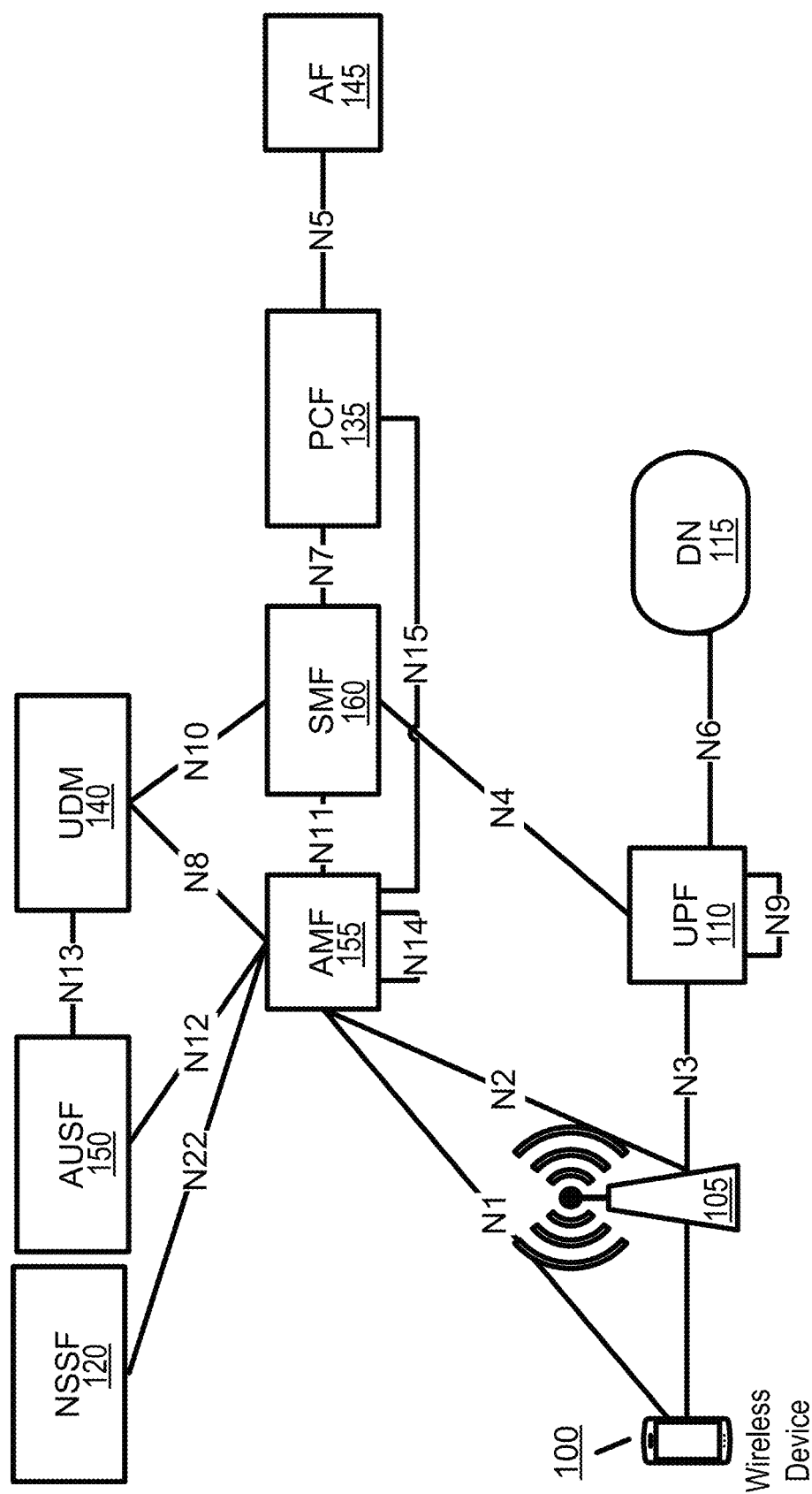
FIG. 2 shows an example 5G system architecture.

A 5G system may support roaming with both home routed traffic as well as local breakout traffic in the visited PLMN. An example 5G architecture may be service-based and the interaction between network functions may be represented in a variety of ways. FIG. 1 shows an example service-based representation, where network functions within the control plane, may provide other authorized network functions to access their services. This representation may also comprise point-to-point reference points where necessary. FIG. 2 shows an example reference point representation, showing the interaction between the NF services in the network functions described by point-to-point reference point (e.g. N11) between any two network functions.

Establishment of user plane connectivity to a data network via a network slice instance(s) may comprise performing a RM procedure to select an AMF 155 that supports the required network slices and establishing one or more PDU session(s) to the required data network via the network slice instance(s). The set of network slices for a wireless device 100 may be changed if the wireless device 100 may be registered with a network. The set of network slices for the wireless device 100 may be initiated by the network or the wireless device 100.

Figure 9:
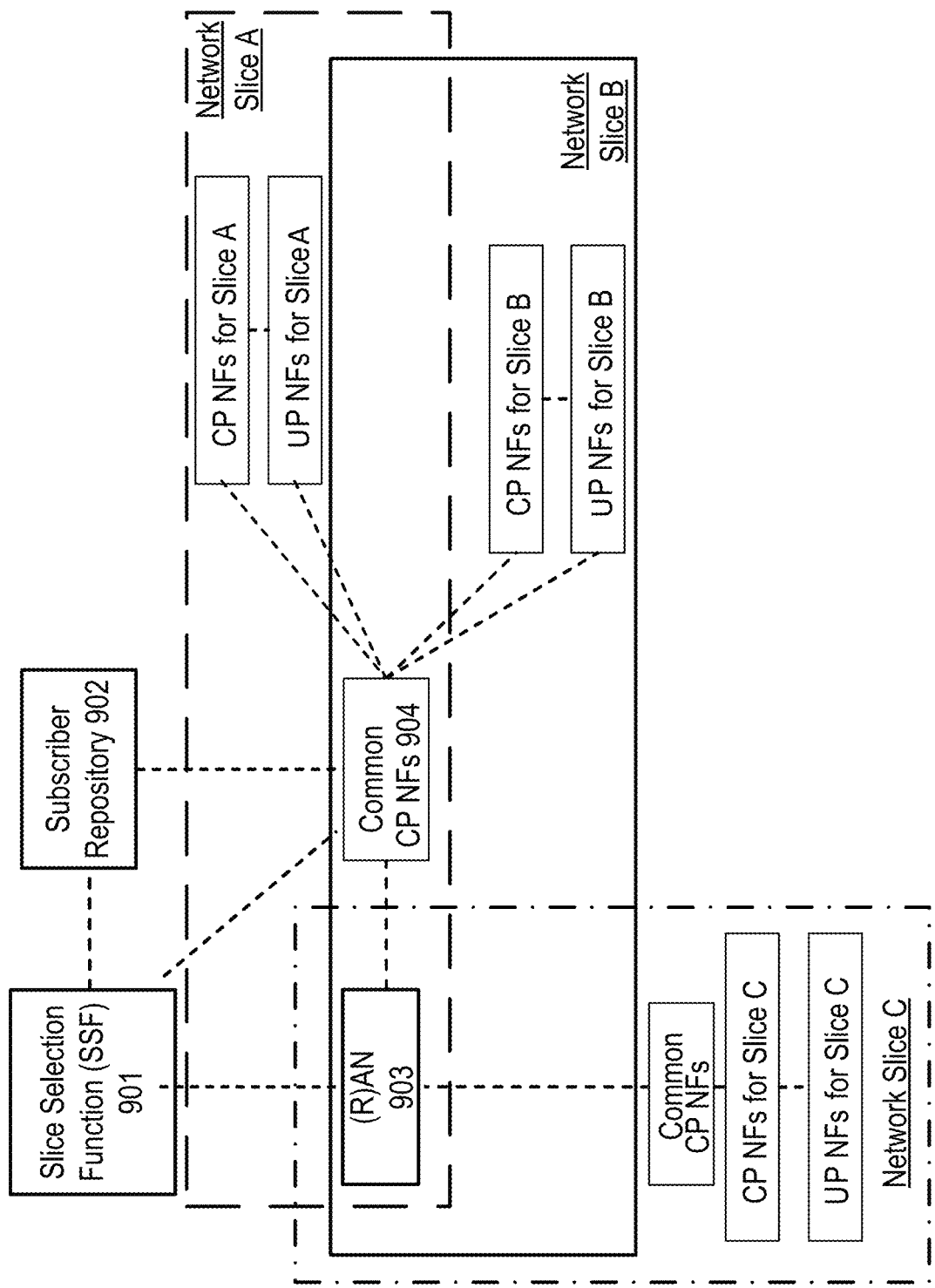
FIG. 9 shows an example of control plane interfaces for network slicing.

FIG. 9 shows an example of control plane interfaces for network slicing. Control plane network functions (CP NFs) and user plane network functions (UP NFs) are shown in FIG. 9 for slice A, slice B, and slice C. One or more (R)AN or core base stations may use a slice routing and selection function (SSF) 901 to link radio access bearer(s) of a wireless device with the corresponding core network instance(s). The subscriber repository 902 may contain subscriber profiles that may be used for authorization. The subscriber repository 902 may also comprise user identities and corresponding long-term credentials for authentication. The (R)AN 903 may appear as one RAT+PLMN to a wireless device and an association with network instance may be performed by the network internally. The network slices may not be visible to the wireless device. Common CP NFs 904 may be the CP entry function, which may comprise the mobility management function, authentication function, and/or NAS proxy function. The common CP may be shared parts among different slices. If different types of network slice perform the sharing, the required common CP function may be different for each type of network slice.

Figure 10:
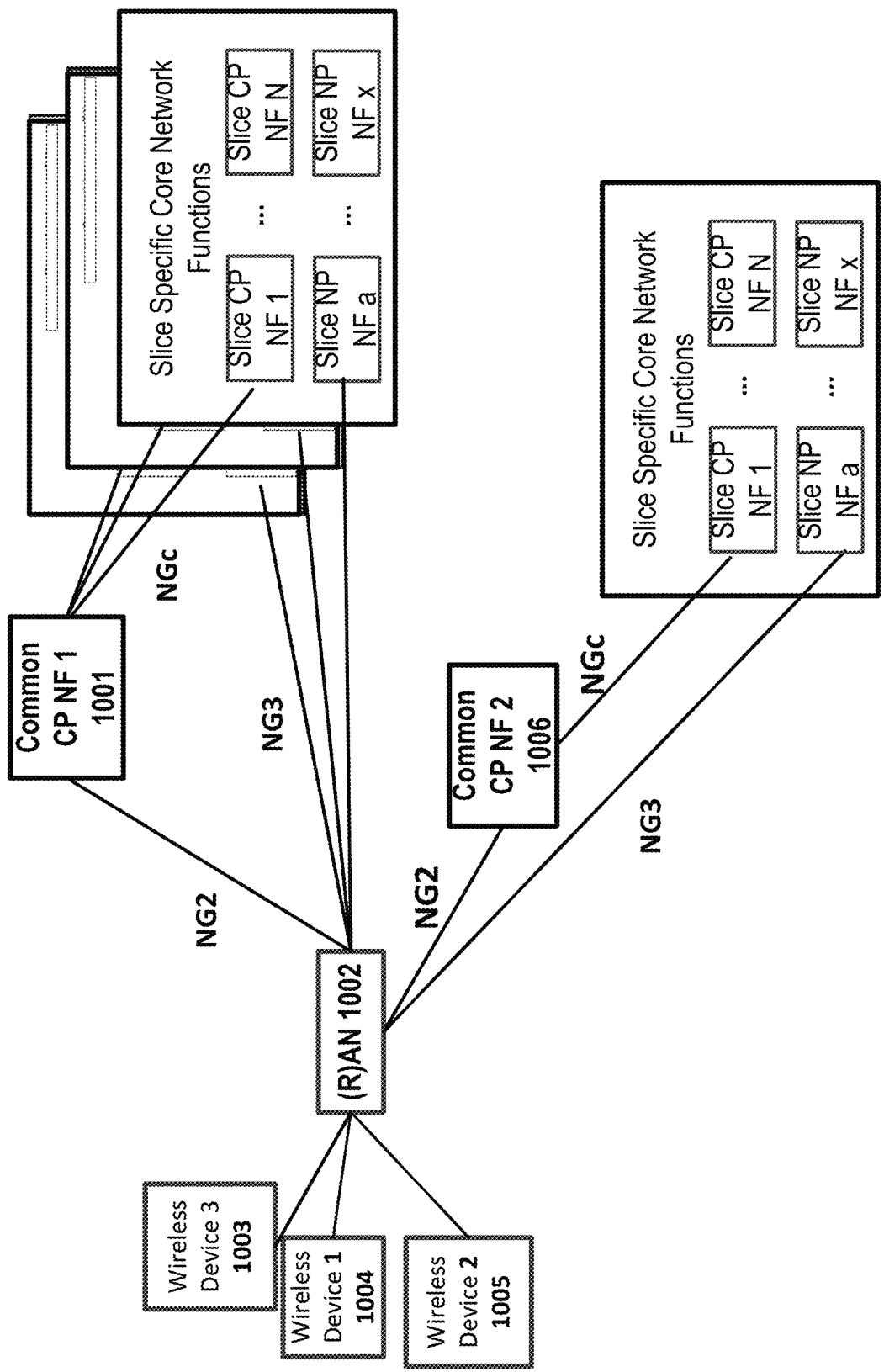
FIG. 10 shows an example of wireless devices assigned to core part of a network slice instance (NSI).

FIG. 10 shows an example depicting wireless device 1 1004, wireless device 2 1005, and wireless device 3 1003 that are assigned to a core part of network slice instances (NSI). Wireless device 1 1004, wireless device 2 1005 and wireless device 3 1003 are connected to specific core network functions via (R)AN 1002. The core network portion of the network slice may share some network functions with other core network portions of network slices that serve the same wireless device, comprising the NG1 and NG2 terminations, in the common control network functions (CCNF). As shown in FIG. 10, wireless device 1 1004 and wireless device 3 1003 may be assigned to common CP NF1 1001 and have three slices accessing multiple core network slice instances (NSIs) and therefore multiple slice-specific core network functions. However, it should be noted that any number of core network slice instances may be utilized. Wireless device 2 1005 may be associated with one NSI and may be assigned to different Common CP NF 2 1006 (e.g. after the wireless devices attach has occurred).

Figure 11:
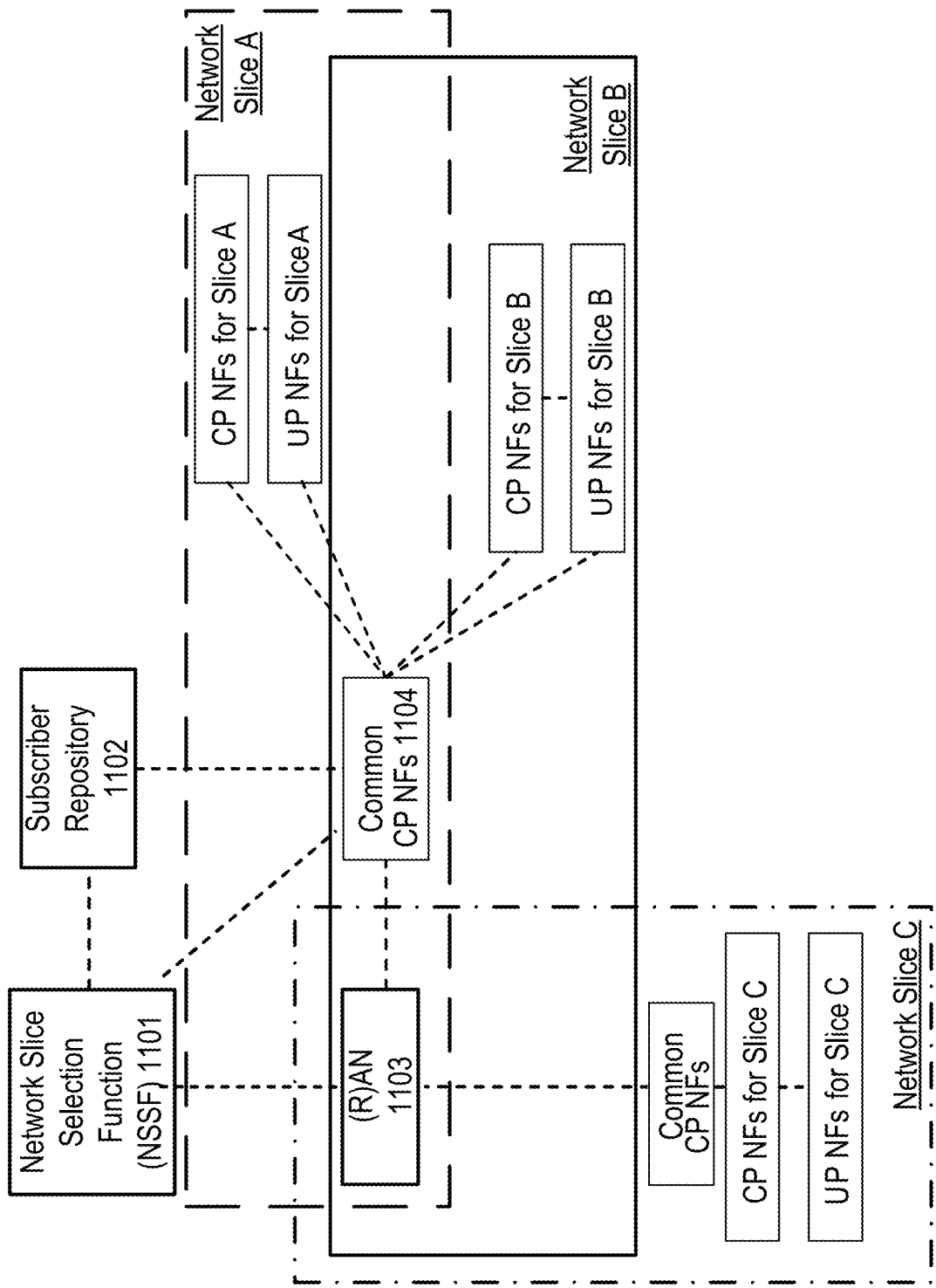
FIG. 11 shows an example of network slice architecture with two groups-common control plane (CP) network functions (NFs) and dedicated CP NFs.

The core network instances may be set up to provide a wireless device to obtain services from multiple network slices of one network operator simultaneously. A single set of CP functions that are in common among core network instances may be shared across multiple core network instances. UP functions and other CP functions that are not in common may reside in their respective core network instances, and may be not shared with other core network instances. A slice instance ID may be an identifier of a network slice instance and may be used as an indicator by the network to select the corresponding slice for a wireless device. A CP-NF ID may be an identifier of a control plane network function instance. FIG. 11 shows an example depicting a network slice architecture with two groups-common CP NFs and dedicated CP NFs. The NSSF 1101 may be common to network slices in the PLMN and may realize the slice selection function for both groups. The NSSF 1101 may store the mapping information between slice instance ID and NF ID (and/or NF address). The NSSF 1101 may have connection with the subscriber repository 1102 to get wireless device subscribed slice instance IDs corresponding to current PLMN. NSSF 1101 may obtain network slice selection policy information from a policy function. CP-NF ID and/or address may be determined by the NSSF 1101 based on slice instance ID, wireless device subscribed information, and/or network slice selection policy. NSSF may respond the specific CP-NF ID/address corresponding to the slice instance ID of the (R)AN 1103. The NSSF 1101 may be located in the core network, which may be useful for the interaction and mapping update between the NSSF 1101 and subscriber repository 1102. This may make the management of the mapping between Slice Instance ID and NF ID/address in a centralized way. The (R)AN 1103 may act as a routing function to link the wireless device with the appropriate CN part of network slice. The (R)AN 1103 may store the mapping between the Slice Instance ID and NF ID. The Common CP NFs 1104 may be used for multiple slices with wireless devices simultaneously connected. A wireless device may access multiple network slices at the same time. The Common CP NFs 1104 may have common set of NFs that may be flexibly expanded with additional NFs per slice requirement.

A wireless device may be slice-provided. If so, there may be one or more instances for the attach procedure as described herein. If wireless device attaches without Slice Instance ID, the wireless device may or may not take some assistant parameters (e.g. service type). The (R)AN may forward the attach request to NSSF 1101. NSSF 1101 may check with subscription data and network slice selection policy and/or provide a response with a predefined/default Slice Instance ID to the wireless device. If a wireless device attaches with a Slice Instance ID, the (R)AN 1103 may not know the corresponding slice. The (R)AN 1103 may forward the wireless device request signaling to NSSF 1101 and NSSF 1101 may respond with specific CP-NF ID/address corresponding to the Slice Instance ID. The (R)AN 1103 may route the attach request to the specific CP-NF. If a wireless device attaches with a Slice Instance ID, the (R)AN 1103 may have the related mapping between the Slice Instance ID carried by the wireless device and CP-NF ID. The attach request may be routed to the specific CP-NF in the core network.

Figure 12:
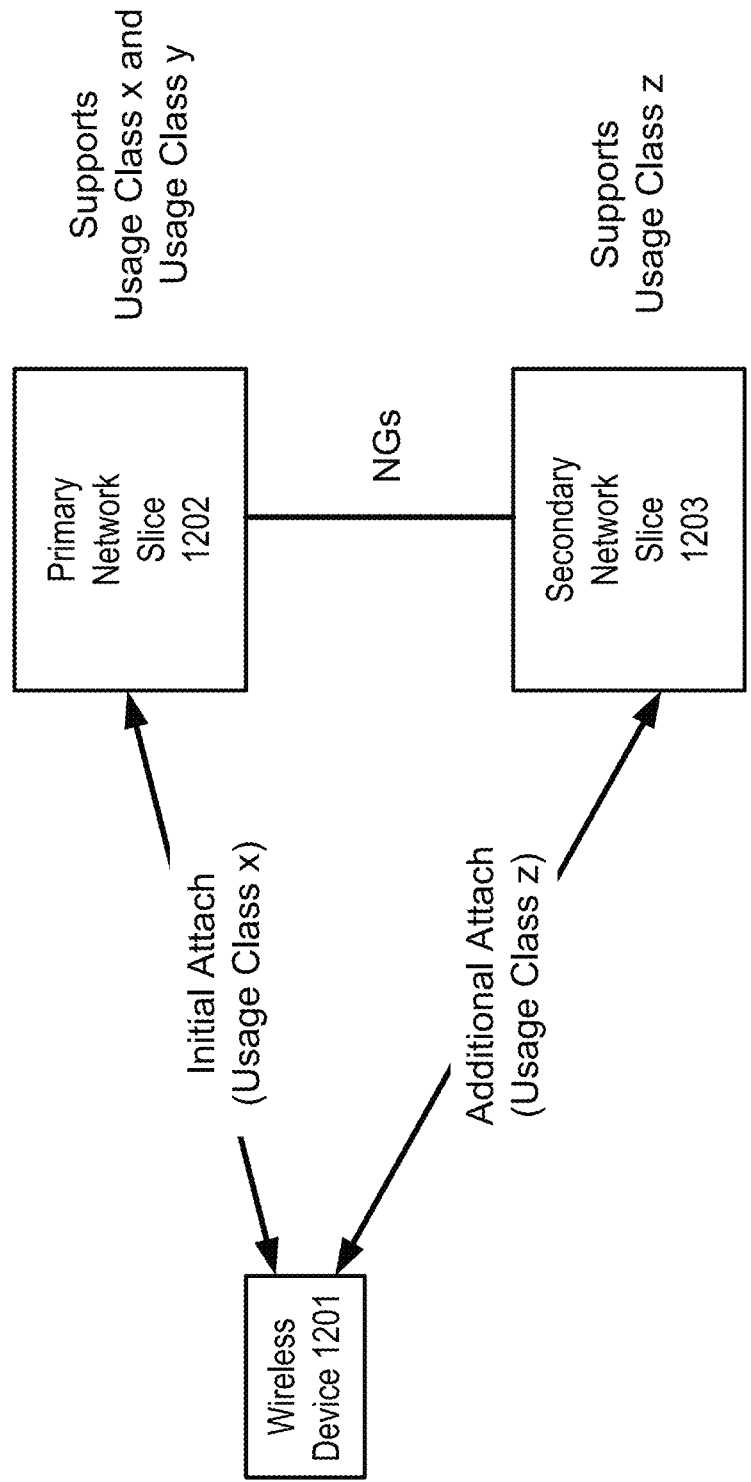
FIG. 12 shows an example of multiple network slices per wireless device.

FIG. 12 shows an example diagram depicting multiple slices per wireless device. The network slice instances may be independent and they may not share any CP or UP functions. The network slice instances may share common databases such as the subscription database and/or policy databases. Network slices instances may communicate via the NGs interface. Each network slice instance may have a unique slice identity that may be resolved to an IP address for communication via NGs. Wireless device 1201 may be simultaneously attached to multiple network slice instances. One of these slices may be the primary network slice 1202 for the wireless device and all the others may be secondary network slices 1203 for the wireless device. The first attach performed by the wireless device may be called initial attach and attaches the wireless device 1201 to the primary network slice 1202, and a subsequent attach may be called additional attach and attaches the wireless device to a secondary network slice 1203.

A Network Slice may comprise the Core Network CP functions, Core Network CP functions, a 5G Radio Access Network, and/or the N3IWF functions to the non-3GPP Access Network. Network slices may differ for supported features and network functions implementation. The operator may deploy multiple Network Slice instances delivering the same features but for different groups of wireless devices. The instances may deliver a different committed service and/or may be dedicated to a customer. The NSSF may store the mapping information between slice instance ID and NF ID (or NF address). A single wireless device may simultaneously be served by one or more network slice instances via a 5G-AN. A single wireless device may be served by k network slices (e.g. k=8, 16, etc.) at a time. An AMF instance serving the wireless device logically belongs to a Network Slice instances serving the wireless device. A PDU session may belong to one specific network slice instance per PLMN. Different network slice instances may not share a PDU session. Different slices may have slice-specific PDU sessions using the same DNN. A S-NSSAI (Single Network Slice Selection Assistance information)

may identify a Network Slice. An S-NSSAI may be comprised of a slice/service type (SST) (which may refer to the expected Network Slice behavior in terms of features and services) and/or a slice differentiator (SD). A slice differentiator may be optional information that complements the slice/service type(s) to provide further differentiation for selecting a network slice instance from potentially multiple network slice instances that comply with the indicated slice/service type. This information may be referred to as SD. The same Network Slice instance may be selected employing different S-NSSAIs. The CN part of a Network Slice instance(s) serving a wireless device may be selected by CN.

Subscription data may comprise the S-NSSAI(s) of the Network Slices to which the wireless device subscribes. One or more S-NSSAIs may be marked as default S-NSSAI (e.g. k=8, 16, etc.). The wireless device may subscribe to more than eight S-NSSAI. A wireless device may be configured by the HPLMN with a configured NSSAI per PLMN. The wireless device may obtain from the AMF a Provided NSSAI for this PLMN (e.g. after successful completion of a wireless device registration procedure), which may comprise one or more S-NSSAIs. The Provided NSSAI may take precedence over the configured NSSAI for this PLMN. The wireless device may use the S-NSSAIs in the Provided NSSAI corresponding to a Network Slice for the subsequent Network Slice selection related procedures in the serving PLMN. The establishment of user plane connectivity to a data network via a network slice instance(s) may comprise performing a RM procedure to select an AMF that supports the required Network Slices and/or establishing one or more PDU session to the required Data network via the Network Slice Instance(s). If a wireless device registers with a PLMN, if the wireless device for this PLMN has a configured NSSAI or a provided NSSAI, the wireless device may provide to the network, in the Radio Resource Control (RRC) and/or NAS, a Requested NSSAI containing the S-NSSAI(s) corresponding to the slice(s) to which the wireless device attempts to register in addition to the temporary user ID, if one was assigned to the wireless device. The Requested NSSAI may be the configured-NSSAI and/or the Provided-NSSAI. If a wireless device registers with a PLMN, if for this PLMN the wireless device has no configured NSSAI or Provided NSSAI, the (R)AN may route NAS signaling from/to this wireless device to/from a default AMF.

The network, based on local policies, subscription changes, and/or wireless device mobility, may change the set of permitted Network Slice(s) to which the wireless device may be registered. The network may perform such change during a registration procedure and/or trigger a notification towards the wireless device of the change of the supported Network Slices using an RM procedure, which may trigger a registration procedure. The Network may provide the wireless device with a new Provided NSSAI and Tracking Area list. During a Registration procedure in a PLMN, if the network decides that the wireless device should be served by a different AMF based on Network Slice(s) features, the AMF that first received the Registration Request may redirect the Registration request to another AMF via the (R)AN or via direct signaling between the initial AMF and the target AMF.

The network operator may provision the wireless device with a network slice selection policy (NSSP). The NSSP may comprise one or more NSSP rules. An NSSP rule may associate an application with a certain S-NSSAI. A default rule which matches one or more applications to a S-NSSAI may also be comprised. If a wireless device application associated with a specific S-NSSAI requests data transmission, a variety of actions may be performed. If the wireless device has one or more PDU sessions established corresponding to the specific S-NSSAI, the wireless device may route the user data of this application in one of these PDU sessions, unless other conditions in the wireless device prohibit the use of these PDU sessions. If the application provides a DNN, the wireless device may consider also this DNN to determine which PDU session to use. If the wireless device does not have a PDU session established with this specific S-NSSAI, the wireless device may request a new PDU session corresponding to this S-NSSAI and with the DNN that may be provided by the application. In order for the (R)AN to select a proper resource for supporting network slicing in the (R)AN, (R)AN may be aware of the Network Slices used by the wireless device.

The AMF may select a SMF in a Network Slice instance based on S-NSSAI, DNN and other information, such as wireless device subscription and/or local operator policies, if the wireless device triggers the establishment of a PDU session. The selected SMF may establish a PDU session based on S-NSSAI and DNN. In order to support network-controlled privacy of slice information for the slices the wireless device accesses if the wireless device may be aware or configured that privacy considerations apply to NSSAI, the wireless device might not comprise NSSAI in NAS signaling unless the wireless device has a NAS security context and/or the wireless device might not comprise NSSAI in unprotected RRC signaling. For roaming scenarios, the Network Slice specific network functions in VPLMN and HPLMN may be selected based on the S-NSSAI provided by the wireless device during PDU connection establishment. If a standardized S-NSSAI may be used, selections of slice specific NF instances may be done by each PLMN based on the provided S-NSSAI. Additionally, the VPLMN may map the S-NSSAI of HPLMN to a S-NSSAI of VPLMN based on roaming agreement (comprising mapping to a default S-NSSAI of VPLMN). The selection of slice specific NF instance in VPLMN may be based on the S-NSSAI of VPLMN and/or the S-NSSAI of HPLMN.

The 5G system may provide an operator to configure the information that may associate a service to a network slice. Operators may use network slicing implementation to support multiple third parties (e.g. enterprises, service providers, content providers, etc.) that may require similar network characteristics. A business application layer may contain specific applications and services of the operator, enterprise, verticals, and/or third parties that utilize a 5G network. The interface to the end-to-end management and orchestration entity may provide, for example, dedicated network slices for an application, and/or a mapping of an application to existing network slices. A 5G system may support network slicing for specific applications. Legacy solutions may not support application initiated network slicing. This may cause an interworking problem between the wireless device and the application server for different vendors that may have different implementations for a network slicing initiation. A variety of mechanisms may be provided for an application to trigger the establishment of dedicated network slices.

If a wireless device has registered to a 5G network, both the wireless device and network may initiate the PDU sessions. For the network initiated PDU session establishment procedure, the network may send a device trigger message to the application(s) on the wireless device side.

The trigger payload may be comprised in Device Trigger Request message containing the information on which application on the wireless device side may be expected to trigger the PDU Session establishment request. Based on that information, the application(s) on the wireless device may trigger the PDU session establishment procedure. An application function AF may transmit the network slicing related information to the PCF. AF may transmit to PCF a request. The request may comprise at least information to identify the traffic to be routed. The traffic may be identified in the AF request by: a DNN and possibly slicing information (S-NSSAI) and/or an AF-Service-Identifier. If the AF provides an AF-Service-Identifier, such as an identifier of the service on behalf of which the AF may be issuing the request, the 5GC may map this identifier into a target DNN and slicing information (S-NSSAI). One or more of the following may be implemented to initiate and/or establish a new slice by an application: the PCF and/or NEF may receive from AF a message comprising network slicing information, the PCF and/or NEF may trigger the network slicing establishment procedure, and/or the AF may be the application function of the operator or a third party application server (e.g. vertical industrial application server). If the third party application does not support the AF, the third party application may request the AF as a sponsor, which may be transparent to the PCF and/or NEF.

The network slicing information may comprise a variety of information elements. Network slicing required information indicates the application requires a dedicated network slice. Without this indication, the operator network might not know whether to reuse the current slice or establish a new one. Required bandwidth information (e.g. minimal bandwidth) for the network slice may describe the bandwidth to support the service and/or a measure of priority for the bandwidth (e.g., the bandwidth may be guaranteed for medical applications). Provided latency information for the network slice may describe the particular service level needed to support the service (e.g. for the time sensitive application Video, VoIP etc.). Priority information for the network slice may be used to allocate priority for network resources (e.g. higher priority network slices (e.g. emergency services) may have the priority on the resource allocation) and/or preempt existing lower priority network slices if the requested resource may be limited. Third party ID and third party charging information may be used to identify a third party and/or indicate that the service may be free of charge for the wireless device but incur a charge for the third party (and vice versa). S-NSSAI or an AF-Service-Identifier information may comprise a Slice/Service type (SST) and a Slice Differentiator (SD) that may indicate expected Network Slice behavior in terms of features and services. The AF-Service-Identifier may be the identifier of the service.

If the PDU session is also required at the same time, the AF may also provide the following information to the PCF or NEF: the service data flow information may be IP 5-Tuple (i.e. Source IP address, Destination IP Address, Source Port number, Destination Port Number and the protocol in use) or Application Identifier (e.g. Skype), the user identity may be the wireless device IPv4 address or IPv6 prefix, the wireless device NAI, etc., and/or the APN ID may be to identify a specific PDN. An AF may initiate and establish a new network slice, and a network slice ID may be allocated by a PCF.

Figure 13:
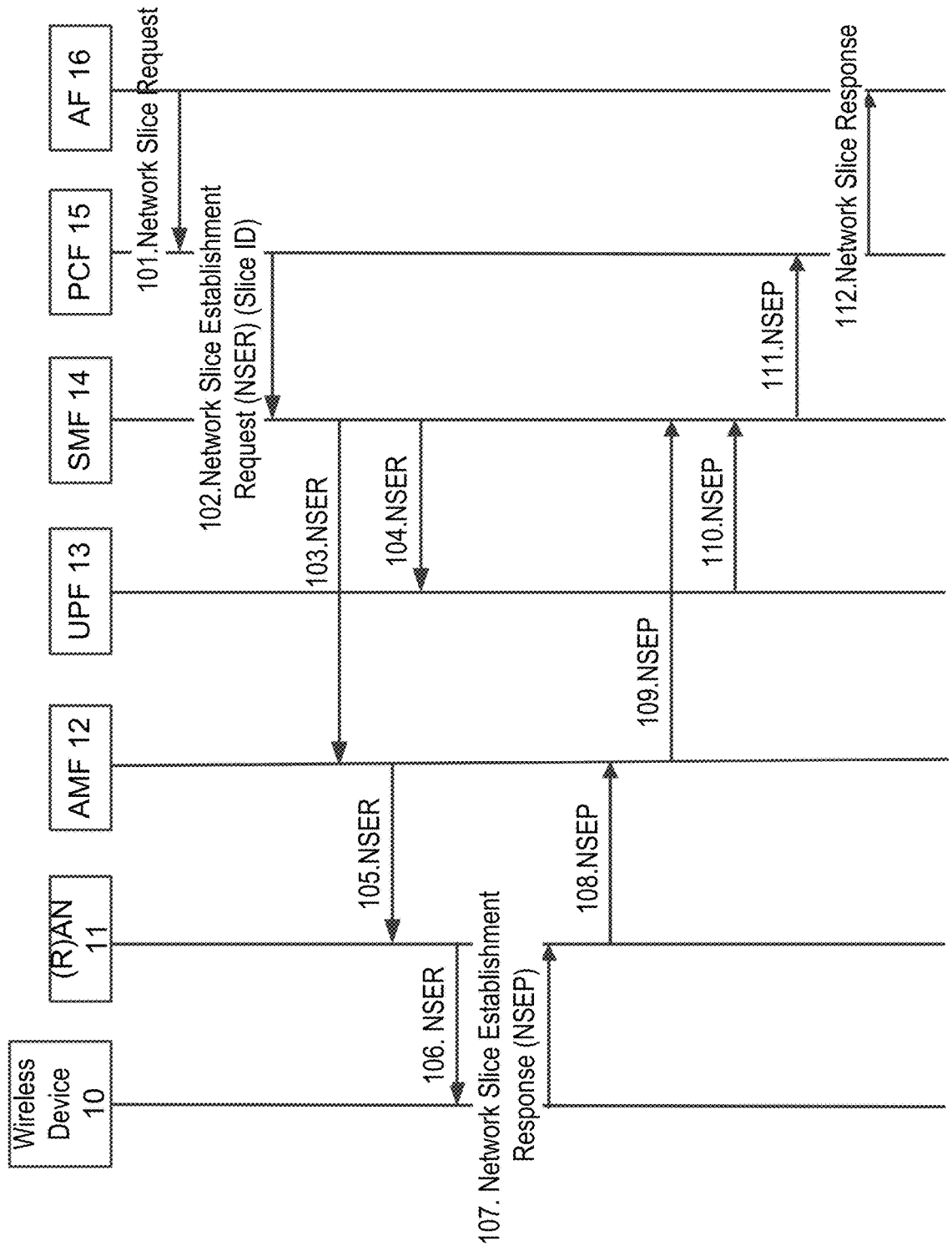
FIG. 13 shows an example for initiating and establishing a new network slice.

FIG. 13 shows an example for initiating and establishing a new network slice. At step 101, AF 16 may transmit to a PCF 15 a message (e.g. network slice request message) comprising network slicing information. The AF 16 may transmit the message based on requiring to establish a network slice to meet one or more service requirements. The AF 16 may be the application function of the operator, or a third party application server (e.g. vertical industrial application server). If the third party application does not support the AF, it may request the AF 16 as the sponsor, which may be transparent to the PCF 15. The network slicing information may comprise one or more of the following information elements: network slicing required indications, the required minimal bandwidth of the network slice, the provided latency of the network slice, the priority of the network slice, a third party ID, a third party charging indication, a S-NSSAI or an AF-Service-Identifier. Additionally or alternatively, if the PDU session may be required at the same time, the AF 16 may provide the following information to the PCF 15 service data flow information, the user identity, and/or the APN identity.

At step 102, based on receiving the network slice request message from the AF 16, the PCF 15 may perform at least one of the following actions. A policy decision may be made based on the information received from the AF 16, the information from the UDM and/or the pre-configured policy in the PCF 15 The policy may apply for the slice. The policy may comprise the QoS policy (e.g. the required bandwidth of the network slice), charging policy (e.g. third party charging), the priority of the network slice, packet inspection policy, and/or packet routing policy etc. A network slice ID may be created or generated. The network slice ID may identify a network slice. The network slice ID may be per wireless device, per PLMN or per operator. The network slice ID may unique be per wireless device, per PLMN or per operator. For example, the network slice ID may be unique per PLMN. Wireless device 1 has Network Slice IDs ID1, ID2, and ID3 and wireless device 2 has Network Slice IDs ID4, ID5, and ID6. These Network Slice IDs ID1, ID2, ID3, ID4, ID5, and ID6 may be different and uniqueness may be guaranteed. A message (e.g. network slice establishment request message) may be sent to SMF 14 comprising one or more of the following information: the network slicing information, the network slice ID, the policy, and/or the S-NSSAI. The message may comprise the service data flow information, the user identity and the APN identity, if applicable.

At step 103, the SMF 14 may perform one or more of the following actions (e.g. after receiving the network slice establishment request message from the PCF 15). CN Tunnel Info may be allocated. The PDU session ID may be allocated if the PDU session may be established together with the network slice establishment. A message (e.g. network slice establishment request message) may be sent to an AMF 12 comprising one or more of the following information: the network slicing information, the network slice ID, the policy, or the S-NSSAI. The message may comprise the service data flow information, the user identity, the APN identity, and/or PDU session ID if applicable. If the charging policy is received from the PCF 15, the SMF may perform the charging function (e.g. collecting the data or time usage of the user and reporting the usage to the OCS and/or OFCS). If the SMF 14 has received the third party charging indication, the SMF 14 may send CDR or charging message to the OCS and/or OFCS comprising this indication and/or third party identifier for third party charging. The OCS and/or OFCS may perform the charging for the third party, and not charging for the user, e.g. after receiving the third party charging indication and/or third party identifier.

At step 104, the SMF 14 may send to a UPF 13 a message (e.g. network slice establishment request) to establish the user plane comprising one or more of the following information: the network slicing information, the network slice ID, the policy, or the S-NSSAI. The message may also comprise the service data flow information, the user identity, the APN identity, and/or PDU session ID if applicable. At step 105, the AMF 12 sends to a (R)AN 11 a message (e.g. network slice establishment request) comprising one or more of the following information: the network slicing information, the network slice ID, the policy, or the S-NS-SAI. The message may comprise the service data flow information, the user identity, the APN identity, and/or PDU session ID, if applicable. At step 106, the (R)AN 11 may send to a wireless device 10 a message (e.g. network slice establishment request) comprising one or more of the following information: the network slicing information, the network slice ID, the policy, and/or the S-NSSAI. The message may comprise the service data flow information, the APN identity and/or PDU session ID, if applicable. At step 107, the wireless device 10 may acknowledge the (R)AN 11 by sending a response message (e.g. network slice establishment response). At step 108, the (R)AN 11 may acknowledge the AMF 12 by sending a response message (e.g. network slice establishment response). At step 109, the AMF 12 may acknowledge the SMF 14 by sending a response message (e.g. network slice establishment response). At step 110, the UPF 13 may acknowledge the SMF 14 by sending a response message (e.g. network slice establishment response). The SMF 14 may receive the response from the UPF 13, e.g. before receiving the response from the AMF 12. At step 111, the SMF 14 may acknowledge the PCF 15 by sending a response message (e.g. network slice establishment response). At step 112, the PCF 15 may acknowledge the AF 16 by sending a response message (e.g. network slice response). The application service may be performed on the slice between the application and the wireless device (e.g. after the slice is established successfully).

An AF may connect with a NEF, the AF may initiate and establish a new network slice, and a network slice ID may be allocated by a PCF. The NEF may forward the received information to the PCF (e.g. after receiving the network slice request), and the PCF may perform a variety of actions such as those described with respect to FIG. 13.

Figure 14:
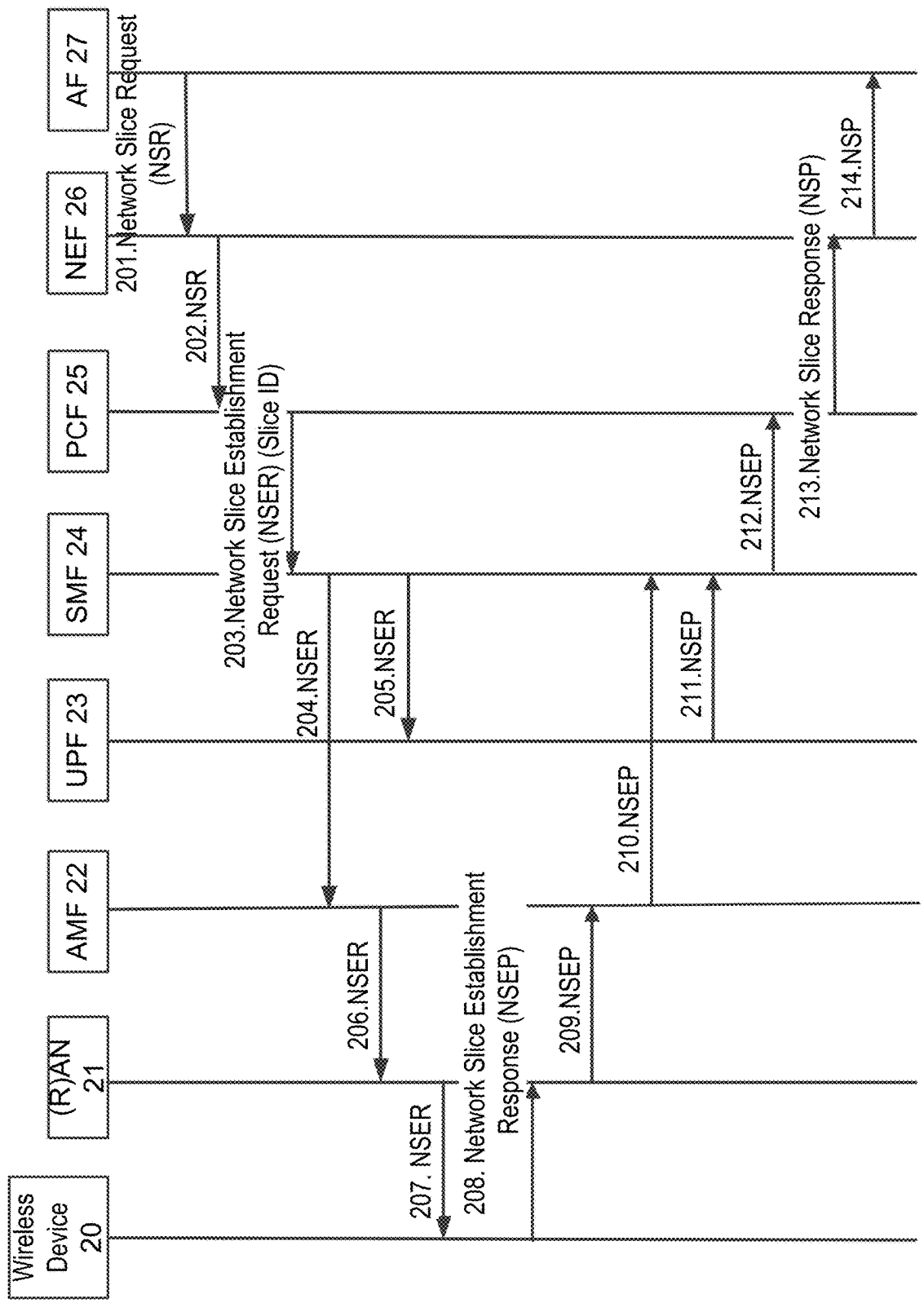
FIG. 14 shows an example for initiating and establishing a network slice using a network exposure function (NEF).

FIG. 14 shows an example for initiating and establishing a network slice using a NEF. At step 201, AF 27 may transmit to a NEF 26 a message (e.g. network slice request message) comprising network slicing information. The AF 27 may transmit the message based on a request to establish a network slice to meet one or more service requirements. The AF 27 may be the application function of the operator, or a third party application server (e.g. vertical industrial application server). If the third party application does not support the AF, it may request the AF 27 as the sponsor, which may be transparent to the NEF 26. The network slicing information may comprise one or more of the following information elements: network slicing required indications, the required minimal bandwidth of the network slice, the provided latency of the network slice, the priority of the network slice, a third party ID, a third party charging indication, a S-NSSAI or an AF-Service-Identifier. If the PDU session may be required at the same time, the AF 27 may provide the following information to the NEF 26 service data flow information, the user identity, and/or the APN identity.

At step 202, NEF 26 may send to the PCF 25 a message (e.g. network slice request message) comprising the information received from the AF 27. The NEF 26 may check whether the application may be authorized to initiate and/or request a network slice, e.g. before the NEF 26 sends the message to the PCF 25. At step 203, the PCF 25 may perform at least one of the following actions (e.g. based on receiving the network slice request message from the NEF 26). A policy decision may be made based on the information from the NEF 26, the information from the UDM and/or the pre-configured policy in the PCF 25. The policy may apply for the slice. The policy may comprise the QoS policy (e.g. the required bandwidth of the network slice), charging policy (e.g. third party charging), the priority of the network slice, packet inspection policy, and/or packet routing policy etc. A network slice ID may be created or generated. The network slice ID may identify a network slice. The network slice ID may be per wireless device, per PLMN or per operator. The network slice ID may unique be per wireless device, per PLMN or per operator. For example, the network slice ID may be unique per PLMN. Wireless device 1 has Network Slice IDs ID1, ID2, and ID3 and wireless device 2 has Network Slice IDs ID4, ID5, and ID6. These Network Slice IDs ID1, ID2, ID3, ID4, ID5, and ID6 may be different and uniqueness may be guaranteed. A message (e.g. network slice establishment request message) may be sent to SMF 24 comprising one or more of the following information: the network slicing information, the network slice ID, the policy, or the S-NSSAI. The message may comprise the service data flow information, the user identity and the APN identity, if applicable.

At step 204, the SMF 24 may perform one or more of the following actions (e.g. after receiving the network slice establishment request message from the PCF 25): allocate the CN Tunnel Info, allocate the PDU session ID if the PDU session may be established together with the network slice establishment, send a message (e.g. network slice establishment request message) to an AMF 22 comprising one or more of the following information: the network slicing information, the network slice ID, the policy, or the S-NS-SAI. The message may comprise the service data flow information, the user identity, the APN identity and/or PDU session ID, if applicable. If the charging policy is received from the PCF 25, the SMF 24 may perform the charging function (e.g. collecting the data or time usage of the user and reporting the usage to the OCS and/or OFCS). If the SMF 24 has received the third party charging indication, the SMF 24 may send CDR or charging message to the OCS, and/or OFCS, comprising this indication and/or third party identifier for third party charging. The OCS and/or OFCS may perform the charging for the third party, and not charging for the user, e.g. after receiving the third party charging indication and/or third party identifier.

At step 205, the SMF 24 may send to a UPF 23 a message (e.g. network slice establishment request) to establish the user plane comprising one or more of the following information: the network slicing information, the network slice ID, the policy, and/or the S-NSSAI. The message may comprise the service data flow information, the user identity, the APN identity, and/or PDU session ID, if applicable. At step 206, the AMF 22 may send to a (R)AN 21 a message (e.g. network slice establishment request) comprising one or more of the following information: the network slicing information, the network slice ID, the policy, and/or the S-NSSAI. The message may comprise the service data flow information, the user identity, the APN identity, and/or PDU session ID, if applicable. At step 207, the (R)AN 21 may send to a wireless device 20 a message (e.g. network slice establishment request) comprising one or more of the following information: the network slicing information, the network slice ID, the policy, or the S-NSSAI. The message may comprise the service data flow information, the APN identity, and/or PDU session ID, if applicable. At step 208, the wireless device 20 may acknowledge the (R)AN 21 by sending a response message (e.g. network slice establishment response). At step 209, the (R)AN 21 may acknowledge the AMF 22 by sending a response message (e.g. network slice establishment response). At step 210, the AMF 22 may acknowledge the SMF 24 by sending a response message (e.g. network slice establishment response). At step 211, the UPF 23 may acknowledge the SMF 24 by sending a response message (e.g. network slice establishment response). The SMF 24 may receive the response from the UPF 23 before receiving the response from the AMF 22. At step 212, the SMF 24 may acknowledge the PCF 25 by sending a response message (e.g. network slice establishment response). At step 213, the PCF 25 may acknowledge the NEF 26 by sending a response message (e.g. network slice response). At step 214, the NEF 26 may acknowledge the AF 27 by sending a response message (e.g. network slice response). The application service may be performed on the slice between the application and the wireless device (e.g. after the slice is established successfully). An AF may initiate and establish a new network slice, and a network slice ID may be allocated by a SMF.

Figure 15:
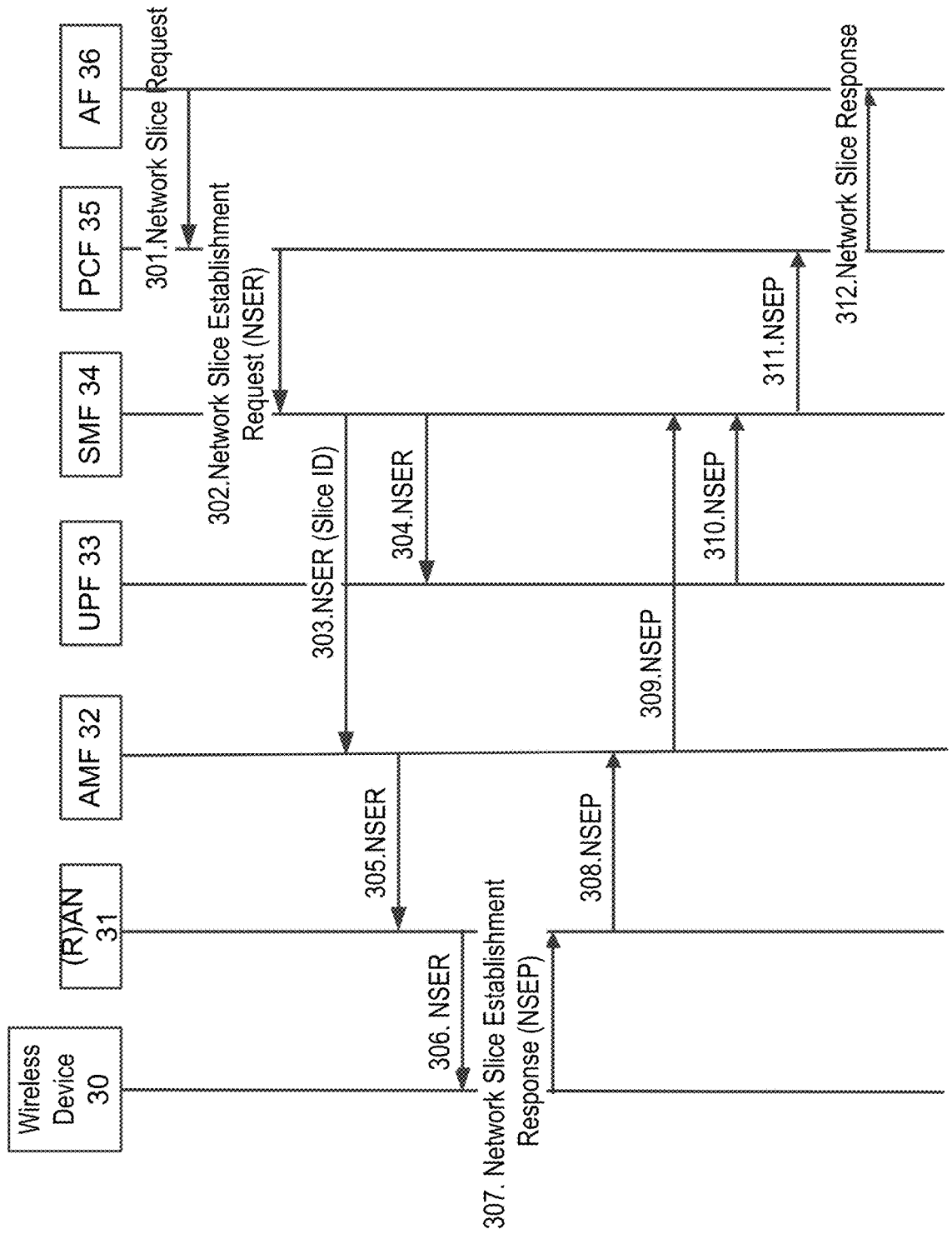
FIG. 15 shows an example for initiating and establishing a network slice using a session management function (SMF).

FIG. 15 shows an example for initiating and establishing a network slice using a SMF. At step 301, an AF 36 may transmit to a PCF 35 a message (e.g. network slice request message) comprising network slicing information. The AF 36 may transmit the message based on a request to establish a network slice to meet one or more service requirements. The AF 36 may be the application function of the operator and/or a third party application server (e.g. vertical industrial application server). If the third party application does not support the AF, it may request the AF 36 as the sponsor, which may be transparent to the PCF 35. The network slicing information may comprise one or more of the following information elements: network slicing required indications, the required minimal bandwidth of the network slice, the provided latency of the network slice, the priority of the network slice, a third party ID, a third party charging indication, a S-NSSAI or an AF-Service-Identifier. If the PDU session may be required at the same time, the AF 36 may provide the following information to the PCF 35 service data flow information, the user identity, and/or the APN identity.

At step 302, the PCF 35 may perform at least one of the following actions based on receiving the network slice request message from the AF 36. A policy decision may be made based on the information received from the AF 36, the information from the UDM, and/or the pre-configured policy in the PCF 35. The policy may apply for the slice. The policy may comprise the QoS policy (e.g. the required bandwidth of the network slice), charging policy (e.g. third party charging), the priority of the network slice, packet inspection policy, and/or packet routing policy etc. A message (e.g. network slice establishment request message) may be sent to a SMF 34 comprising one or more of the following information: the network slicing information, the policy, or the S-NSSAI. The message may comprise the service data flow information, the user identity, and the APN identity, if applicable.

At step 303, the SMF 34 may perform one or more of the following actions (e.g. after receiving the network slice establishment request message from the PCF 35). A network slice ID may be created and/or generated. The network slice ID may identify a network slice. The network slice ID may be per wireless device, per PLMN, or per operator. The network slice ID may unique be per wireless device, per PLMN, or per operator. For example, the network slice ID may be unique per PLMN. Wireless device 1 has Network Slice IDs ID1, ID2, and ID3 and wireless device 2 has Network Slice IDs ID4, ID5, and ID6. These Network Slice IDs ID1, ID2, ID3, ID4, ID5, and ID6 may be different and uniqueness may be guaranteed. A message (e.g. network slice establishment request message) may be sent to an AMF 32 comprising one or more of the following information: the network slicing information, the network slice ID, the policy, or the S-NSSAI. The message may comprise the service data flow information, the user identity, the APN identity, and/or PDU session ID, if applicable. If the charging policy is received from the PCF 35, the SMF 34 may perform the charging function (e.g. collecting the data or time usage of the user and reporting the usage to the OCS and/or OFCS). If the SMF 34 has received the third party charging indication, the SMF 34 may send CDR or a charging message to the OCS, and/or OFCS, comprising this indication and/or third party identifier for third party charging. The OCS and/or OFCS may perform the charging for the third party, and not charging for the user, e.g. after receiving the third party charging indication and/or third party identifier.

At step 304, the SMF 34 may send to a UPF 33 a message (e.g. network slice establishment request) to establish the user plane comprising one or more of the following information: the network slicing information, the network slice ID, the policy, or the S-NSSAI. The message may comprise the service data flow information, the user identity, the APN identity, and/or PDU session ID, if applicable. At step 305, the AMF 32 may send to a (R)AN 31 a message (e.g. network slice establishment request) comprising one or more of the following information: the network slicing information, the network slice ID, the policy, or the S-NSSAI. The message may comprise the service data flow information, the user identity, the APN identity, and/or PDU session ID, if applicable. At step 306, the (R)AN 31 may send to a wireless device 30 a message (e.g. network slice establishment request) comprising one or more of the following information: the network slicing information, the network slice ID, the policy, or the S-NSSAI. The message may comprise the service data flow information, the APN identity, and/or PDU session ID, if applicable. At step 307, the wireless device 30 may acknowledge the (R)AN 31 by sending a response message (e.g. network slice establishment response). At step 308, the (R)AN 31 may acknowledge the AMF 32 by sending a response message (e.g. network slice establishment response). At step 309, the AMF 32 may acknowledge the SMF 34 by sending a response message (e.g. network slice establishment response). At step 310, the UPF 33 may acknowledge the SMF 34 by sending a response message (e.g. network slice establishment response). The SMF 34 may receive the response from the UPF 33 before receiving the response from the AMF 32. At step 311, the SMF 34 may acknowledge the PCF 35 by sending a response message (e.g. network slice establishment response). At step 312, the PCF 35 may acknowledge the AF 36 by sending a response message (e.g. network slice response). The application service may be performed on the slice between the application and the wireless device (e.g. after the slice is established successfully).

An AF may connect with a NEF, the AF may initiate and establish a new network slice, and a network slice ID may be allocated by a SMF. The NEF may forward the received information to the PCF (e.g. after receiving the network slice request). The PCF may perform the actions described with respect to FIG. 15.

Figure 16:
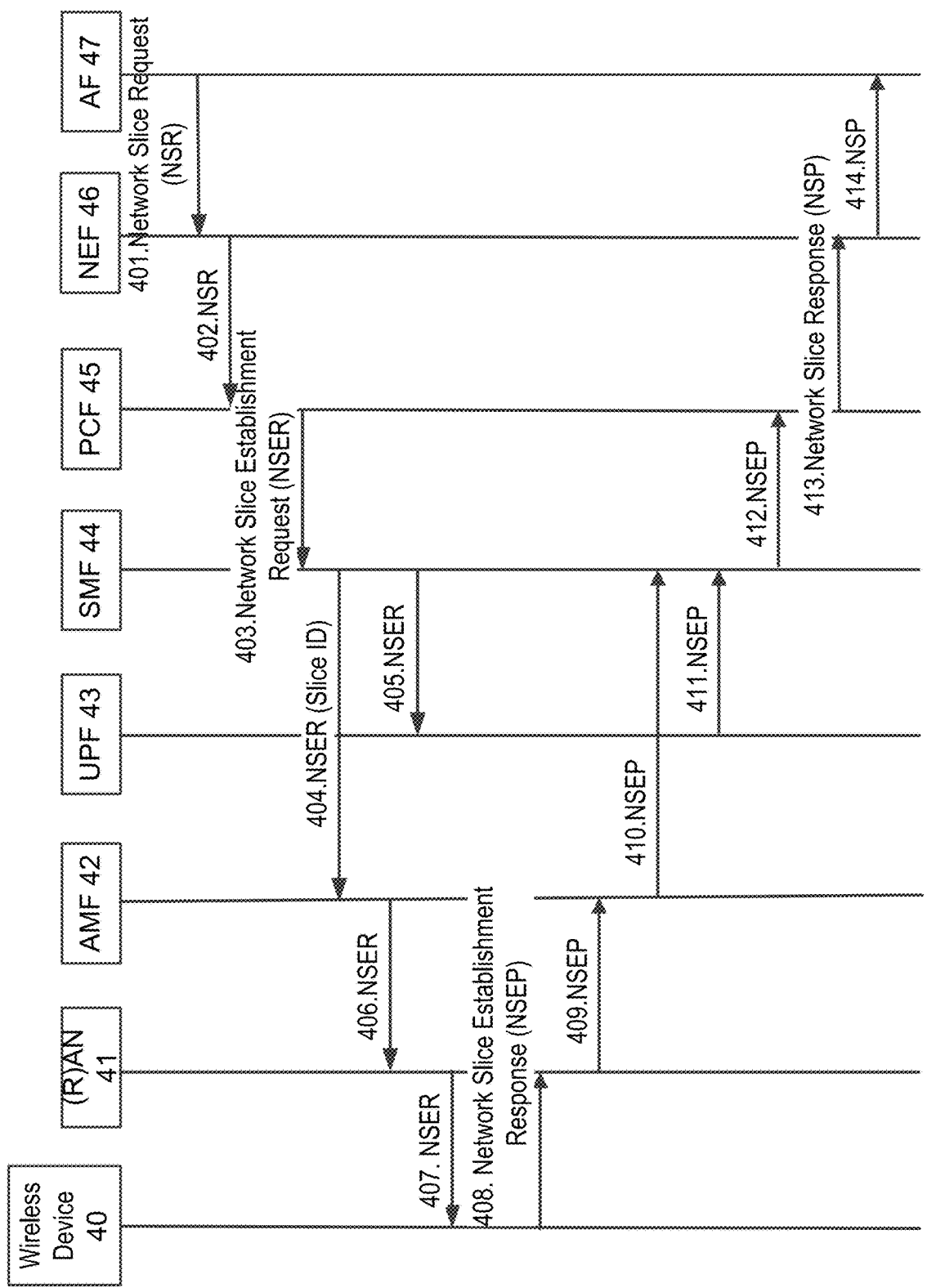
FIG. 16 shows an example for initiating and establishing a network slice using an application function (AF) and a NEF.

FIG. 16 shows an example for initiating and establishing a network slice using an AF and a NEF. At step 401, an AF 47 may transmit to a NEF 46 a message (e.g. network slice request message) comprising network slicing information. The AF 47 may transmit the message based on a request to establish a network slice to meet one or more service requirements. The AF 47 may be the application function of the operator, or a third party application server (e.g. vertical industrial application server). If the third party application does not support the AF, it may request the AF 47 as the sponsor, which may be transparent to the NEF 46. The network slicing information may comprise one or more of the following information elements: network slicing required indications, the required minimal bandwidth of the network slice, the provided latency of the network slice, the priority of the network slice, a third party ID, a third party charging indication, a S-NSSAI, or an AF-Service-Identifier. If the PDU session may be required at the same time, the AF 47 may provide the following information to the NEF 46 service data flow information, the user identity, and/or the APN identity.

At step 402, NEF 46 may send to the PCF 45 a message (e.g. network slice request message) comprising the information received from the AF 47. Before the NEF 46 sends the message to the PCF 45, the NEF 46 may check whether the application may be authorized to initiate and/or request a network slice. At step 403, based on receiving the network slice request message from the NEF 46, the PCF 45 may perform at least one of the following actions. A policy decision may be made based on the information from the NEF 46, the information from the UDM, and/or the pre-configured policy in the PCF 45. The policy may apply for the slice. The policy may comprise the QoS policy (e.g. the required bandwidth of the network slice), charging policy (e.g. third party charging), the priority of the network slice, packet inspection policy, and/or packet routing policy etc. A message (e.g. network slice establishment request message) may be sent to SMF 44 comprising one or more of the following information: the network slicing information, the policy, or the S-NSSAI. The message may comprise the service data flow information, the user identity, and the APN identity, if applicable.

At step 404, the SMF 44 may perform at least one of the following actions (e.g. after receiving the network slice establishment request message from the PCF 45). A network slice ID may be created and/or generated. The network slice ID may identify a network slice. The network slice ID may be per wireless device, per PLMN, or per operator. The network slice ID may unique be per wireless device, per PLMN, or per operator. For example, the network slice ID may be unique per PLMN. Wireless device 1 has Network Slice IDs ID1, ID2, and ID3 and wireless device 2 has Network Slice IDs ID4, ID5, and ID6. These Network Slice IDs ID1, ID2, ID3, ID4, ID5, and ID6 may be different and uniqueness may be guaranteed. A message (e.g. network slice establishment request message) may be sent to an AMF 42 comprising one or more of the following information: the network slicing information, the network slice ID, the policy, or the S-NSSAI. The message may comprise the service data flow information, the user identity, the APN identity, and/or PDU session ID, if applicable. If the charging policy is received from the PCF 45, the SMF 44 may perform the charging function (e.g. collecting the data or time usage of the user and reporting the usage to the OCS and/or OFCS). If the SMF 44 has received the third party charging indication, the SMF 44 may send CDR or charging message to the OCS, and/or OFCS, comprising this indication and/or third party identifier for third party charging. The OCS and/or OFCS may perform the charging for the third party, and not charging for the user, e.g. after receiving the third party charging indication and/or third party identifier.

At step 405, the SMF 44 may send to a UPF 43 a message (e.g. network slice establishment request) to establish the user plane comprising one or more of the following information: the network slicing information, the network slice ID, the policy, or the S-NSSAI. The message may comprise the service data flow information, the user identity, the APN identity, and/or PDU session ID, if applicable. At step 406, the AMF 42 may send to a (R)AN 41 a message (e.g. network slice establishment request) comprising one or more of the following information: the network slicing information, the network slice ID, the policy, or the S-NSSAI. The message may comprise the service data flow information, the user identity, the APN identity, and/or PDU session ID, if applicable. At step 407, the (R)AN 41 may send to a wireless device 40 a message (e.g. network slice establishment request) comprising one or more of the following information: the network slicing information, the network slice ID, the policy, or the S-NSSAI. The message may comprise the service data flow information, the APN identity, and/or PDU session ID, if applicable. At step 408, the wireless device 40 may acknowledge the (R)AN 41 by sending a response message (e.g. network slice establishment response). At step 409, the (R)AN 41 may acknowledge the AMF 42 by sending a response message (e.g. network slice establishment response). At step 410, the AMF 42 may acknowledge the SMF 44 by sending a response message (e.g. network slice establishment response). At step 411, the UPF 43 may acknowledge the SMF 44 by sending a response message (e.g. network slice establishment response). The SMF 44 may receive the response from the UPF 43 before receiving the response from the AMF 42. At step 412, the SMF 44 may acknowledge the PCF 45 by sending a response message (e.g. network slice establishment response). At step 413, the PCF 45 may acknowledge the NEF 46 by sending a response message (e.g. network slice response). At step 414, the NEF 46 may acknowledge the AF 47 by sending a response message (e.g. network slice response). The application service may be performed on the slice between the application and the wireless device (e.g. after the slice is established successfully).

An AF may initiate and establish a new network slice and a network slice ID may be allocated by a PCF. The PCF may send a message (e.g. network slice establishment request message) to an AMF 52 rather than a SMF.

Figure 17:
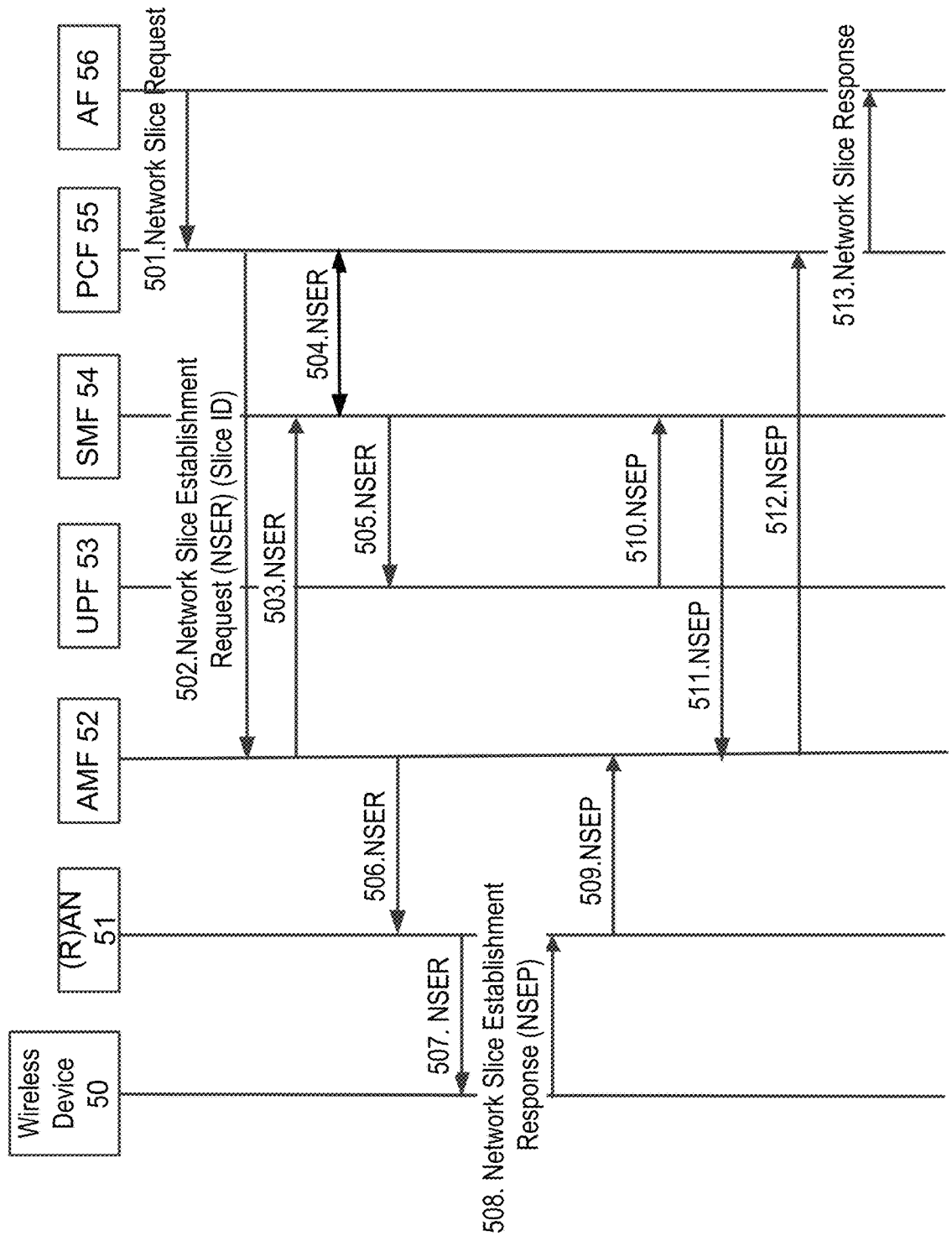
FIG. 17 shows an example for initiating and establishing a network slice using an AMF.

FIG. 17 shows an example for initiating and establishing a network slice using an AMF. At step 501, an AF 56 may transmit to a PCF 55 a message (e.g. network slice request message) comprising network slicing information. The AF 56 may transmit the message based on a request to establish a network slice to meet one or more service requirements. The AF 56 may be the application function of the operator, or a third party application server (e.g. vertical industrial application server). If the third party application does not support the AF, it may request the AF 56 as the sponsor, which may be transparent to the PCF 55. The network slicing information may comprise one or more of the following information elements: network slicing required indications, the required minimal bandwidth of the network slice, the provided latency of the network slice, the priority of the network slice, a third party ID, a third party charging indication, a S-NSSAI, or an AF-Service-Identifier. If the PDU session may be required at the same time, the AF 56 may provide the following information to the PCF 55: service data flow information, the user identity, and/or the APN identity.

At step 502, based on receiving the network slice request message from the AF 56, the PCF 55 may perform at least one of the following actions. Policy decisions may be made based on the information received from the AF 56, the information from the UDM, and/or the pre-configured policy in the PCF 55. The policy may apply for the slice. The policy may comprise the QoS policy (e.g. the required bandwidth of the network slice), charging policy (e.g. third party charging), the priority of the network slice, packet inspection policy, and/or packet routing policy etc. A slice ID may be created or generated. The network slice may ID identify a network slice. The network slice ID may be per wireless device, per PLMN, or per operator. The network slice ID may unique be per wireless device, per PLMN or per operator. For example, the network slice ID may be unique per PLMN. Wireless device 1 has Network Slice IDs ID1, ID2, and ID3 and wireless device 2 has Network Slice IDs ID4, ID5, and ID6. These Network Slice IDs ID1, ID2, ID3, ID4, ID5, and ID6 may be different and uniqueness may be guaranteed. A message (e.g. network slice establishment request message) may be sent ton AMF 52 comprising one or more of the following information: the network slicing information, the network slice ID, the policy, or the S-NSSAI. The message may comprise the service data flow information, the user identity, and the APN identity, if applicable.

At step 503, the AMF 52 may perform at least one of the following actions (e.g. after receiving the network slice establishment request message from the PCF 55). The AMF 52 may accept the slice establishment request, and the AMF 52 may allocate the PDU session ID, if the PDU session may be established together with the network slice establishment. The AMF 52 may send to a SMF 54 a message (e.g. network slice establishment request message) comprising one or more of the following information: the network slicing information, the network slice ID, the policy, or the S-NSSAI. The message may comprise the service data flow information, the user identity, the APN identity, and/or PDU session ID, if applicable. The AMF 52 may not accept the slice establishment, the AMF 52 may reject the request from the PCF 55, the AMF 52 may not send the message to the SMF 54, and/or steps 504 to 511 may not be performed.

At step 504, the SMF 54 may send to the PCF 55 a message (e.g. network slice establishment request message) with the information received from the AMF 52 to get the policy (s) for network slice and/or PDU session. Additionally or alternatively, the PCF 55 may push the policy(s) for network slice and/or PDU session to the SMF 54. At step 505, the SMF 54 may send to a UPF 53 a message (e.g. network slice establishment request message) to establish the user plane comprising one or more of the following information: the network slicing information, the network slice ID, the policy, or the S-NSSAI. The message may comprise the service data flow information, the user identity, the APN identity, and/or PDU session ID, if applicable. At step 506, the AMF 52 may send to a (R)AN 51 a message (e.g. network slice establishment request message) comprising one or more of the following information: the network slicing information, the network slice ID, the policy, or the S-NSSAI. The message may comprise the service data flow information, the user identity, the APN identity, and/or PDU session ID, if applicable. At step 507, the (R)AN 51 may send to a wireless device 50 a message (e.g. network slice establishment request message) comprising one or more of the following information: the network slicing information, the network slice ID, the policy, or the S-NSSAI. The message may comprise the service data flow information, the APN identity, and/or PDU session ID, if applicable. At step 508, the wireless device 50 may acknowledge the (R)AN 51 by sending a response message (e.g. network slice establishment response). At step 509, the (R)AN 51 may acknowledge the AMF 52 by sending a response message (e.g. network slice establishment response). At step 510, the UPF 53 may acknowledge the SMF 54 by sending a response message (e.g. network slice establishment response). At step 511, the SMF 54 may acknowledge the AMF 52 by sending a response message (e.g. network slice establishment response). At step 512, the AMF 52 may acknowledge the PCF 55 by sending a response message (e.g. network slice establishment response). At step 513, the PCF 55 may acknowledge the AF 56 by sending a response message (e.g. network slice response). The application service may be performed on the slice between the application and the wireless device (e.g. after the slice is established successfully).

An AF may connect with a NEF, the AF may initiate and establish a new network slice, and a network slice ID may be allocated by a PCF. The NEF may forward the received information to the PCF, and the PCF may perform the actions as described with respect to FIG. 17, e.g. after receiving the network slice request.

Figure 18:
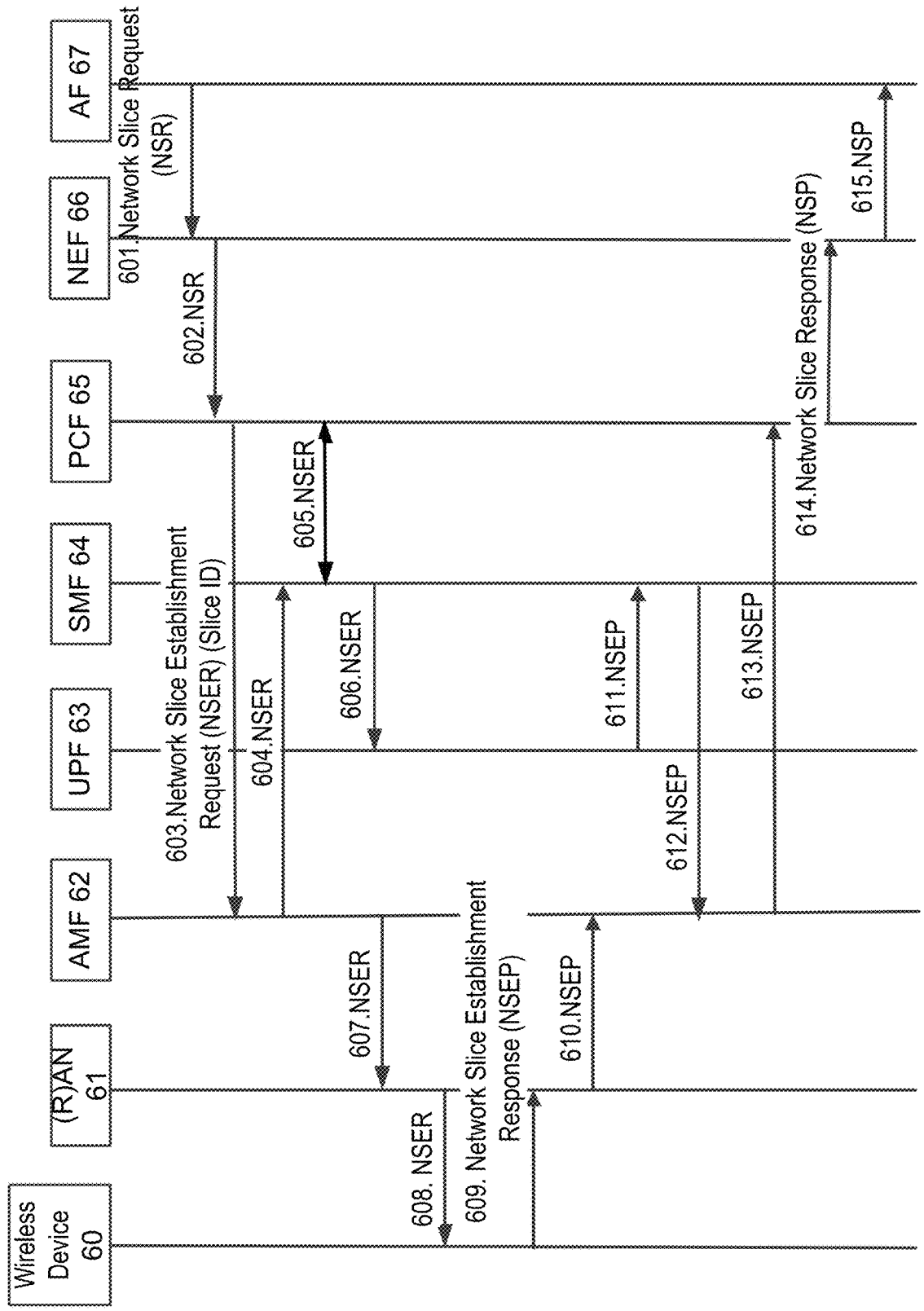
FIG. 18 shows an example for initiating and establishing a network slice using a NEF and a policy control function (PCF).

FIG. 18 shows an example for initiating and establishing a network slice using a NEF and a PCF. At step 601, an AF 67 may transmit to a NEF 66 a message (e.g. network slice request message) comprising network slicing information. The AF 67 may transmit the message based on a request to establish a network slice to meet one or more service requirements. The AF 67 may be the application function of the operator, or a third party application server (e.g. vertical industrial application server). If the third party application does not support the AF, it may request the AF 67 as the sponsor, which may be transparent to the NEF 66. The network slicing information may comprise one or more of the following information elements: network slicing required indications, the required minimal bandwidth of the network slice, the provided latency of the network slice, the priority of the network slice, a third party ID, a third party charging indication, a S-NSSAI or an AF-Service-Identifier. If the PDU session may be required at the same time, the AF 67 may provide the following information to the PCF 65: service data flow information, the user identity, and/or the APN identity. If the PDU session may be required at the same time, the AF 67 may provide the following information to the PCF 65: service data flow information, the user identity, and/or the APN identity.

At step 602, the NEF 66 may send to the PCF 65 a message (e.g. network slice request message) comprising the information received from the AF 67. The NEF 66 may check whether the application may be authorized to initiate and/or request a network slice (e.g. before the NEF 66 sends the message to the PCF 65). At step 603, based on receiving the network slice request message from the NEF 66, the PCF 65 may perform at least one of the following actions. Policy decisions may be made based on the information from the NEF 66, the information from the UDM, and/or the pre-configured policy in the PCF 65. The policy may apply for the slice. The policy may comprise the QoS policy (e.g. the required bandwidth of the network slice), charging policy (e.g. third party charging), the priority of the network slice, packet inspection policy, and/or packet routing policy etc. A network slice ID may be created or generated. The network slice ID may identify a network slice. The network slice ID may be per wireless device, per PLMN, or per operator. The network slice ID may unique be per wireless device, per PLMN, or per operator. For example, the network slice ID may be unique per PLMN. Wireless device 1 has Network Slice IDs ID1, ID2, and ID3 and wireless device 2 has Network Slice IDs ID4, ID5, and ID6. These Network Slice IDs ID1, ID2, ID3, ID4, ID5, and ID6 may be different and uniqueness may be guaranteed. A message (e.g. network slice establishment request message) may be sent to AMF 62 comprising one or more of the following information: the network slicing information, the network slice ID, the policy, or the S-NSSAI. The message may also comprise the service data flow information, the user identity, and the APN identity, if applicable.

At step 604, the AMF 62 may perform at least one of the following actions (e.g. after receiving the network slice establishment request message from the PCF 65). The AMF 62 may accept the slice establishment request, and the AMF 62 may allocate the PDU session ID if the PDU session may be established together with the network slice establishment. The AMF may send to a SMF 64 a message (e.g. network slice establishment request message) comprising one or more of the following information: the network slicing information, the network slice ID, the policy, or the S-NS-SAI. The message may comprise the service data flow information, the user identity, the APN identity, and/or PDU session ID, if applicable. The AMF 62 may not accept the slice establishment, the AMF 52 may reject the request from the PCF 65, the AMF 62 may not send the message to the SMF 64, and/or the following actions 605 to 612 may not be performed.

At step 605, the SMF 64 may send to the PCF 65 a message (e.g. network slice establishment request message) with the information received from the AMF 62 to get the policy (s) for network slice and/or PDU session. Additionally or alternatively, the PCF 65 may push the policy(s) for network slice and/or PDU session to the SMF 64. At step 606, the SMF 64 may send to a UPF 63 a message (e.g. network slice establishment request message) to establish the user plane comprising one or more of the following information: the network slicing information, the network slice ID, the policy, or the S-NSSAI. The message may comprise the service data flow information, the user identity, the APN identity, and/or PDU session ID, if applicable. At step 607, the AMF 62 may send to a (R)AN 61 a message (e.g. network slice establishment request message) comprising one or more of the following information: the network slicing information, the network slice ID, the policy, or the S-NSSAI. The message may comprise the service data flow information, the user identity, the APN identity, and/or PDU session ID, if applicable. At step 608, the (R)AN 61 may send to a wireless device 60 a message (e.g. network slice establishment request message) comprising one or more of the following information: the network slicing information, the network slice ID, the policy, or the S-NSSAI. The message may comprise the service data flow information, the APN identity, and/or PDU session ID, if applicable. At step 609, the wireless device 60 may acknowledge the (R)AN 61 by sending a response message (e.g. network slice establishment response). At step 610, the (R)AN 61 may acknowledge the AMF 62 by sending a response message (e.g. network slice establishment response). At step 611, the UPF 63 may acknowledge the SMF 64 by sending a response message (e.g. network slice establishment response). At step 612, the SMF 64 may acknowledge the AMF 62 by sending a response message (e.g. network slice establishment response). At step 613, the AMF 62 may acknowledge the PCF 65 by sending a response message (e.g. network slice establishment response). At step 614, the PCF 65 may acknowledge the NEF 66 by sending a response message (e.g. network slice response). At step 615, the NEF 66 may acknowledge the AF 67 by sending a response message (e.g. network slice response). The application service may be performed on the slice between the application and the wireless device (e.g. after the slice is established successfully). An AF may initiate and establish a new network slice and a network slice ID may be allocated by an AMF.

Figure 19:
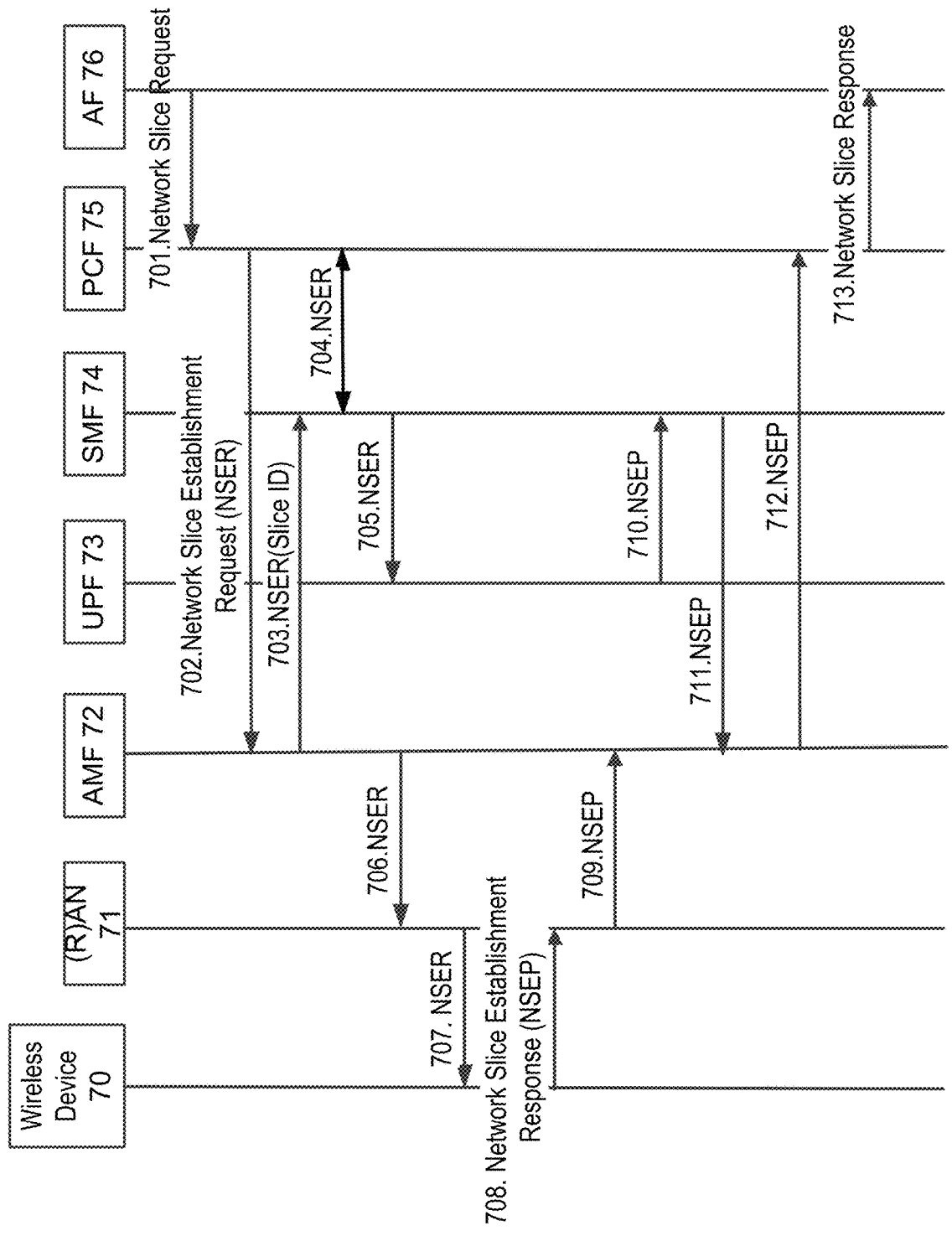
FIG. 19 shows an example for initiating and establishing a new network slice using an AMF.

FIG. 19 shows an example for initiating and establishing a new network slice using an AMF. At step 701, an AF 76 may transmit to a PCF 75 a message (e.g. network slice request message) comprising network slicing information. The AF 76 may transmit the message based on a request to establish a network slice to meet one or more service requirements. The AF 76 may be the application function of the operator, or a third party application server (e.g. vertical industrial application server). If the third party application does not support the AF, it may request the AF 76 as the sponsor, which may be transparent to the PCF 75. The network slicing information may comprise one or more of the following information elements: network slicing required indications, the required minimal bandwidth of the network slice, the provided latency of the network slice, the priority of the network slice, a third party ID, a third party charging indication, a S-NSSAI, or an AF-Service-Identifier. If the PDU session may be required at the same time, the AF 76 may provide the following information to the PCF 75 service data flow information, the user identity, and/or the APN identity. If the PDU session may be required at the same time, the AF 76 may provide the following information to the PCF 75: service data flow information, the user identity, and/or the APN identity.

At step 702, based on receiving the network slice request message from the AF 76, the PCF 75 may perform at least one of the following actions. A policy decision may be made based on the information received from the AF 76, the information from the UDM, and/or the pre-configured policy in the PCF 75. The policy may apply for the slice. The policy may comprise the QoS policy (e.g. the required bandwidth of the network slice), charging policy (e.g. third party charging), the priority of the network slice, packet inspection policy, and/or packet routing policy etc. A message (e.g. network slice establishment request message) may be sent to AMF 72 comprising one or more of the following information: the network slicing information, the policy, or the S-NSSAI. The message may comprise the service data flow information, the user identity, and/or the APN identity, if applicable.

At step 703, the AMF 72 may perform at least one of the following actions (e.g. after receiving the network slice establishment request message from the PCF 75). The AMF 72 may accept the slice establishment request, and/or the AMF 72 may create or generate a network slice ID. The network slice ID may identify a network slice. A message (e.g. network slice establishment request message) may be sent to SMF 74 comprising one or more of the following information: the network slicing information, the network slice ID, the policy, or the S-NSSAI. The message may comprise the service data flow information, the user identity, the APN identity, and/or PDU session ID, if applicable. The network slice ID may be per wireless device, per PLMN, or per operator. The network slice ID may unique be per wireless device, per PLMN, or per operator. For example, the network slice ID may be unique per PLMN. Wireless device 1 has Network Slice IDs ID1, ID2, and ID3 and wireless device 2 has Network Slice IDs ID4, ID5, and ID6. These Network Slice IDs ID1, ID2, ID3, ID4, ID5, and ID6 may be different and uniqueness may be guaranteed. A PDU session ID may be allocated if the PDU session may be established together with the network slice establishment. The AMF 72 may not accept the slice establishment, the AMF 72 may reject the request from the PCF 75, the AMF 72 may not send the message to the SMF 74, and/or the following actions 704 to 711 may not be performed.

At step 704, the SMF 74 may send to the PCF 75 a message (e.g. network slice establishment request message) with the information received from the AMF 72 to get the policy(s) for network slice and/or PDU session. Additionally or alternatively, the PCF 75 may push the policy(s) for network slice and/or PDU session to the SMF 74. At step 705, the SMF 74 may send to a UPF 73 a message (e.g. network slice establishment request message) to establish the user plane comprising one or more of the following information: the network slicing information, the network slice ID, the policy, or the S-NSSAI. The message may also comprise the service data flow information, the user identity, the APN identity, and/or PDU session ID, if applicable. At step 706, the AMF 72 may send to a (R)AN 71 a message (e.g. network slice establishment request message) comprising one or more of the following information: the network slicing information, the network slice ID, the policy, or the S-NSSAI. The message may comprise the service data flow information, the user identity, the APN identity, and/or PDU session ID, if applicable. At step 707, the (R)AN 71 may send to a wireless device 70 a message (e.g. network slice establishment request message) comprising one or more of the following information: the network slicing information, the network slice ID, the policy, or the S-NSSAI. The message may comprise the service data flow information, the APN identity and/or PDU session ID, if applicable. At step 708, the wireless device 70 may acknowledge the (R)AN 71 by sending a response message (e.g. network slice establishment response). At step 709, the (R)AN 71 may acknowledges the AMF 72 by sending a response message (e.g. network slice establishment response). At step 710, the UPF 73 may acknowledge the SMF 74 by sending a response message (e.g. network slice establishment response). At step 711, the SMF 74 may acknowledge the AMF 72 by sending a response message (e.g. network slice establishment response). At step 712, the AMF 72 may acknowledge the PCF 75 by sending a response message (e.g. network slice establishment response). At step 713, the PCF 75 may acknowledge the AF 76 by sending a response message (e.g. network slice response). The application service may be performed on the slice between the application and the wireless device (e.g. after the slice is established successfully).

An AF may connect to a NEF, the AF may initiate and establish a new network slice, and a network slice ID may be allocated by an AMF.

Figure 20:
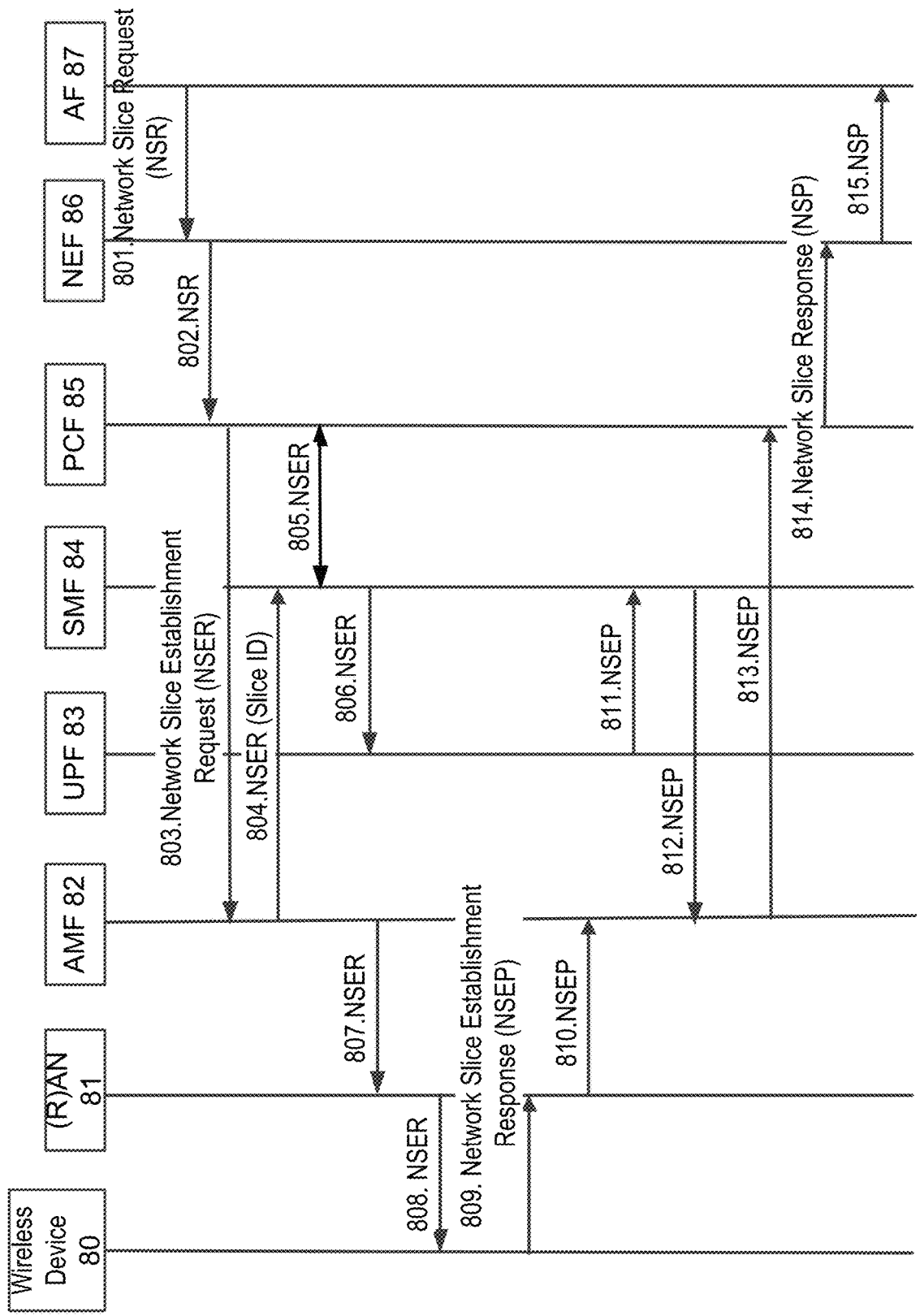
FIG. 20 shows an example for initiating and establishing a network slice using an AMF via a NEF.

FIG. 20 shows an example for initiating and establishing a network slice using an AMF via a NEF. At step 801, an AF 87 may transmit to a NEF 86 a message (e.g. network slice request message) comprising network slicing information. The AF 87 transmits the message based on a request to establish a network slice to meet one or more service requirements. The AF 87 may be the application function of the operator, or a third party application server (e.g. vertical industrial application server). If the third party application does not support the AF, it may request the AF 87 as the sponsor, which may be transparent to the NEF 86. The network slicing information may comprise one or more of the following information elements: network slicing required indications, the required minimal bandwidth of the network slice, the provided latency of the network slice, the priority of the network slice, a third party ID, a third party charging indication, a S-NSSAI, or an AF-Service-Identifier. If the PDU session may be required at the same time, the AF 87 may provide the following information to the NEF 86 service data flow information, the user identity, and/or the APN identity. If the PDU session may be required at the same time, the AF 87 may provide the following information to the NEF 86: service data flow information, the user identity, and/or the APN identity.

At step 802, the NEF 86 may send to the PCF 85 a message (e.g. network slice request message) comprising the information received from the AF 87. The NEF 86 may check whether the application may be authorized to initiate and/or request a network slice, e.g. before the NEF 86 sends the message to the PCF 85. At step 803, based on receiving the network slice request message from the NEF 86, the PCF 85 may perform at least one of the following actions. A policy decision may be made based on the information from the NEF 86, the information from the UDM, and/or the pre-configured policy in the PCF 85. The policy may apply for the slice. The policy may comprise the QoS policy (e.g. the required bandwidth of the network slice), charging policy (e.g. third party charging), the priority of the network slice, packet inspection policy and/or packet routing policy etc. A message (e.g. network slice establishment request message) may be sent to AMF 82 comprising one or more of the following information: the network slicing information, the policy, or the S-NSSAI. The message may comprise the service data flow information, the user identity, and the APN identity, if applicable.

At step 804, the AMF 82 may perform at least one of the following actions (e.g. after receiving the network slice establishment request message from the PCF 85). The AMF 82 may accept the slice establishment request, and the AMF 82 may create or generate a network slice ID. The network slice ID may identify a network slice, and send to a SMF 84 a message (e.g. network slice establishment request message) comprising one or more of the following information: the network slicing information, the network slice ID, the policy, or the S-NSSAI. The message may comprise the service data flow information, the user identity, the APN identity, and/or PDU session ID, if applicable. The network slice ID may be per wireless device, per PLMN, or per operator. The network slice ID may unique be per wireless device, per PLMN, or per operator. The network slice ID may be unique per PLMN. Wireless device 1 has Network Slice IDs ID1, ID2, and ID3 and wireless device 2 has Network Slice IDs ID4, ID5, and ID6. These Network Slice IDs ID1, ID2, ID3, ID4, ID5, and ID6 may be different and uniqueness may be guaranteed. A PDU session ID may be allocated if the PDU session may be established together with the network slice establishment. The AMF 82 may not accept the slice establishment, the AMF 82 may reject the request from the PCF 85, the AMF 82 may not send the message to the SMF 84, and./or the following actions 805 to 812 may not be performed.

At step 805, the SMF 84 may send to the PCF 85 a message (e.g. network slice establishment request message) with the information received from the AMF 82 to get the policy(s) for network slice and/or PDU session. Additionally or alternatively, the PCF 85 may push the policy(s) for network slice and/or PDU session to the SMF 84. At step 806, the SMF 84 may send to a UPF 83 a message (e.g. network slice establishment request message) to establish the user plane comprising one or more of the following information: the network slicing information, the network slice ID, the policy, or the S-NSSAI. The message may comprise the service data flow information, the user identity, the APN identity, and/or PDU session ID, if applicable. At step 807, the AMF 82 may send to a (R)AN 81 a message (e.g. network slice establishment request message) comprising one or more of the following information: the network slicing information, the network slice ID, the policy, or the S-NSSAI. The message may comprise the service data flow information, the user identity, the APN identity, and/or PDU session ID, if applicable. At step 808, the (R)AN 81 may send to a wireless device 80 a message (e.g. network slice establishment request message) comprising one or more of the following information: the network slicing information, the network slice ID, the policy, or the S-NSSAI. The message may comprise the service data flow information, the APN identity, and/or PDU session ID, if applicable. At step 809, the wireless device 80 may acknowledge the (R)AN 81 by sending a response message (e.g. network slice establishment response). At step 810, the (R)AN 81 may acknowledge the AMF 82 by sending a response message (e.g. network slice establishment response). At step 811, the UPF 83 may acknowledge the SMF 84 by sending a response message (e.g. network slice establishment response). At step 812, the SMF 84 may acknowledge the AMF 82 by sending a response message (e.g. network slice establishment response). At step 813, the AMF 82 may acknowledge the PCF 85 by sending a response message (e.g. network slice establishment response). At step 814, the PCF 85 may acknowledge the NEF 86 by sending a response message (e.g. network slice response). At step 815, the NEF 86 may acknowledge the AF 87 by sending a response message (e.g. network slice response). The application service may be performed on the slice between the application and the wireless device (e.g. after the slice is established successfully).

An AF may trigger a new network slice establishment, and the pre-configured network slice ID may be derived by a PCF.

Figure 21:
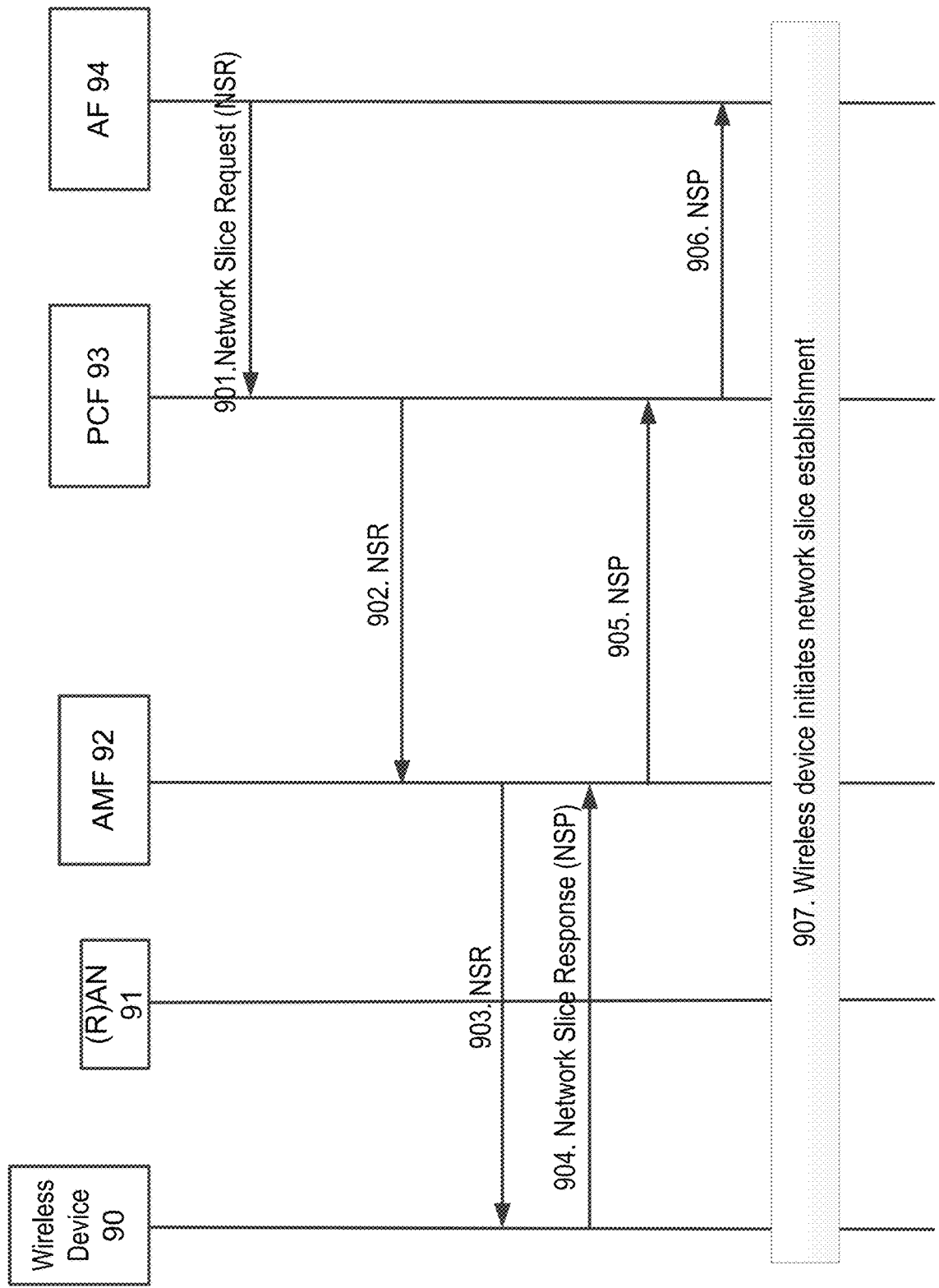
FIG. 21 shows an example for deriving a network slice ID using a PCF.

FIG. 21 shows an example for deriving a network slice ID using a PCF. At step 901, an AF 94 may transmit to a PCF 93 a message (e.g. network slice request message) comprising network slicing information. The AF 93 may transmit the message based on request to establish a network slice to meet one or more service requirements. The AF 94 may be the application function of the operator, or a third party application server (e.g. vertical industrial application server). If the third party application does not support the AF, it may request the AF 94 as the sponsor, which may be transparent to the PCF 93. The network slicing information may comprise one or more of the following information elements: network slicing required indications, the required minimal bandwidth of the network slice, the provided latency of the network slice, the priority of the network slice, a third party ID, a third party charging indication, a S-NSSAI, or an AF-Service-Identifier. If the PDU session may be required at the same time, the AF 94 may provide the following information to the PCF 93 service data flow information, the user identity, and/or the APN identity.

At step 902, the PCF 93 may perform at least one of the following actions (e.g. after receiving the network slice request message from the AF 94): derive a pre-configured network slice ID and send a message (e.g. network slice establishment request message) to an AMF 92 comprising one or more of the following information: the pre-configured network slice ID or the S-NSSAI. The network slice ID may identify a network slice and uniquely per wireless device, per PLMN, and/or per operator. The message may comprise the service data flow information, the user identity and/or the APN identity, if applicable.

At step 903, the AMF 92 may send a message (e.g. network slice request message, which may be sent by the AMF 92 after receiving the network slice establishment request message from the PCF 93) to the wireless device 90. The message may comprise one or more of the following information: the network slice ID or the S-NSSAI. The message may comprise the service data flow information, the user identity, and/or the APN identity, if applicable. Additionally or alternatively, the AMF 92 may send a message (e.g. network slice request message) to the (R)AN 91 comprising one or more of the following information: the network slice ID and/or the S-NSSAI, and (R)AN 91 may send a message (e.g. network slice request message) to the wireless device 90 comprising one or more of the following information: the network slice ID or the S-NSSAI.

At step 904, the wireless device 90 acknowledges the AMF 92 by sending a response message (e.g. network slice response message). Additionally or alternatively, corresponding to the alternative actions at step 903, the wireless device 90 may send a response message to (R)AN 91, and (R)AN 91 may send a response message to AMF 92. At step 905, the AMF 92 may acknowledge the PCF 93 by sending a response message (e.g. network slice response message). At step 906, the PCF 93 may acknowledge the AF 94 by sending a response message (e.g. network slice response message). At step 907, the wireless device may initiate network slice establishment. The following are example procedures; the wireless device may use one or more of these procedures to initiate network slice establishment. The procedure may comprise wireless device registration procedure in 3GPP TS 23.502. The wireless device may trigger the slice and/or the PDU session establishment by including the network slice ID in the Registration Request message. The procedure may comprise wireless device triggered Service Request Procedure in 3GPP TS 23.502. The wireless device may trigger the slice and/or the PDU session establishment by including the network slice ID in the Service Request message. The procedure may comprise wireless device requested PDU Session Establishment in 3GPP TS 23.502. The wireless device may trigger the slice and/or the PDU session establishment by including the network slice ID in the PDU Session Establishment Request. The application service may be performed on the slice between the application and the wireless device (e.g. after the slice is established successfully).

An AF may trigger a new network slice establishment, and the pre-configured network slice ID may be derived by a NEF.

Figure 22:
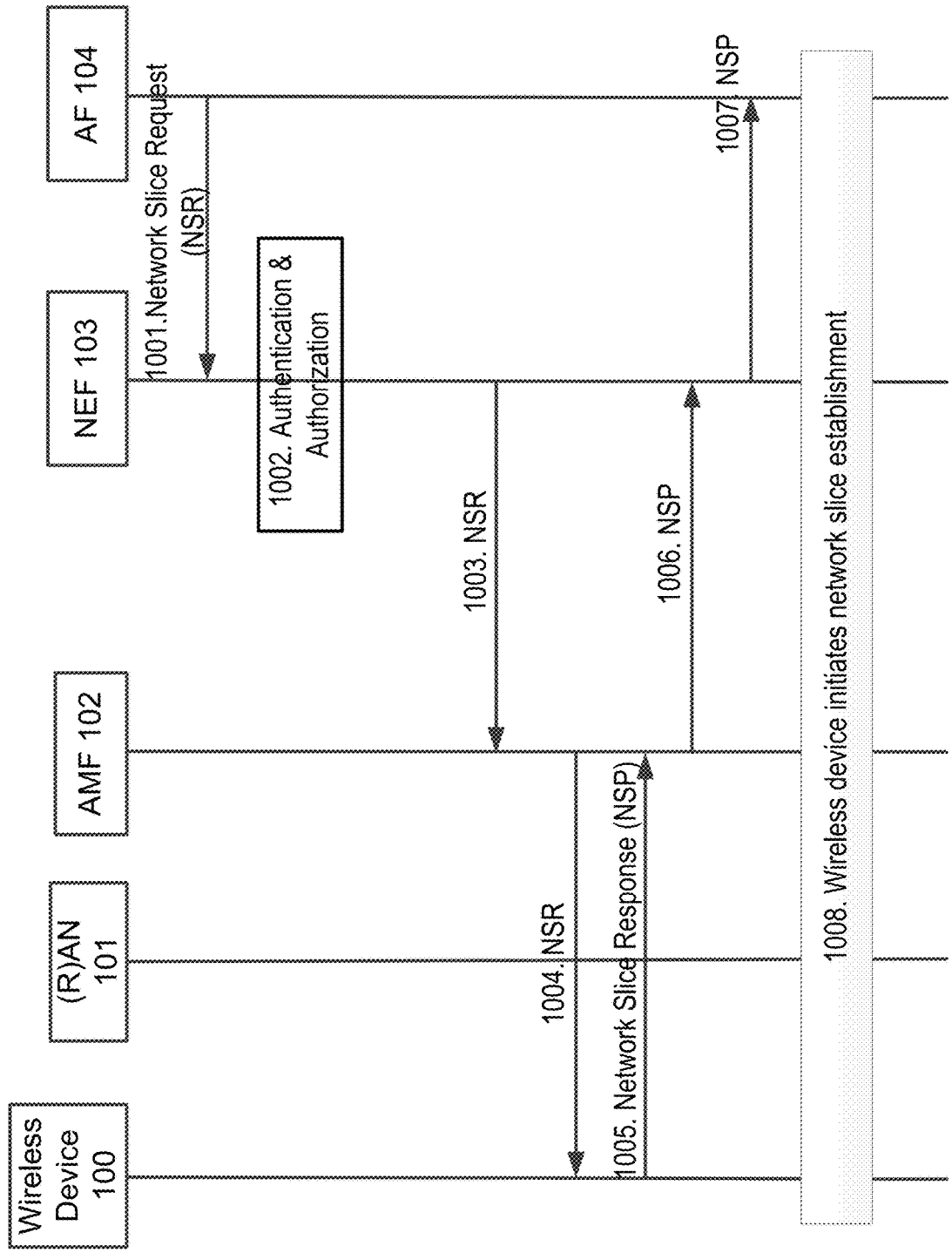
FIG. 22 shows an example for deriving a network slice ID using a NEF.

FIG. 22 shows an example for deriving a network slice ID using a NEF. At step 1001, an AF 104 may transmit to a NEF 103 a message (e.g. network slice request message) comprising network slicing information. The AF 104 may transmit the message based on a request to establish a network slice to meet one or more service requirements. The AF 104 may be the application function of the operator, or a third party application server (e.g. vertical industrial application server). If the third party application does not support the AF, it may request the AF 104 as the sponsor, which may be transparent to the NEF 103. The network slicing information may comprise one or more of the following information elements: network slicing required indications, the required minimal bandwidth of the network slice, the provided latency of the network slice, the priority of the network slice, a third party ID, a third party charging indication, a S-NSSAI, or an AF-Service-Identifier. If the PDU session may be required at the same time, the AF 36 may provide the following information to the PCF 35 service data flow information, the user identity, and/or the APN identity.

At step 1002, the NEF 103 may check whether the application may be authorized to initiate and/or request a network slice. At step 1003, the NEF 103 may perform at least one of the following actions: derive a pre-configured network slice ID, where the network slice ID identifies a network slice and uniquely per wireless device, per PLMN or per operator, and/or send a message (e.g. network slice establishment request message) to an AMF 102 comprising one or more of the following information: the pre-configured network slice ID or the S-NSSAI. The message may also comprise the service data flow information, the user identity, and/or the APN identity, if applicable. At step 1004, the AMF 102 may send a message (e.g. network slice request message which may be sent by the AMF 102 after receiving the network slice establishment request message from the NEF 103) to the wireless device 100. The message may comprise one or more of the following information: the network slice ID, or the S-NSSAI. The message may comprise the service data flow information, the user identity, and/or the APN identity, if applicable. Additionally or alternatively, the AMF 102 may send a message (e.g. network slice request message) to the (R)AN 101 comprising one or more of the following information: the network slice ID or the S-NSSAI, and (R)AN 101 may send a message (e.g. network slice request message) to the wireless device 100 comprising one or more of the following information: the network slice ID or the S-NSSAI. At step 1005, the wireless device 100 may acknowledge the AMF 102 by sending a response message (e.g. network slice response message). Additionally or alternatively, corresponding to the alternative actions at step 1004, the wireless device 100 may send a response message to (R)AN 101, and (R)AN 101 may send a response message to AMF 102 At step 1006, the AMF 102 may acknowledge the NEF 103 by sending a response message (e.g. network slice response message). At step 1007, theme 103 may acknowledge the AF 104 by sending a response message (e.g. network slice response message). At step 1008, the wireless device may initiate network slice establishment. The following are example procedures; the wireless device may use one or more of these procedures to initiate network slice establishment: wireless device registration procedure in 3GPP TS 23.502. The wireless device may trigger the slice and/or the PDU session establishment by: including the network slice ID in the Registration Request message; a wireless device triggered Service Request Procedure in 3GPP TS 23.502, in which the wireless device may trigger the slice and/or the PDU session establishment by including the network slice ID in the Service Request message; and/or a wireless device requested PDU Session Establishment in 3GPP TS 23.502, in which the wireless device may trigger the slice and/or the PDU session establishment by including the network slice ID in the PDU Session Establishment Request. The application service may be performed on the slice between the application and the wireless device (e.g. after the slice is established successfully). An application may trigger a new network slice establishment.

Figure 23:
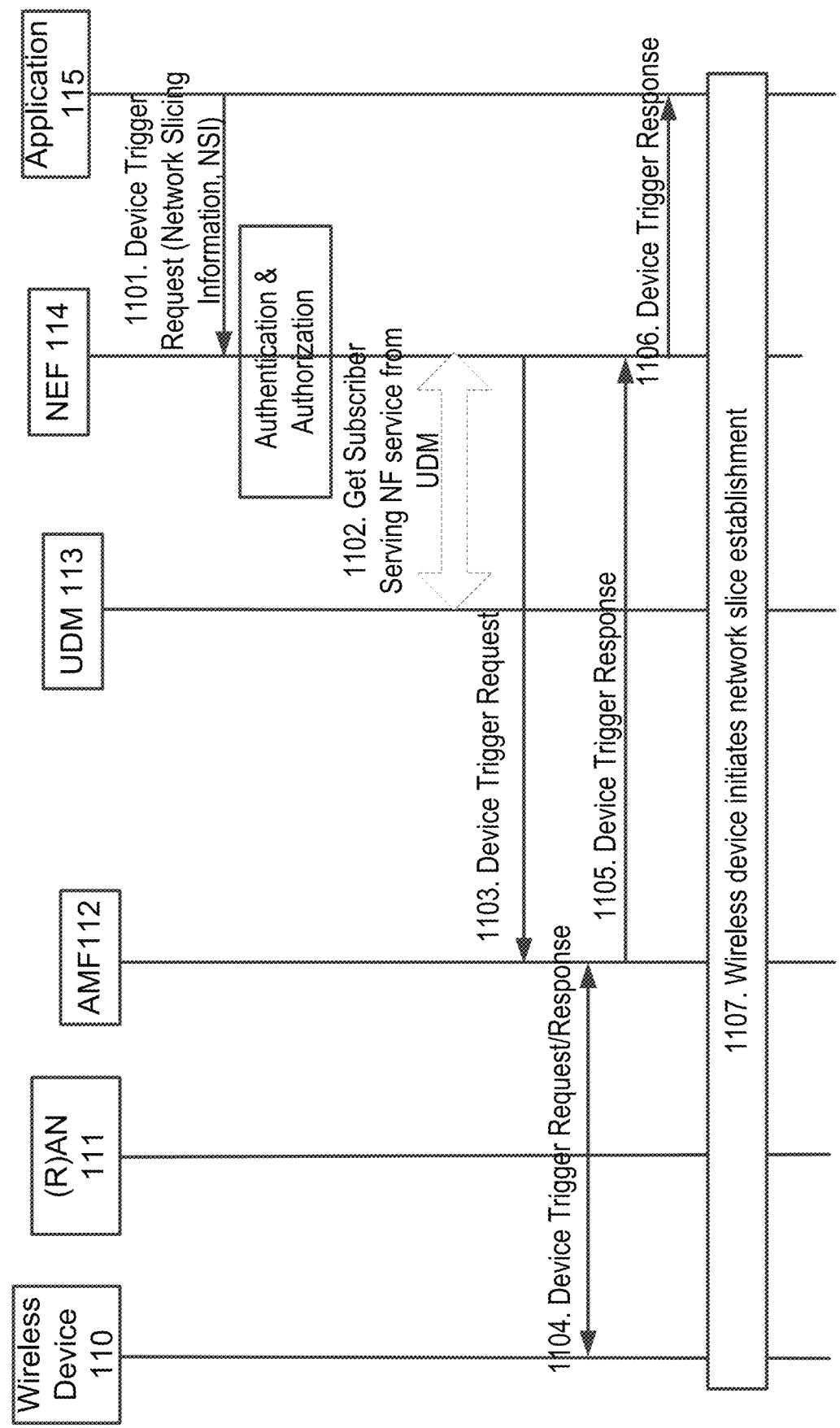
FIG. 23 shows an example for triggering the establishment of a network slice.

FIG. 23 shows an example for triggering the establishment of a network slice. At step 1101, a NEF 114 may receive a device trigger request (e.g. External Identifier or MSISDN, requester identifier, validity period, application port ID, and/or trigger payload) message from the application 115. The application portID may be used to address a triggering function within the wireless device. The validity period may indicate for how long the trigger message may be valid. The trigger payload may contain the information destined for the application on the wireless device, along with the information to route it to which application on the wireless device. The network slicing information may also be comprised in the device trigger request. The network slicing information may comprise one or more of the following information elements: network slicing required indications, the required minimal bandwidth of the network slice, the provided latency of the network slice, the priority of the network slice, a third party ID, a third party charging indication, a S-NSSAI, or an AF-Service-Identifier. If the PDU session may be required at the same time, the Application 115 may provide the following information to the NEF 114 service data flow information, the user identity, and/or the APN identity.

At step 1102, the NEF 114 may check whether the application 115 may be authorized to send the device trigger based on the requester identifier. The NEF 114 may also check whether the requester has exceeded its quota or rate of trigger submission. The NEF 114 may invoke the "Get Subscriber Serving NF (External Identifier or MSISDN, NF type)" service provided by the UDM 113 to determine the NF that serves the wireless device and/or obtain the SUPI of the wireless device. At step 1103, the NEF 114 may send the device trigger request (wireless device permanent ID, NAS Container) to the AMF 112. A NAS container may comprise the Application Port ID and trigger payload received in step 1101. The network slicing information may also be comprised in the device trigger request.

At step 1104, the AMF 112 may send the device trigger request (e.g. NAS container) to the wireless device 110. If the wireless device 110 is not connected, the AMF 112 may page the wireless device. If the wireless device 110 receives the NAS container, the trigger payload may identify which application(s) may be to be notified and the information to be notified to the application, e.g. PDU session establishment may be requested. The network slicing information may also be included in the device trigger request. The corresponding response message may be sent to the AMF 112 to confirm the receiving the request message. At step 1105, the NEF 114 may receive the Device Trigger Response from the AMF 112 At step 1106, the NEF 114 may send the Device Trigger Response to the Application Server 115 At step 1107, the wireless device may initiate network slice establishment. The following are example procedures, the wireless device may use one or more of these procedures to initiate network slice establishment: a wireless device registration procedure in 3GPP TS 23.502, in which the wireless device may trigger the slice and/or the PDU session establishment by including the network slice ID in the Registration Request message; a wireless device triggered Service Request Procedure in 3GPP TS 23.502, in which the wireless device may trigger the slice and/or the PDU session establishment by including the network slice ID in the Service Request message; and/or a wireless device requested PDU Session Establishment in 3GPP TS 23.502, in which the wireless device may trigger the slice and/or the PDU session establishment by including the network slice ID in the PDU Session Establishment Request. The application service may be performed on the slice between the application and the wireless device (e.g. after the slice is established successfully).

A PCF may determine a network slice identifier. A policy control function, PCF, may receive from a first network entity, a first message configured to request a network slice for a wireless device. The first message may comprise at least one of: a network slice request indication; a required bandwidth of the network slice; a provided latency of the network slice; a priority information of the network slice; a service provider identifier of a service provider requesting the network slice; a slice type information associated with the network slice; and a charging information for the network slice. The PCF may create/generate a network slice identifier for the network slice based on the first message. The PCF may make the policy decision. The PCF may transmit, to a second network entity, a second message configured to request to establish the network slice for the wireless device. The second message may comprise the network slice identifier.

A first network entity may be an application function, AF. The AF may be the application function of the operator, or a third party application server (e.g. vertical industrial application server). The first network entity may be a network exposure function, NEF. The NEF may configure the first message at least based on a network slice request message received from an application function, AF, the network slice request message comprising one or more elements of the first message. The NEF may transmit the first message if the AF may be authorized to initiate the network slice.

A second network entity may be a session management function, SMF, and the SMF further may transmit, to an access and mobility management function, AMF, a network slice establishment request associated with the network slice for the wireless device with the network slice identifier. The AMF may request a network slice establishment to the wireless device, directly or through a base station, by transmitting at least the network slice identifier, and/or may receive a response for the request of the network slice establishment. The AMF may receive a response message for the network slice establishment request.

A SMF may perform a charging function if the charging policy is received from the PCF, the charging function comprising at least one of the following: collecting the data or time usage of the user and/or reporting the usage to the OCS and/or OFCS. If the SMF have received the third party charging indication from the PCF, the SMF may comprise this indication and/or third party identifier in the CDR or charging message, and/or may send to the OCS and/or OFCS for third party charging. The OCS and/or OFCS may perform a charging for the third party and not charging for the user (e.g. after receiving the third party charging indication and/or third party identifier from the SMF).

A second network entity may be an access and mobility management function, AMF. The AMF may transmit, to the wireless device, directly or through a base station, a network slice establishment request for the network slice with the network slice identifier, and/or may receive a response message for the network slice establishment request. The AMF may transmit, to a session management function, SMF, a session creation (or modification) request associated with the network slice based on at least one of: the second message; and/or the response message received from the wireless device, directly or through a base station.

A SMF may transmit, to a user plane function, UPF, a session creation (or modification) request for the network slice. The PCF may receive, from the second network entity, a third message based on the second message. The PCF may transmit, to the first network entity, a fourth message based on the first message at least based on the third message. The second message may comprise one or more elements of the first message if the network slice identifier for the network slice may be not pre-configured in the PCF. The PCF may make a policy decision based on information received from the first network entity, the information that the first network entity may have received from the UDM and/or the pre-configured policy in the PCF. The second message may further comprise the policy. The policy may comprise QoS policy (e.g. the required bandwidth of the network slice), charging policy (e.g. third party charging), the priority of the network slice, packet inspection policy, packet routing policy, and/or the like.

A SMF may determine a network slice identifier. The SMF may receive, from a policy control function, PCF, a first message configured to request a network slice for a wireless device, the first message comprising at least one of: a network slice request indication; a required bandwidth of the network slice; a priority information of the network slice; a service provider identifier of a service provider requesting the network slice; a slice type information associated with the network slice; a charging information for the network slice; and/or a required latency of the network slice.

A SMF may perform one or more of the following actions: creating/generating a network slice identifier for the network slice based on the first message; allocating the CN Tunnel Info; allocating the PDU session ID if the PDU session may be established together with the network slice establishment; and/or the like. The AMF may transmit, a second message configured to request to establish the network slice for the wireless device, the second message comprising the network slice identifier.

A SMF may transmit, to a user plane function, UPF, a session creation (or modification) request for the network slice. The PCF may transmit the first message at least based on a network slice request message received from an application function, AF, the network slice request message comprising one or more elements of the first message.

A PCF may transmit the first message at least based on a network slice establishment request received from a network exposure function, NEF. The NEF may configure the network slice establishment request at least based on a network slice request message received from an application function, AF. The NEF may transmit the network slice establishment request if the AF may be authorized to initiate the network slice. The network slice establishment request and/or the network slice request message may comprise one or more elements of the first message.

An AMF may request a network slice establishment to the wireless device, directly or through a base station, and/or may receive a response for the request of the network slice establishment. A SMF may receive, from the AMF, a third message based on the second message. The SMF may transmit, to the PCF, a fourth message based on the first message at least based on the third message.

A second message may comprise one or more elements of the first message if the network slice identifier for the network slice may be not pre-configured in the SMF. The SMF may determine a network slice identifier for the network slice at least based on one or more elements of the first message. The SMF may further perform a charging function (e.g. collecting the data or time usage of the user and reporting the usage to the OCS and/or OFCS) if the charging policy is received from the PCF. If the SMF has received a third party charging indication from the PCF, the SMF may include this indication and/or a third party identifier of the third party in the CDR or a charging message, and/or the SMF may send to the OCS and/or OFCS for third party charging. The OCS and/or OFCS may perform a charging for the third party, and not charging for the user, e.g. after receiving the third party charging indication and/or the third party identifier from the SMF.

An AMF may determine a network slice identifier. An AMF may receive, from a policy control function, PCF, a first message configured to request a network slice for a wireless device, the first message comprising at least one of: a network slice request indication; required bandwidth of the network slice; a priority information of the network slice; a service provider identifier of a service provider requesting the network slice; a slice type information associated with the network slice; a charging information for the network slice; and/or a required latency of the network slice. The AMF may determine a network slice identifier for the network slice based on the first message. The AMF may transmit, to a wireless device, directly or through a base station, a second message configured to request to establish the network slice. The second message may comprise the network slice identifier. The PCF may transmit the first message at least based on a network slice request message received from an application function, AF, the network slice request message comprising one or more elements of the first message.

A PCF may transmit the first message at least based on a network slice establishment request received from a network exposure function, NEF. The NEF may configure the network slice establishment request at least based on a network slice request message received from an application function, AF. The NEF may transmit the network slice establishment request if the AF may be authorized to initiate the network slice. The network slice establishment request and/or the network slice request message may comprise one or more elements of the first message.

An AMF may receive, from the wireless device, directly or through a base station, a third message based on the second message. The AMF may transmit a fourth message based on the first message at least based on the third message. The AMF may transmit, to a session management function, SMF, a session creation (or modification) request associated with the network slice based on the first message. The AMF may transmit, to a session management function, SMF, a session creation (or modification) request associated with the network slice based on the third message. The SMF may transmit, to a user plane function, UPF, a session creation (or modification) request for the network slice. The second message may further comprise one or more elements of the first message if the network slice identifier for the network slice may be not pre-configured in the AMF. The AMF may determine a network slice identifier for the network slice at least based on one or more elements of the first message.

Wireless devices may determine a network slice identifier. A wireless device may receive, from an access and mobility management function, AMF, directly or through a base station, a first message configured to request an establishment of a network slice, the first message comprising at least one of: a network slice request indication; a required bandwidth of the network slice; a priority information of the network slice; a service provider identifier of a service provider requesting the network slice; a slice type information associated with the network slice; a charging information for the network slice; and/or a required latency of the network slice. The wireless device may determine a network slice identifier for the network slice based on the first message. The wireless device may transmit, to the AMF, directly or through a base station, based on the first message, a second message comprising the network slice identifier.

An AMF may configure one or more elements of the first message at least based on a network slice request message received from a policy control function, PCF. The AMF may further transmit, to the PCF based on the network slice request message, a third message configured at least based on the second message. The AMF may transmit, to a session management function, SMF, a session creation (or modification) request associated with the network slice based on the network slice request message received from the PCF. The AMF may transmit, to a session management function, SMF, a session creation (or modification) request associated with the network slice based on the second message. The SMF may transmit, to a user plane function, UPF, a session creation (or modification) request for the network slice.

An AMF may configure one or more elements of the first message at least based on a network slice information message received from a network exposure function, NEF. The AMF may further transmit, to the NEF based on the network slice information message, a third message configured at least based on the second message. The wireless device may determine a network slice identifier for the network slice at least based on one or more elements of the first message.

Figure 24:
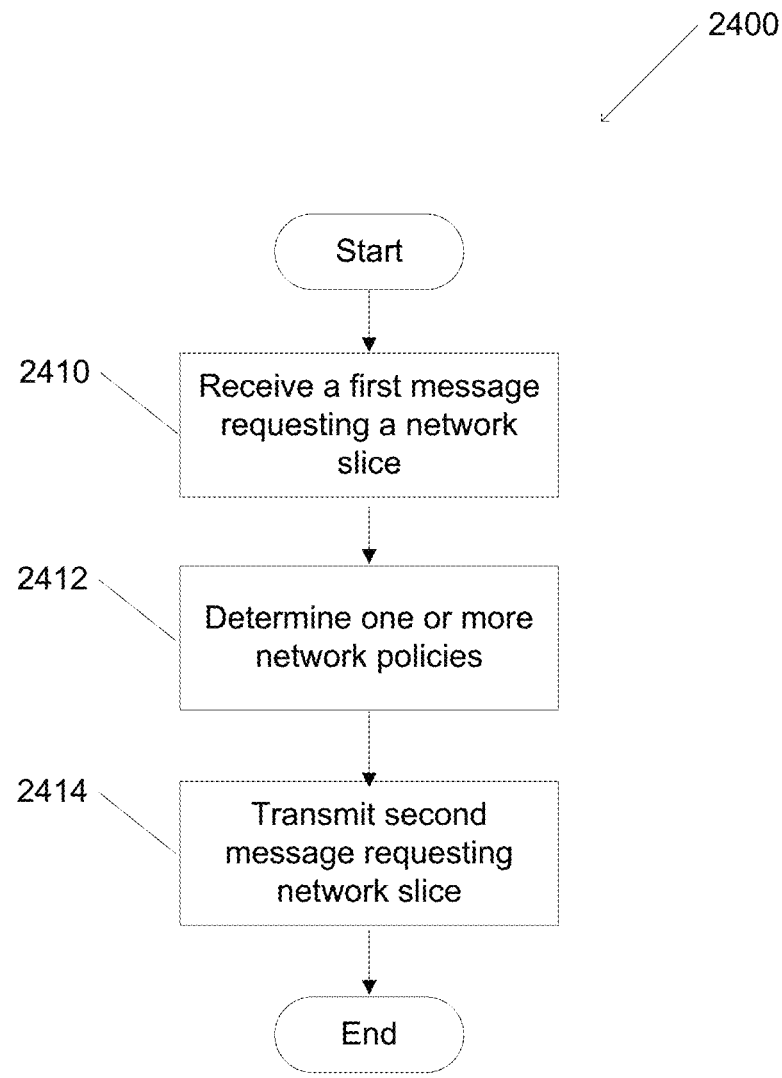
FIG. 24 shows an example of establishing a network slice using a PCF.

FIG. 24 shows an example of establishing a network slice using a PCF. The process 2400 may comprise receiving (2410) a first message requesting a network slice, determining (2412) one or more network policies based on the first message, and transmitting (2414) a second message requesting the establishment of a network slice. The first message may comprise requested bandwidth of the network slice and/or charging information for the network slice. The second message may comprise the determined network policies.

Figure 25:
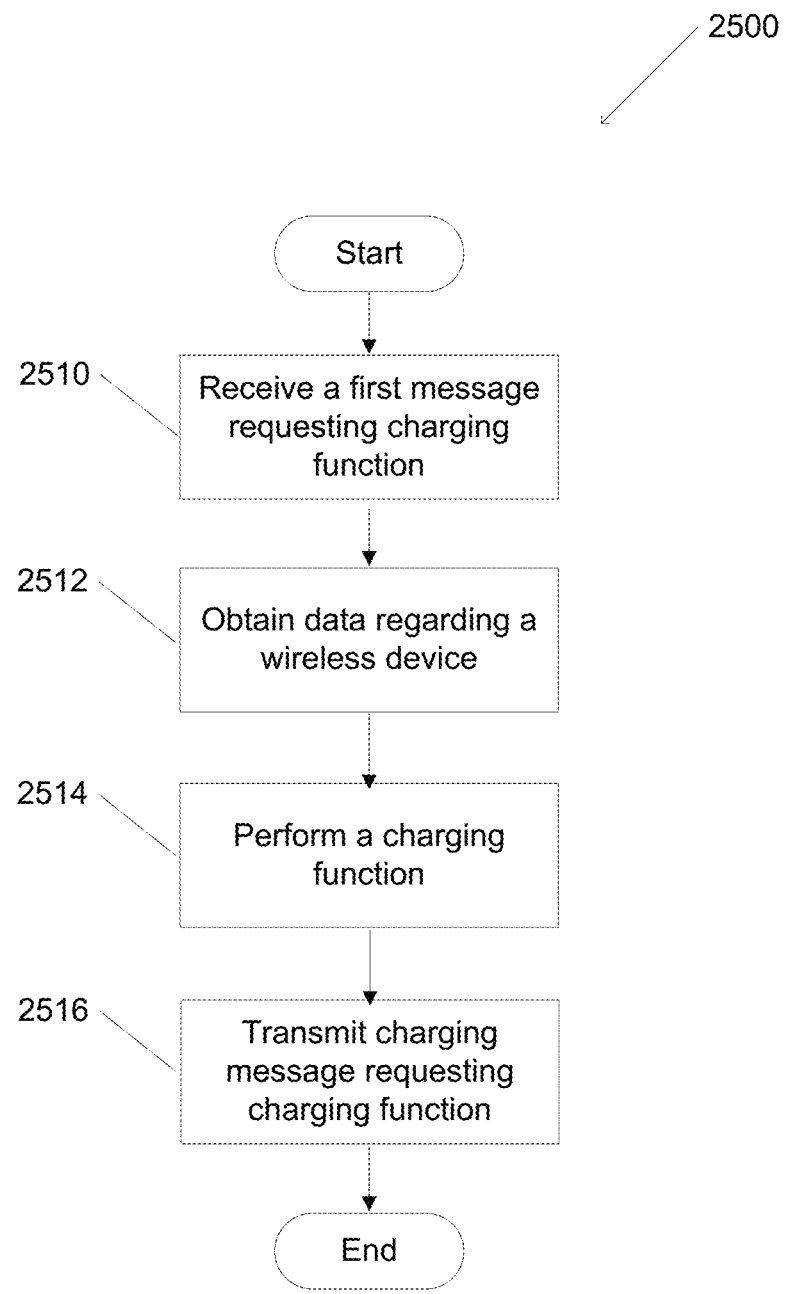
FIG. 25 shows an example of establishing a charging function using a SMF.

FIG. 25 shows an example of establishing a charging function. The process 2500 may comprise receiving (2510) a first message, obtaining (2512) data regarding a wireless device, performing (2514) a charging function, and transmitting (2516) a charging message. The first message may comprise a charging policy, a third party ID, and/or a third party charging indication. Data obtained regarding the wireless device may comprise collecting data and/or time of usage data for the wireless device. The charging function may comprise the obtained data regarding the wireless device. The charging message may comprise a CDR and may be sent to an OCS and/or an OFCS. The charging message may comprise the third party ID and/or the third party charging indication.

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to provide the result of a functional module.

Systems, apparatuses, and methods may perform operations of multi-carrier communications described herein. Additionally or alternatively, a non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
    receiving, by a first network entity from a second network entity, a first message comprising:
        a service provider identifier; and
        a third party charging indication;
    determining, by the first network entity, one or more policies based on:
        the service provider identifier; and
        the third party charging indication; and
    sending, by the first network entity to a third network entity, a second message comprising an indication of the one or more policies.

2. The method of claim 1, further comprising sending, by the first network entity to a fourth network entity via the third network entity, charging information comprising:
    the service provider identifier; and
    the third party charging indication,
    wherein the fourth network entity comprises at least one of one of an online charging system (OCS) device or an offline charging system (OFCS) device.

3. The method of claim 1, wherein the first message indicates a request for a network slice for a wireless device, and
    wherein the method further comprises generating, by the first network entity, a network slice identifier for the network slice, wherein the second message comprises the network slice identifier.

4. The method of claim 1, wherein the first network entity comprises a policy control function (PCF) device, wherein the second network entity comprises an application function (AF) device that is associated with at least one of an operator or a third party application server, wherein the third network entity comprises a session management function (SMF) device.

5. The method of claim 1, wherein the second network entity comprises a network exposure function (NEF) device,
    wherein the first message is based on a network slice request message received from an application function (AF) device,
    wherein the network slice request message comprises one or more elements of the first message, and
    wherein the receiving the first message comprises receiving, from the NEF device and based on the AF device being authorized to initiate a network slice, the first message.

6. The method of claim 1, wherein the determining the one or more policies is further based on at least one of:
    information from the second network entity;
    information from a unified data management; or
    a policy pre-configured in the first network entity.

7. The method of claim 1, wherein the second message further comprises at least one of:
    priority information of a network slice;
    an indication of a quality of service policy;
    an indication of a charging policy;
    an indication of a packet inspection policy; or
    an indication of a packet routing policy.

8. The method of claim 1, wherein the first message further comprises at least one of:
    an indication of whether a service is charged for a third party; or an indication of whether the service is free of charge for a user of a wireless device.

9. The method of claim 1, wherein the one or more policies comprise at least one of:
a quality of service policy,
a charging policy,
a packet inspection policy, or
a packet routing policy.

10. The method of claim 1, wherein the first message indicates a request for a network slice for a wireless device,
wherein the first message further comprises a bandwidth associated with the network slice,
wherein the determining the one or more policies is further based on the bandwidth associated with the network slice, and
wherein the second message indicates a request to establish the network slice for the wireless device.

11. A method comprising:
receiving, by a first network entity from a second network entity, a first message comprising:
an indication of a charging policy;
a service provider identifier; and
a third party charging indication;
determining, by the first network entity based on the first message, usage information for a wireless device; and
sending, by the first network entity to a third network entity, charging information comprising:
the service provider identifier; and
the third party charging indication.

12. The method of claim 11, wherein the first message further comprises a request to establish a network slice for the wireless device.

13. The method of claim 11, further comprising:
sending, by the first network entity to a fourth network entity, a second message comprising at least one of:
the indication of the charging policy,
the service provider identifier, or
the third party charging indication.

14. The method of claim 13, wherein the fourth network entity comprises an access and mobility management function (AMF) device.

15. The method of claim 11, wherein the first network entity comprises a session management function (SMF) device, wherein the second network entity comprises a policy control function (PCF) device, and wherein the third network entity comprises at least one of an online charging system (OCS) device or an offline charging system (OFCS) device.

16. An apparatus comprising:
a first network entity comprising:
one or more processors; and
memory storing instructions that, when executed by the one or more processors, configure the first network entity to:
receive, from a second network entity, a first message comprising:
a service provider identifier; and
a third party charging indication;
determine one or more policies based on:
the service provider identifier; and
the third party charging indication; and
send, to a third network entity, a second message comprising an indication of the one or more policies.

17. The apparatus of claim 16, wherein the instructions, when executed by the one or more processors, further configure the first network entity to send, to a fourth network entity via the third network entity, charging information comprising:
the service provider identifier; and
the third party charging indication, and
wherein the fourth network entity comprises at least one of one of an online charging system (OCS) device or an offline charging system (OFCS) device.

18. The apparatus of claim 16, wherein the first message indicates a request for a network slice for a wireless device, and
wherein the instructions, when executed by the one or more processors, further configure the first network entity to generate a network slice identifier for the network slice, wherein the second message comprises the network slice identifier.

19. The apparatus of claim 16, wherein the second network entity comprises a network exposure function (NEF) device,
wherein the first message is based on a network slice request message received from an application function (AF) device,
wherein the network slice request message comprises one or more elements of the first message, and
wherein the instructions, when executed by the one or more processors, configure the first network entity to receive the first message by receiving, from the NEF device and based on the AF device being authorized to initiate a network slice, the first message.

20. The apparatus of claim 16, wherein the instructions, when executed by the one or more processors, configure the first network entity to determine the one or more policies further based on at least one of:
information from the second network entity;
information from a unified data management; or
a policy pre-configured in the first network entity.

21. The apparatus of claim 16, wherein the second message further comprises at least one of:
priority information of a network slice;
an indication of a quality of service policy;
an indication of a charging policy;
an indication of a packet inspection policy; or
an indication of a packet routing policy.

22. The apparatus of claim 16, wherein the first message further comprises at least one of:
an indication of whether a service is charged for a third party; or
an indication of whether the service is free of charge for a user of a wireless device.

23. The apparatus of claim 16, wherein the one or more policies comprise at least one of:
a quality of service policy,
a charging policy,
a packet inspection policy, or
a packet routing policy.

24. The apparatus of claim 16, wherein the first message indicates a request for a network slice for a wireless device,
wherein the first message further comprises a bandwidth associated with the network slice,
wherein the first network entity is configured to determine the one or more policies further based on the bandwidth associated with the network slice, and
wherein the second message indicates a request to establish the network slice for the wireless device.

25. An apparatus comprising:
a first network entity comprising:
one or more processors; and memory storing instructions that, when executed by the one or more processors, configure the first network entity to:
    receive, from a second network entity, a first message comprising:
        an indication of a charging policy;
        a service provider identifier; and
        a third party charging indication;
    determine, based on the first message, usage information for a wireless device; and
    send, to a third network entity, charging information comprising:
        the service provider identifier; and
        the third party charging indication.

26. The apparatus of claim 25, wherein the first message further comprises a request to establish a network slice for the wireless device.

27. The apparatus of claim 25, wherein the instructions, when executed by the one or more processors, further configure the first network entity to:
    send, to an access and mobility management function (AMF) device, a second message comprising at least one of:
        the indication of the charging policy,
        the service provider identifier, or
        the third party charging indication.

28. The apparatus of claim 25, wherein the first network entity comprises a session management function (SMF) device, wherein the second network entity comprises a policy control function (PCF) device, and wherein the third network entity comprises at least one of an online charging system (OCS) device or an offline charging system (OFCS) device.

29. The apparatus of claim 16, wherein the first network entity comprises a policy control function (PCF) device, wherein the second network entity comprises an application function (AF) device that is associated with at least one of an operator or a third party application server, wherein the third network entity comprises a session management function (SMF) device.

* * * * *

UNITED STATES PATENT AND TRADEMARK OFFICE
CERTIFICATE OF CORRECTION

PATENT NO. : 11,412,418 B2
APPLICATION NO. : 16/937034
DATED : August 9, 2022
INVENTOR(S) : Qiao et al.

It is certified that error appears in the above-identified patent and that said Letters Patent is hereby corrected as shown below:

On the Title Page

Page 2, Column 2, Item (56) Other Publications, Line 24:
Delete "1," and insert --15,-- therefor Page 2, Column 2, Item (56) Other Publications, Line 27:
Delete "Z017," and insert --2017,-- therefor Page 2, Column 2, Item (56) Other Publications, Line 40:
Delete "33-171140" and insert --R3-171140-- therefor Page 3, Column 2, Item (56) Other Publications, Line 20:
Delete "Systeml" and insert --System;-- therefor Page 3, Column 2, Item (56) Other Publications, Line 27:
Delete "GPP" and insert --3GPP-- therefor Page 4, Column 1, Item (56) Other Publications, Line 11:
Delete "Nov. 27. Dec. 1," and insert --Nov. 27.-Dec. 1,-- therefor Page 4, Column 1, Item (56) Other Publications, Line 28:
Delete "RZ-1702552" and insert --R2-1702552-- therefor Page 4, Column 1, Item (56) Other Publications, Line 39:
Delete "R2-170Z589" and insert --R2-1702589-- therefor Page 4, Column 1, Item (56) Other Publications, Line 42:
Delete "R2-170Z590" and insert --R2-1702590-- therefor Signed and Sealed this
Ninth Day of April, 2024

Katherine Kelly Vidal
*Director of the United States Patent and Trademark Office*

CERTIFICATE OF CORRECTION (continued)
U.S. Pat. No. 11,412,418 B2

Page 4, Column 1, Item (56) Other Publications, Line 45:
Delete "R2-170Z843" and insert --R2-1702843-- therefor Page 4, Column 1, Item (56) Other Publications, Line 48:
Delete "R2-170Z969" and insert --R2-1702969-- therefor In the Specification Column 6, Detailed Description, Line 1:
Delete "UDM-FE," and insert --UDM-FE-- therefor Column 8, Detailed Description, Line 21:
Delete ", the" and insert --. The computing device 400-- therefor Column 25, Detailed Description, Line 29:
Delete "ton" and insert --to-- therefor Column 34, Detailed Description, Line 10:
Delete "portID" and insert --port ID-- therefor Column 39, Detailed Description, Lines 65-66:
After "manner", insert --.-- therefor In the Claims Column 40, Claim 2, Lines 24-25:
Delete "one of one of" and insert --one of-- therefor Column 42, Claim 17, Lines 6-7:
Delete "one of one of" and insert --one of-- therefor